(12) United States Patent
Su et al.

(10) Patent No.: US 12,545,648 B2
(45) Date of Patent: Feb. 10, 2026

(54) BENZOPYRAZOLE COMPOUND

(71) Applicant: MEDSHINE DISCOVERY INC., Suzhou (CN)

(72) Inventors: Sheng Su, Shanghai (CN); Xiawei Wei, Sichuan (CN); Yunfu Luo, Shanghai (CN); Guoli Zhang, Shanghai (CN); Yong Wang, Shanghai (CN); Shuhui Chen, Shanghai (CN)

(73) Assignee: MEDSHINE DISCOVERY INC., Jiangsu (CN)

( * ) Notice: Subject to any disclaimer, the term of this patent is extended or adjusted under 35 U.S.C. 154(b) by 836 days.

(21) Appl. No.: 17/789,662

(22) PCT Filed: Dec. 30, 2020

(86) PCT No.: PCT/CN2020/141632
§ 371 (c)(1),
(2) Date: Dec. 22, 2022

(87) PCT Pub. No.: WO2021/136429
PCT Pub. Date: Jul. 8, 2021

(65) Prior Publication Data
US 2023/0167068 A1 Jun. 1, 2023

(30) Foreign Application Priority Data

Dec. 31, 2019 (CN) .......................... 201911412430.3
Dec. 1, 2020 (CN) .......................... 202011389082.5

(51) Int. Cl.
| | | |
|---|---|---|
| *C07D 231/56* | (2006.01) | |
| *C07D 401/04* | (2006.01) | |
| *C07D 403/04* | (2006.01) | |
| *C07D 405/04* | (2006.01) | |
| *C07D 413/04* | (2006.01) | |
| *C07D 417/04* | (2006.01) | |
| *C07D 471/04* | (2006.01) | |
| *C07D 487/04* | (2006.01) | |
| *C07D 498/04* | (2006.01) | |

(52) U.S. Cl.
CPC ......... *C07D 231/56* (2013.01); *C07D 401/04* (2013.01); *C07D 403/04* (2013.01); *C07D 405/04* (2013.01); *C07D 413/04* (2013.01); *C07D 417/04* (2013.01); *C07D 471/04* (2013.01); *C07D 487/04* (2013.01); *C07D 498/04* (2013.01)

(58) Field of Classification Search
CPC .. C07D 231/56; C07D 401/04; C07D 403/04; C07D 405/04; C07D 413/04; C07D 417/04; C07D 471/04; C07D 487/04; C07D 498/04; A61P 29/00; A61P 19/02
See application file for complete search history.

(56) References Cited

U.S. PATENT DOCUMENTS

2008/0214641 A1    9/2008   Berger et al.

FOREIGN PATENT DOCUMENTS

| CN | 101611015 A | 12/2009 |
|---|---|---|
| CN | 102112449 A | 6/2011 |
| CN | 107001320 A | 8/2017 |
| CN | 109415348 A | 3/2019 |
| WO | 2019010491 | 1/2009 |

OTHER PUBLICATIONS

Extended European Search Report issued in European Patent Application No. 20909915.9 mailed on Nov. 8, 2023, 13 pages.
Chinese Office Action issued in Chinese Patent Application No. 2020800918290 dated Jan. 20, 2023, 13 pages, with English language translation.
International Search Report issued in International Patent Application No. PCT/CN2020/141632 mailed on Mar. 25, 2021, 14 pages.
Written Opinion of the International Search Authority No. PCT/CN2020/141632 mailed on Mar. 25, 2021, 12 pages.
Ripa, Lena, et al., "Discovery of a Novel Oral Glucocorticoid Receptor Modulator (AZD9567) with Improved Side Effect Profile", Journal of Medicinal Chemistry, Feb. 9, 2018, vol. 61, pp. 1785-1799.
Hemmerling, Martin, et al., "Selective Nonsteroidal Glucocorticoid Receptor Modulators for the Inhaled Treatment of Pulmonary Diseases", Journal of Medicinal Chemistry, Sep. 22, 2017, vol. 60, pp. 8691-8605.
Hemmerling, Martin, et al., "Discovery of indazole ethers as novel , potent , non-steroidal glucocorticoid receptor modulators", Bioorganic & Medicinal Chemistry Letters, Oct. 19, 2016, vol. 26, pp. 5741-5748.

*Primary Examiner* — Jessica Worsham
(74) *Attorney, Agent, or Firm* — MH2 Technology Law Group LLP

(57) ABSTRACT

Disclosed is a benzopyrazole compound. Specifically disclosed are a compound as shown in formula (I) and a pharmaceutically acceptable salt thereof.

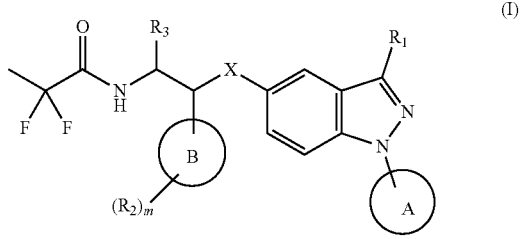

16 Claims, No Drawings

BENZOPYRAZOLE COMPOUND

CROSS-REFERENCE TO RELATED APPLICATIONS

The present application is the national stage entry of International Patent Application No. PCT/CN2020/141632, filed on Dec. 30, 2020, and published as WO 2021/136429 A1 on Mar. 4, 2021, which claims the benefit of Chinese Patent Application No. CN201911412430.3, filed on Dec. 31, 2019, and Chinese Patent Application No. CN202011389082.5, filed on Dec. 1, 2020, all of which are incorporated by reference herein in their entirety.

TECHNICAL FIELD

The present disclosure relates to a series of benzopyrazole compounds, specifically relates to a compound represented by formula (I) and a pharmaceutically acceptable salt thereof.

BACKGROUND

Rheumatoid arthritis (RA) is a chronic inflammatory, "systemic" autoimmune disease, and the joint manifestations of early rheumatoid arthritis are often difficult to distinguish from other types of inflammatory arthritis. Rheumatoid arthritis has more characteristic signs such as joint erosions, rheumatoid nodules and other extraarticular manifestations. Rheumatoid arthritis affects women more than men (3:1), and the age of onset is between 30 and 55 years old.

The pathogenesis of rheumatoid arthritis is very complex, mainly because autoantigens are presented to activated CD4+ T cells by major histocompatibility complex II (MHC-II)-positive antigen-presenting cells (APCs) to initiate specific immune response; at the same time, activated T cells, macrophages, etc. migrate to the synovial membrane, increasing the secretion of various inflammatory cytokines such as TNFα, IL-1 and IL-6, immersing the joints in the synovial membrane, resulting in corresponding arthritis symptoms.

Glucocorticoids (GC) have been widely used for decades to treat inflammatory and immune diseases, including: rheumatoid arthritis, asthma, chronic obstructive pulmonary disease (COPD), osteoarthritis, rheumatic fever, allergic rhinitis, systemic lupus erythematosus, Crohn's disease, inflammatory bowel disease, and ulcerative colitis.

Glucocorticoids (GC) bind to the glucocorticoid receptor (GR) and enter the nucleus to affect gene transcription (activation and repression) and reduce the production of inflammatory factors. Glucocorticoid receptor is a member of the conserved nuclear receptor superfamily and belongs to the nuclear transcription factors, which is widely present in various tissue cells of the organism and almost all cells are its target cells, playing an important regulatory role in the development, growth, metabolism and immune function of the organism. GC usually has serious and irreversible side effects, such as osteoporosis, hyperglycemia, diabetes, hypertension, muscular atrophy, Cushing's syndrome, etc., which seriously limits the use of GC in chronic diseases.

At present, examples have been found of GR ligands that selectively induce transcription repression without significant transcription activation, reducing the risk of systemic side effects while maintaining anti-inflammatory activity, which is called selective glucocorticoid receptor modulators (SGRM). Selective glucocorticoid receptor modulators (SGRM) differ from GC in that, when bound to GR, they trigger complete transcription repression and only partial transcription activation, which in turn can control the associated side effects while maintaining anti-inflammatory activity.

Lena Ropa, et al, *J. Med. Chem.* 2018, 61, 1785-1799 reported the compound AZD9567, which has the pharmacological efficacy of anti-inflammatory action, as well as the physicochemical properties such as poor solubility, suitable for oral administration. However, the data also show that the repression activity of gene transcription is not satisfactory, the anti-inflammatory effect is not satisfactory, and there are side effects of glucocorticoids such as reduced plasma osteocalcin levels, so there is a need to develop compounds with both good repression activity of gene transcription and general activation activity of gene transcription to improve anti-inflammatory activity while reducing side effects.

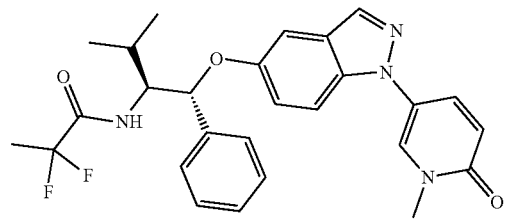

AZD-9567

CONTENT OF THE PRESENT INVENTION

The present disclosure provides a compound represented by formula (I) or a pharmaceutically acceptable salt thereof,

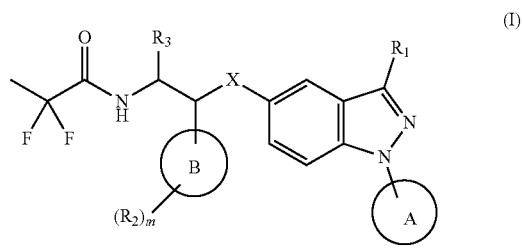

(I)

wherein,
X is selected from NH and O;
ring A is selected from phenyl, 5-membered heteroaryl;

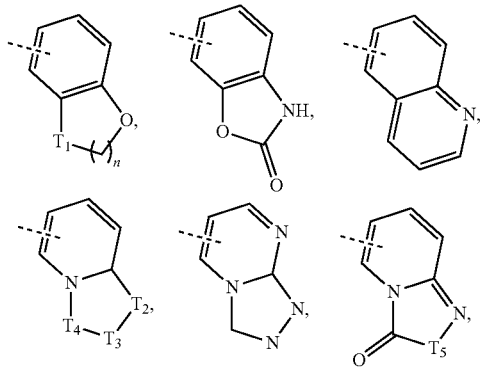

-continued

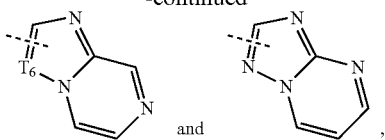

and the 5-membered heteroaryl,

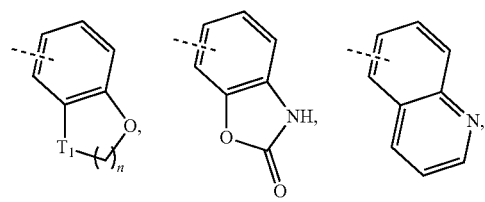

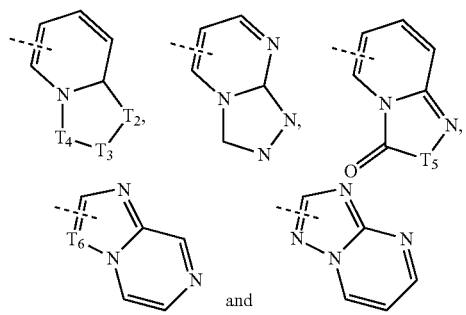

and and are optionally substituted by 1, 2 or 3 $R_a$;

$T_1$ is selected from $CH_2$ and O;

each of $T_2$, $T_3$ and $T_4$ is independently selected from CH and N;

$T_5$ is selected from NH and O;

$T_6$ is selected from CH and N;

ring B is selected from phenyl;

$R_1$ is selected from H and $C_{1-3}$ alkoxy, and the $C_{1-3}$ alkoxy is optionally substituted by 1, 2 or 3 $R_b$;

each of $R_2$ is independently selected from H, F, Cl, Br and $CH_3$;

$R_3$ is selected from $C_{1-6}$ alkyl, and the $C_{1-6}$ alkyl is optionally substituted by 1, 2 or 3 $R_c$;

m is selected from 0, 1 and 2;

n is selected from 1 and 2;

each of $R_a$ is independently selected from H and $C_{1-3}$ alkyl, and the $C_{1-3}$ alkyl is optionally substituted by 1, 2 or 3 R;

each of $R_b$ is independently selected from H, F, Cl, Br and I;

each of $R_c$ is independently selected from H, F, Cl, Br, I and OH;

each of R is independently selected from F and $OCH_3$.

In some embodiments of the present disclosure, the compound or the pharmaceutically acceptable salt thereof, wherein the compound is selected from

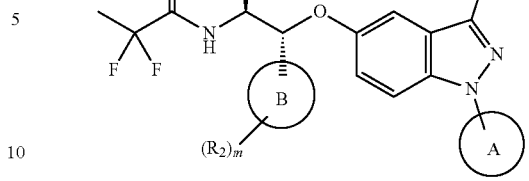

wherein, ring A, ring B, $R_1$, $R_2$, $R_3$ and m are as defined in the present disclosure.

In some embodiments of the present disclosure, each of the $R_a$ is independently selected from H, $CH_3$, $CF_3$, $CH_2CH_3$ and $CH_2CH_2OCH_3$, and other variables are as defined in the present disclosure.

In some embodiments of the present disclosure, each of the $R_a$ is independently selected from H, $CH_3$, $CF_3$, $CH_2CH_3$, $C(CH_3)_2$ and $CH_2CH_2OCH_3$, and other variables are as defined in the present disclosure.

In some embodiments of the present disclosure, the ring A is selected from phenyl, furanyl, pyrazolyl, triazolyl, thiazolyl, isothiazolyl,

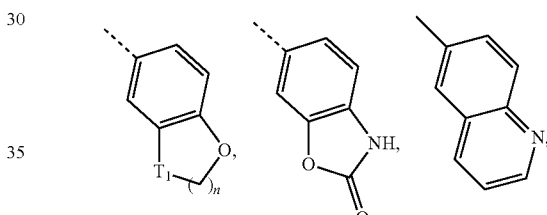

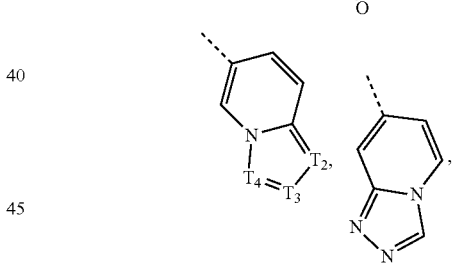

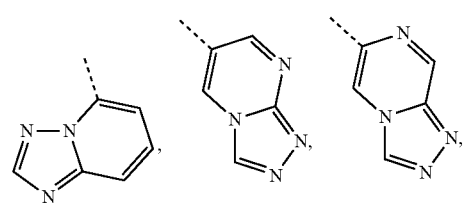

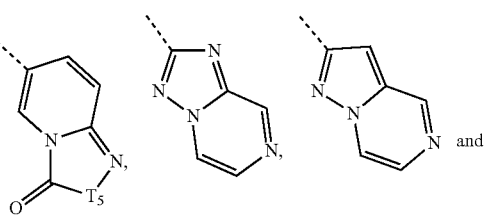

and

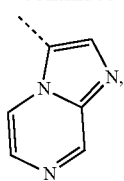
and the furanyl, pyrazolyl, triazolyl, thiazolyl, isothiazolyl,
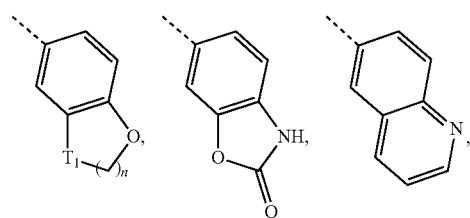
are optionally substituted by 1, 2 or 3 R$_a$, and other variables are as defined in the present disclosure.
In some embodiments of the present disclosure, the ring A is selected from
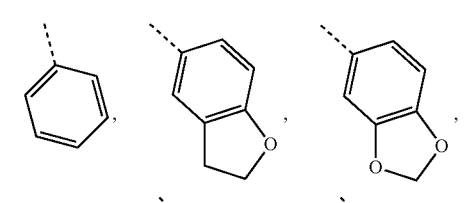
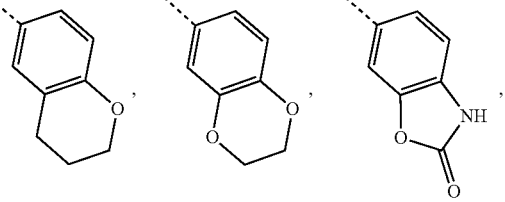
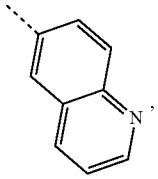 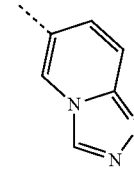
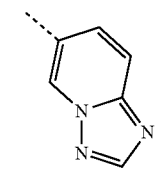 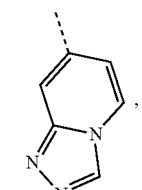
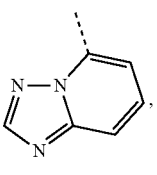 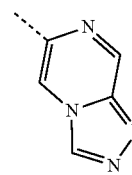
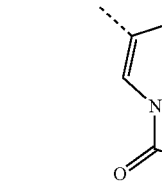 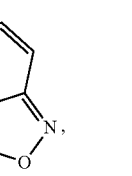
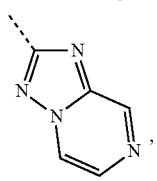 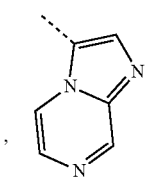
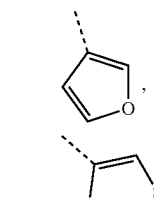, and the 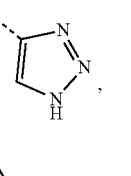
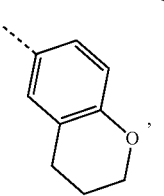 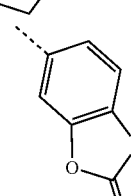
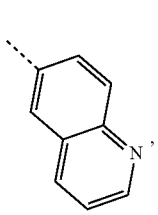 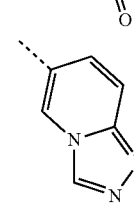

-continued
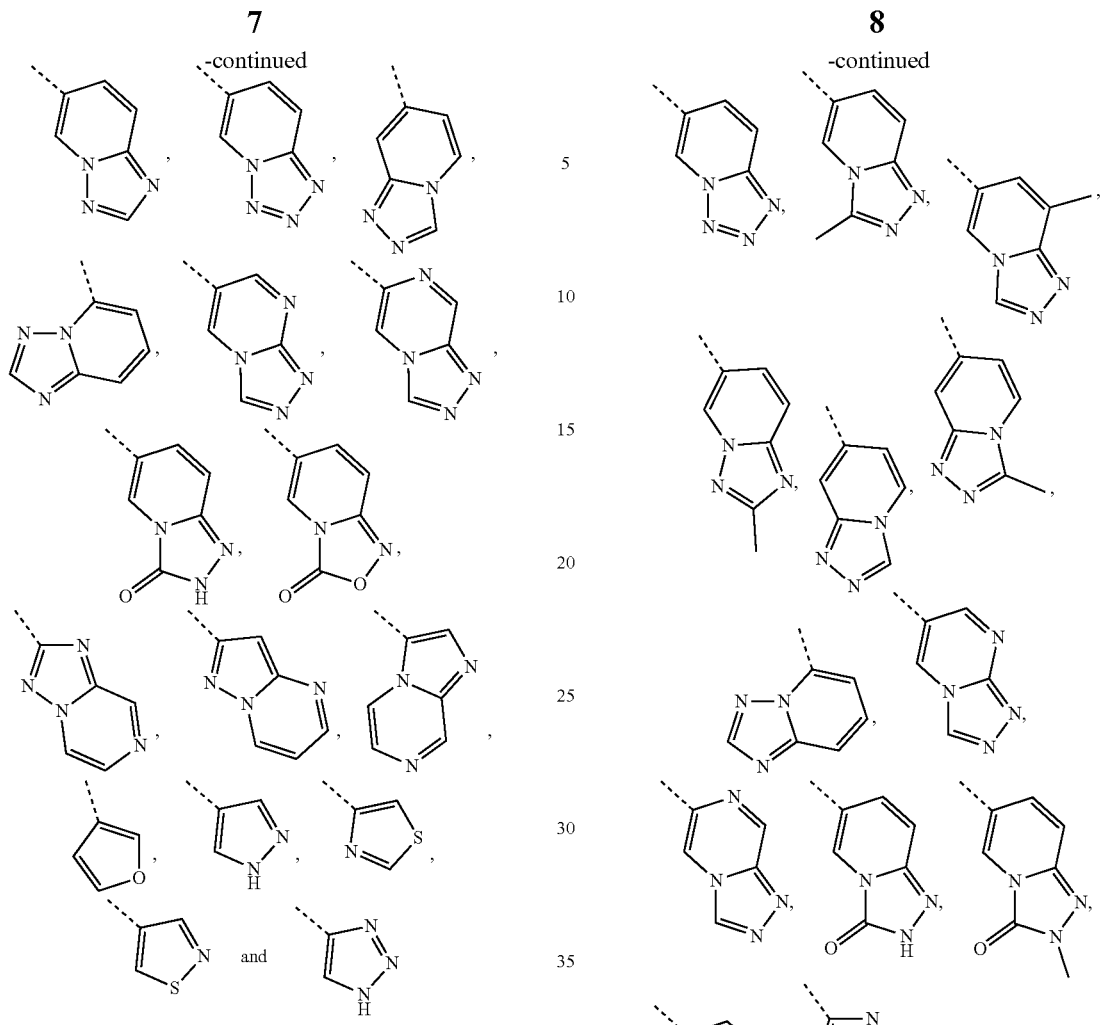
are optionally substituted by 1, 2 or 3 $R_a$, and other variables are as defined in the present disclosure.
In some embodiments of the present disclosure, the ring A is selected from
-continued
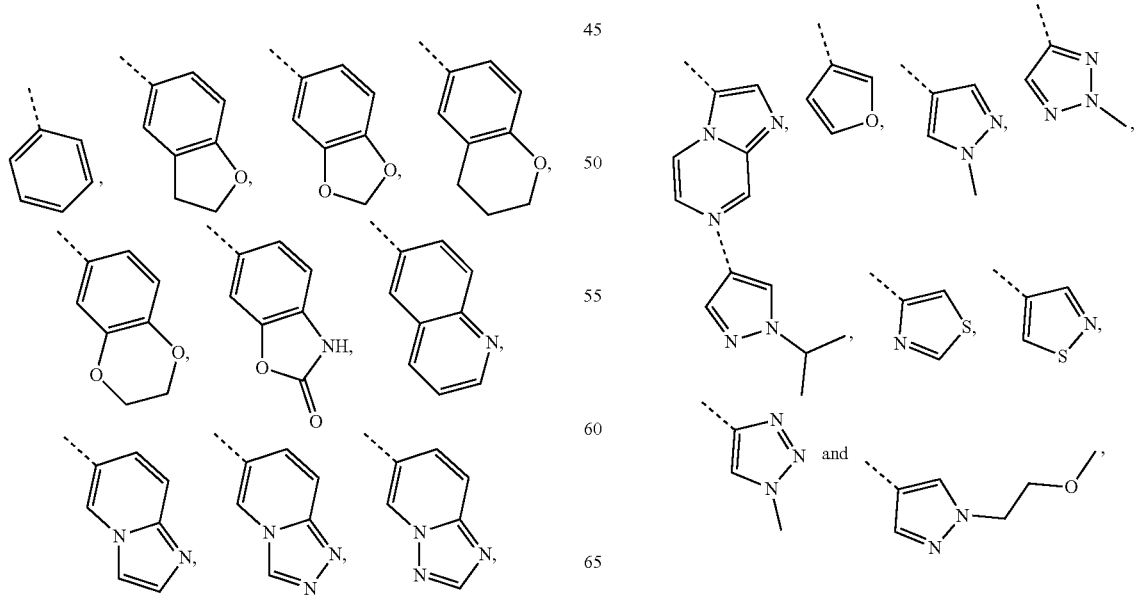
and other variables are as defined in the present disclosure.

In some embodiments of the present disclosure, the structural moiety

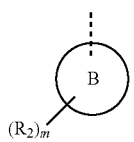

is selected from

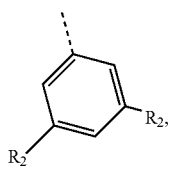

and other variables are as defined in the present disclosure.

In some embodiments of the present disclosure, the structural moiety

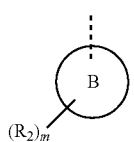

is selected from

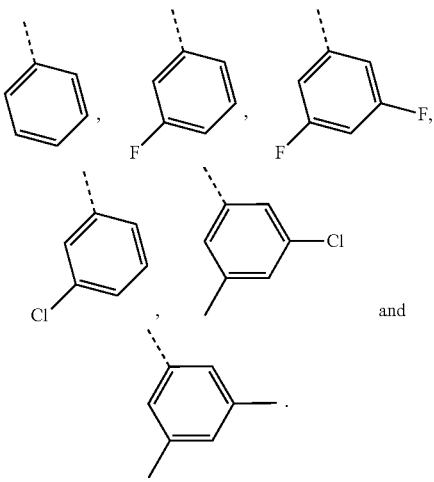

and other variables are as defined in the present disclosure.

In some embodiments of the present disclosure, the $R_1$ is selected from H and $OCH_3$, and the $OCH_3$ is optionally substituted by 1, 2 or 3 $R_b$, and other variables are as defined in the present disclosure.

In some embodiments of the present disclosure, the $R_1$ is selected from H and $OCH_3$, and other variables are as defined in the present disclosure.

In some embodiments of the present disclosure, the $R_3$ is selected from $C_{1-3}$ alkyl, and the $C_{1-3}$ alkyl is optionally substituted by 1, 2 or 3 $R_c$, and other variables are as defined in the present disclosure.

In some embodiments of the present disclosure, the $R_3$ is selected from $CH_3$, $CH_2CH_3$ and $C(CH_3)_2$, and other variables are as defined in the present disclosure.

The present disclosure also provides a compound represented by formula (I) or a pharmaceutically acceptable salt thereof,

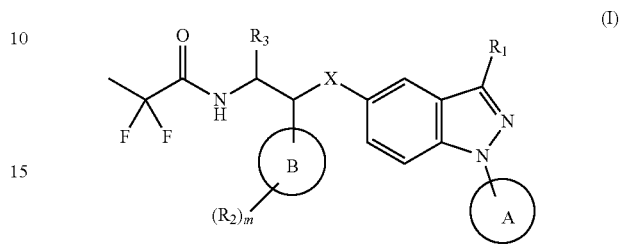

(I)

wherein,

X is selected from $NR_4$ or O;

ring A is selected from phenyl,

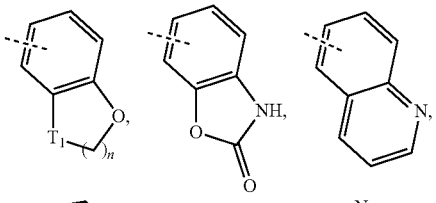

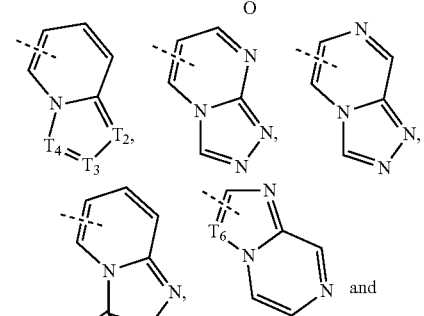

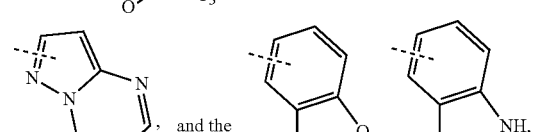

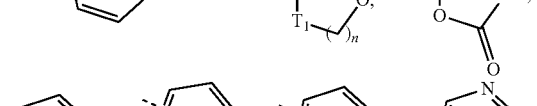, and the

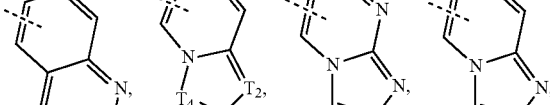

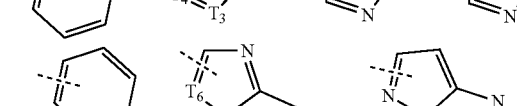

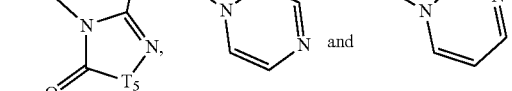

and are optionally substituted by 1, 2 or 3 $R_a$;
$T_1$ is selected from $CH_2$ and O;
each of $T_2$, $T_3$ and $T_4$ is independently selected from CH and N;
$T_5$ is selected from NH and O;
$T_6$ is selected from CH and N;
ring B is selected from phenyl;
$R_1$ is selected from H and $C_{1-3}$ alkoxy, and the $C_{1-3}$ alkoxy is optionally substituted by 1, 2 or 3 $R_b$;
each of $R_2$ is independently selected from H and F;
$R_3$ is selected from $C_{1-6}$ alkyl, and the $C_{1-6}$ alkyl is optionally substituted by 1, 2 or 3 $R_c$;
$R_4$ is selected from H;
m is selected from 0, 1 and 2;
n is selected from 1 and 2;
each of $R_a$ is independently selected from H and $CH_3$;
each of $R_b$ is independently selected from H, F, Cl, Br and I;
each of $R_c$ is independently selected from H, F, Cl, Br, I and OH.

In some embodiments of the present disclosure, the above compound or the pharmaceutically acceptable salt thereof, wherein the structure of the compound is selected from

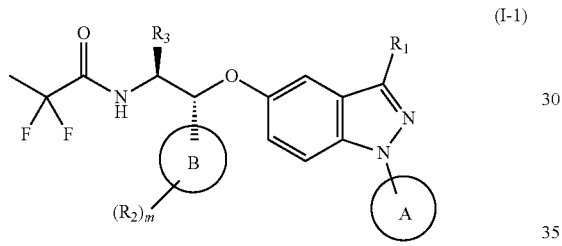

(I-1)

wherein, ring A, ring B, $R_1$, $R_2$, $R_3$ and m are as defined in the present disclosure.

In some embodiments of the present disclosure, the above ring A is selected from

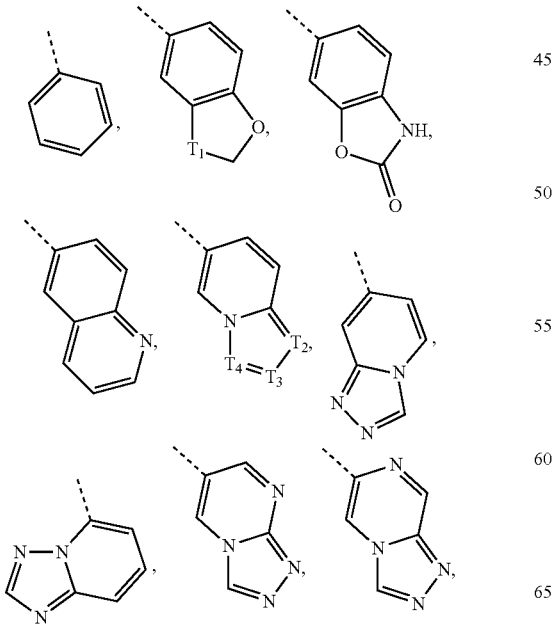

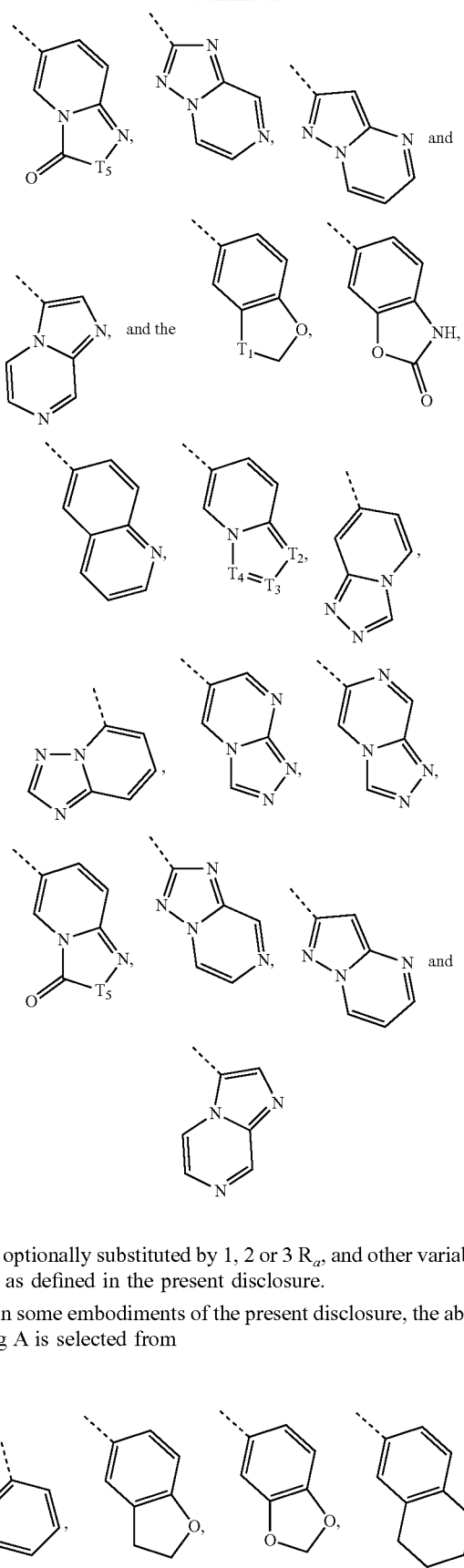

are optionally substituted by 1, 2 or 3 $R_a$, and other variables are as defined in the present disclosure.

In some embodiments of the present disclosure, the above ring A is selected from

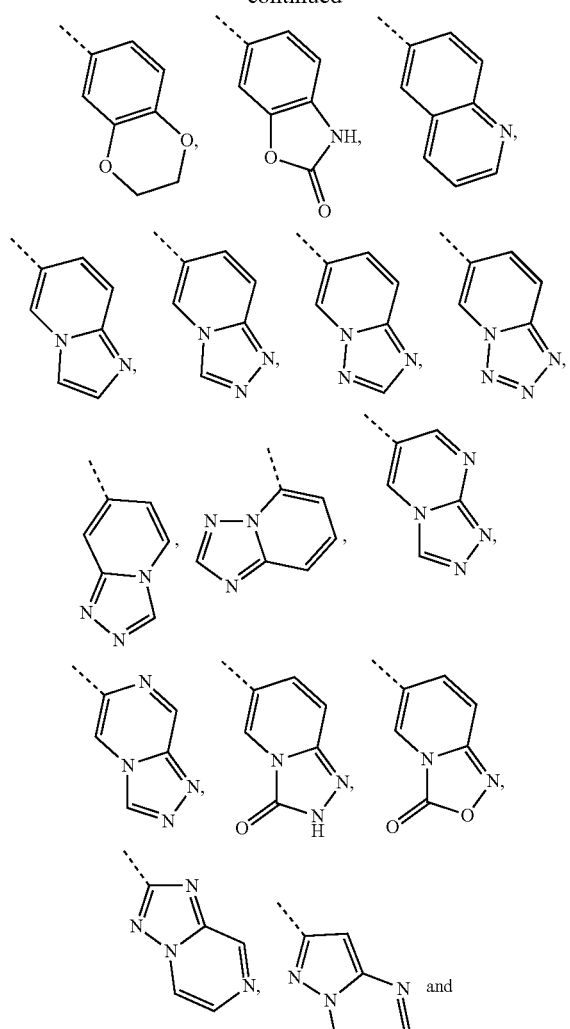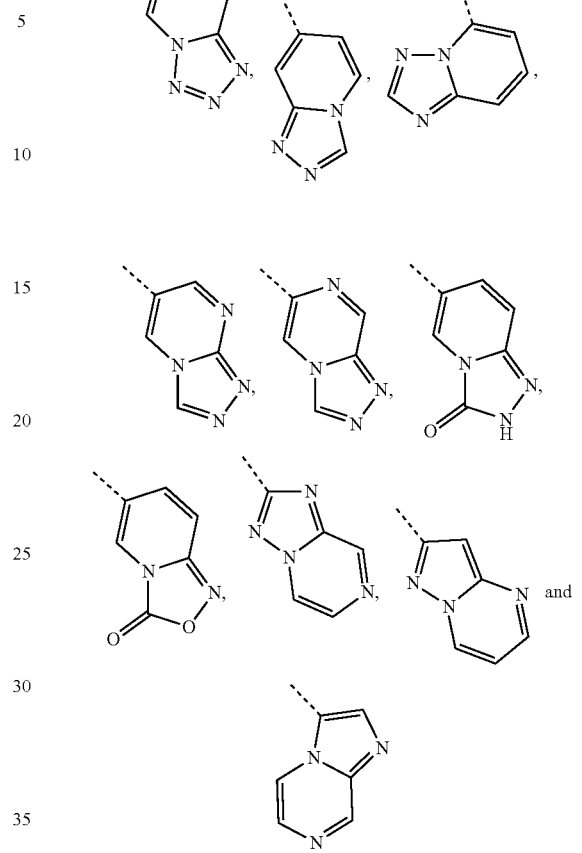
are optionally substituted by 1, 2 or 3 $R_a$, and other variables are as defined in the present disclosure.
In some embodiments of the present disclosure, the above ring A is selected from
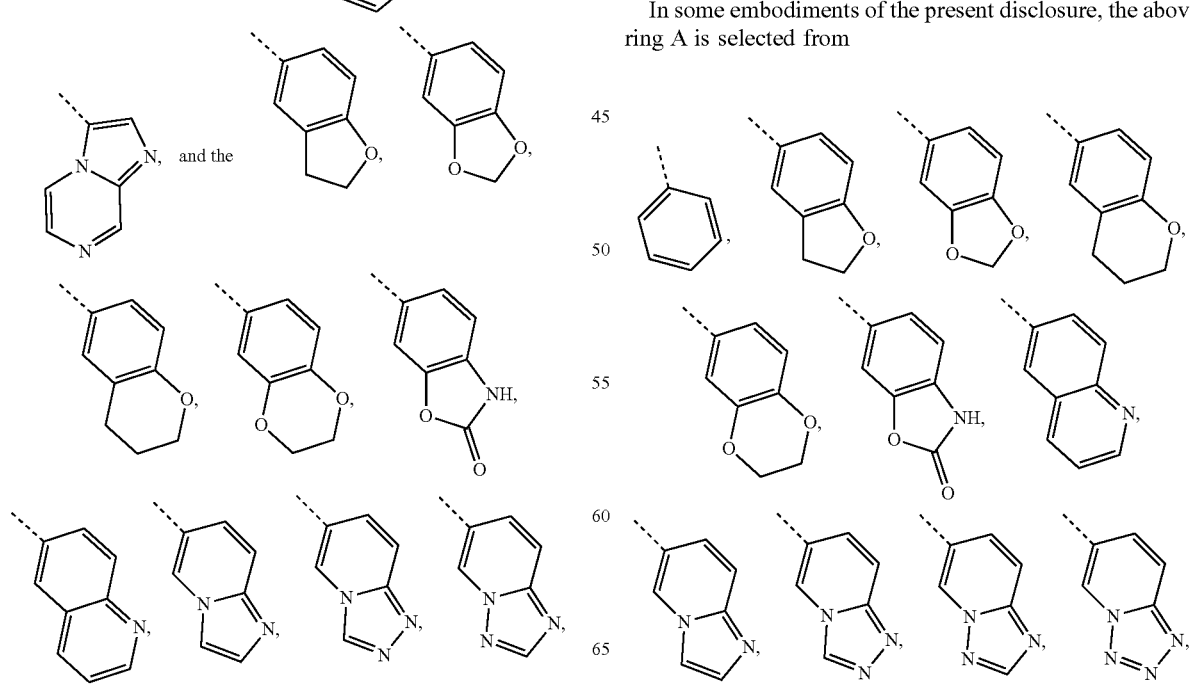

-continued

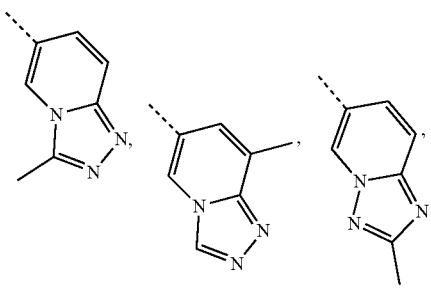

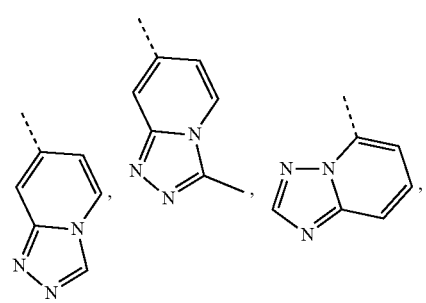

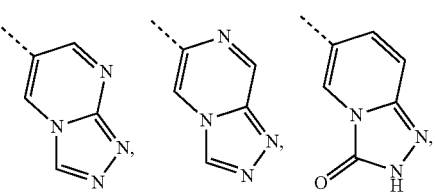

and other variables are as defined in the present disclosure.

In some embodiments of the present disclosure, the above ring B is selected from

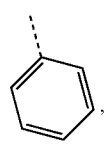

and other variables are as defined in the present disclosure.

In some embodiments of the present disclosure, the above structural moiety

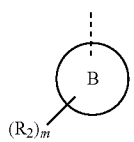

is selected from

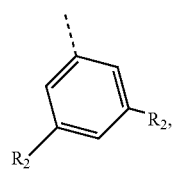

and other variables are as defined in the present disclosure.

In some embodiments of the present disclosure, the above structural moiety

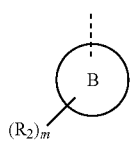

is selected from

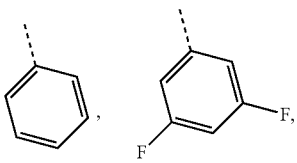

and other variables are as defined in the present disclosure.

In some embodiments of the present disclosure, the above $R_1$ is selected from H and $OCH_3$, and the $OCH_3$ is optionally substituted by 1, 2 or 3 $R_b$, and other variables are as defined in the present disclosure.

In some embodiments of the present disclosure, the above $R_1$ is selected from H and $OCH_3$, and other variables are as defined in the present disclosure.

In some embodiments of the present disclosure, the above $R_3$ is selected from $C_{1-3}$ alkyl, and the $C_{1-3}$ alkyl is optionally substituted by 1, 2 or 3 $R_c$, and other variables are as defined in the present disclosure.

In some embodiments of the present disclosure, the above $R_3$ is selected from $CH_3$ and $C(CH_3)_2$, and other variables are as defined in the present disclosure.

In some embodiments of the present disclosure, the compound or the pharmaceutically acceptable salt thereof, wherein the compound is selected from

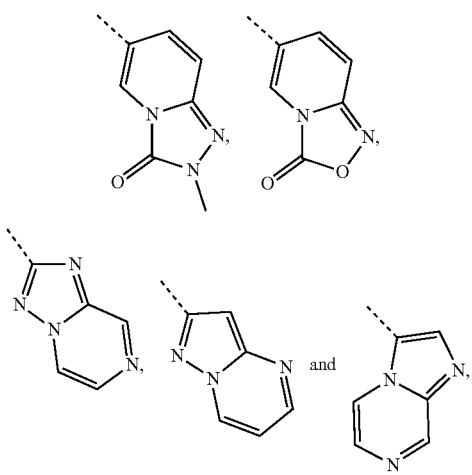

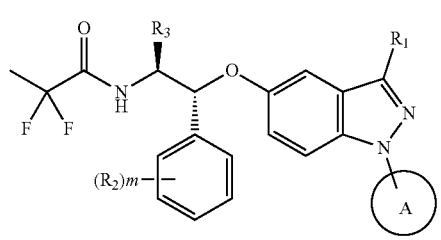
(I-1-1)
wherein, ring A, $R_1$, $R_2$, $R_3$ and m are as defined in the present disclosure.
There are still some embodiments of the present disclosure which are obtained by any combination of the above variables.
The present disclosure also provides a compound represented by the following formula or a pharmaceutically acceptable salt thereof,
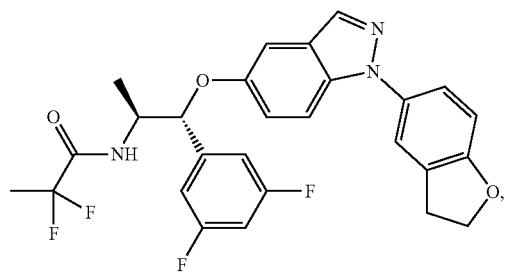
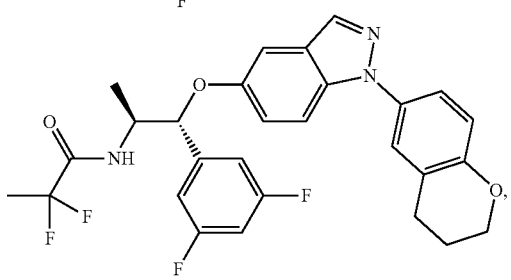
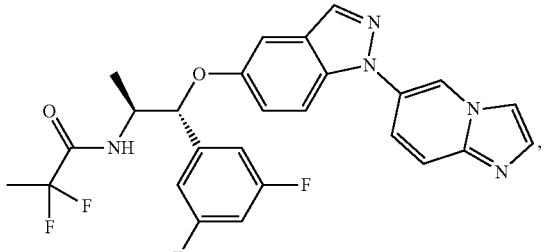
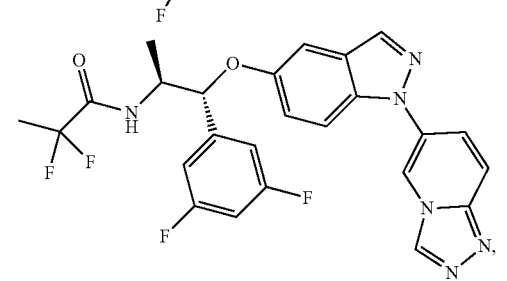
-continued
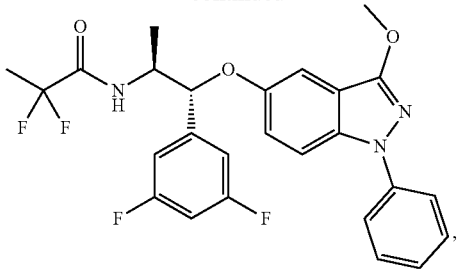
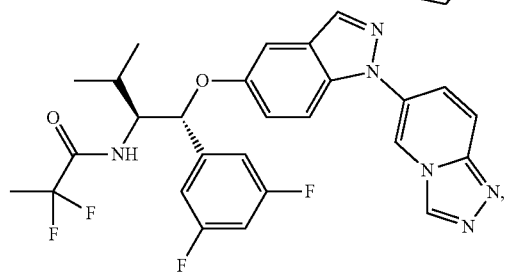

-continued
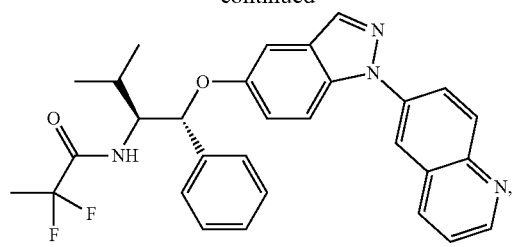
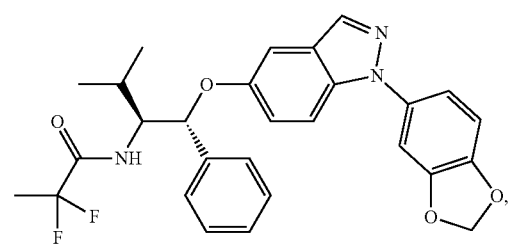
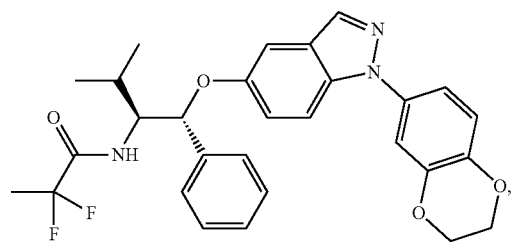
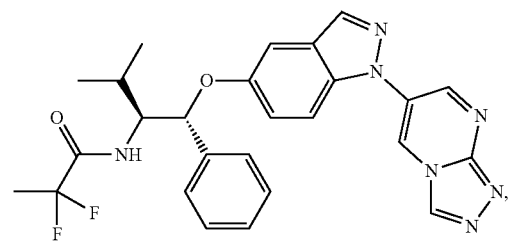
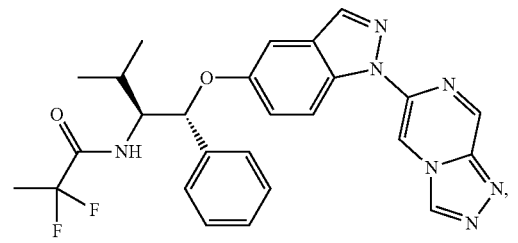
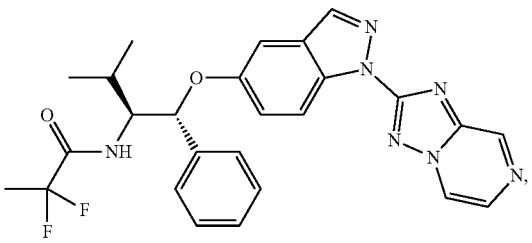
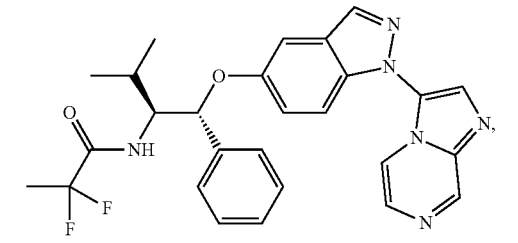
-continued
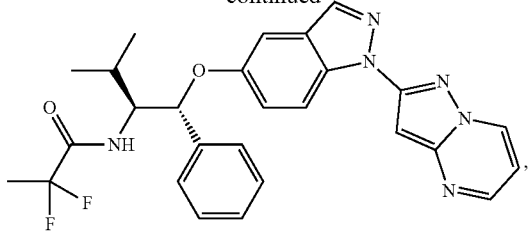
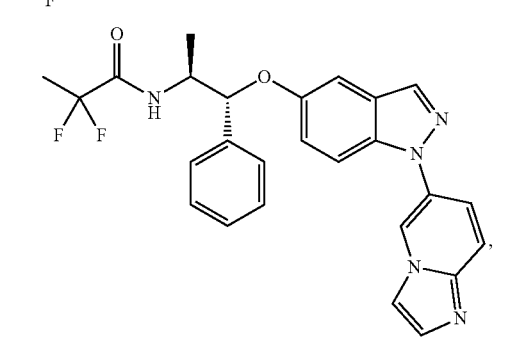
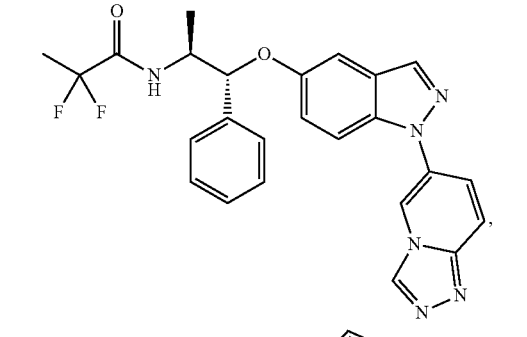
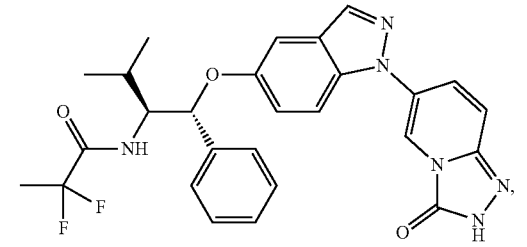
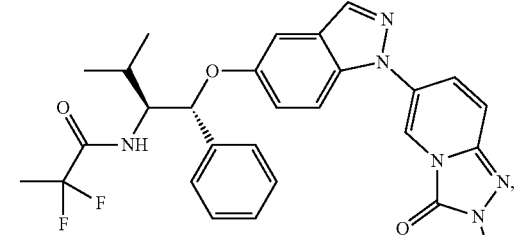
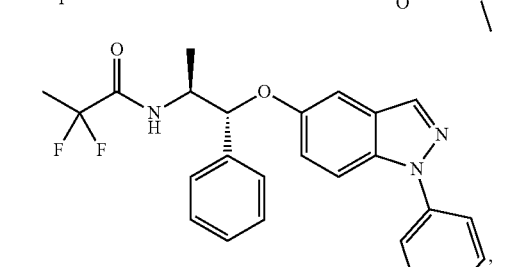

-continued
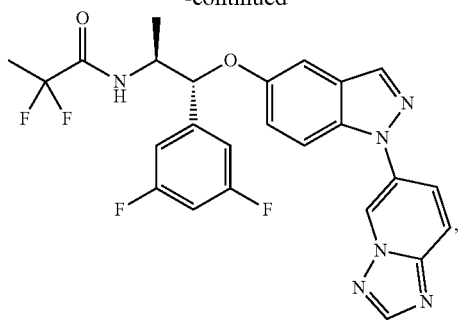
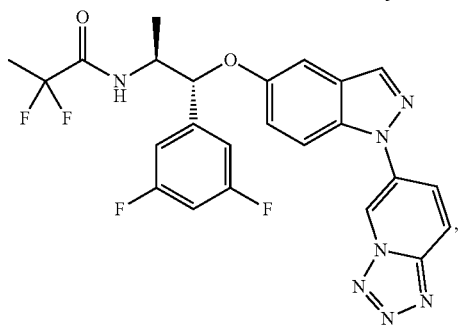
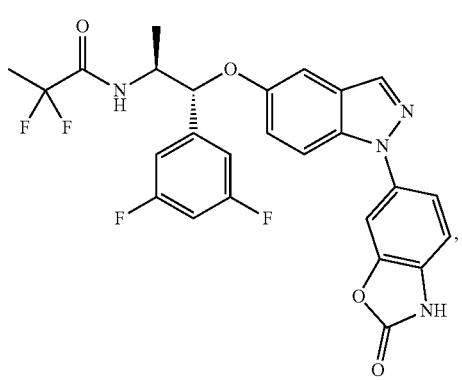
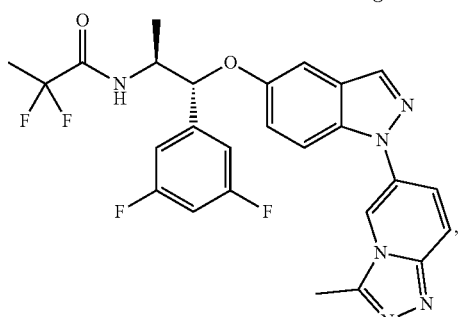
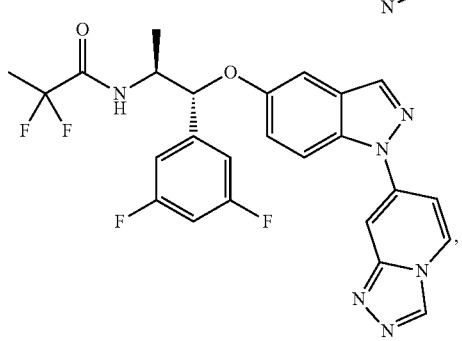
-continued
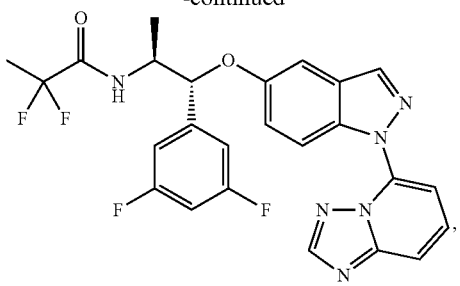
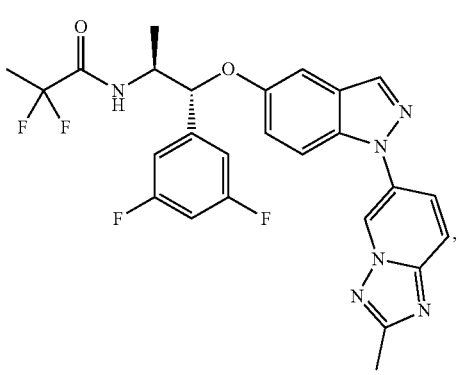
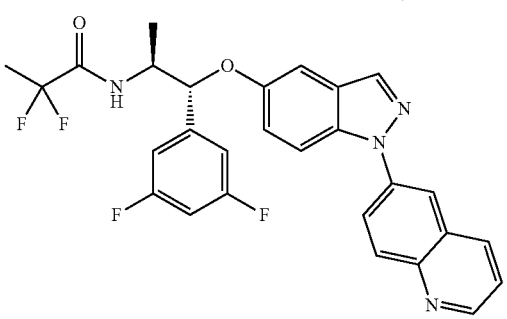
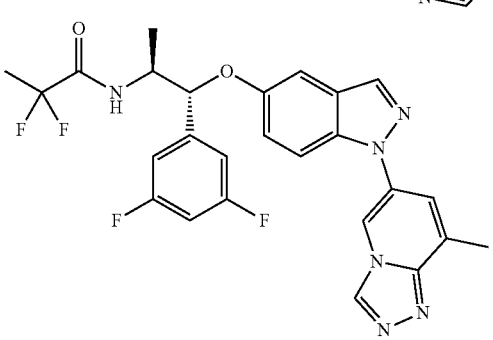
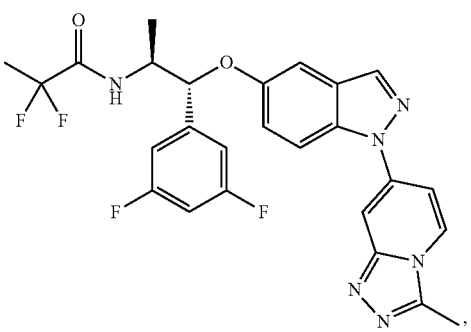

23
-continued
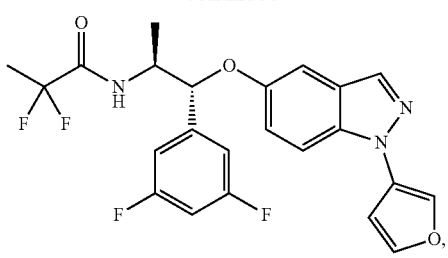
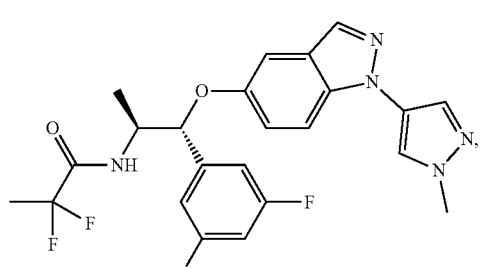
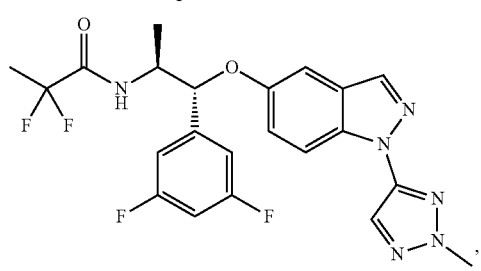
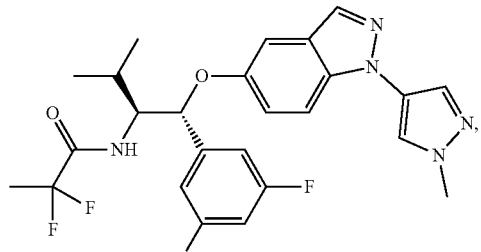
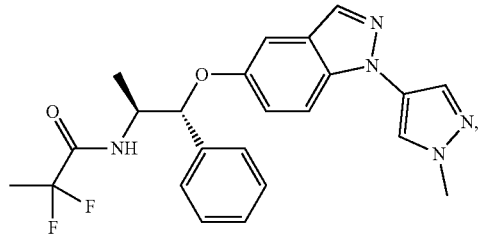
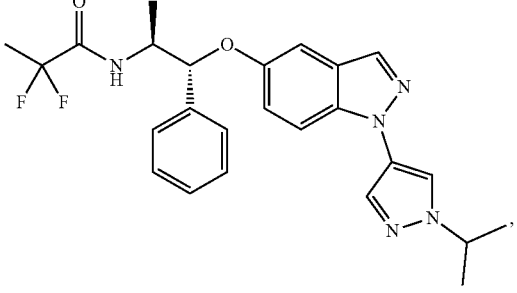
24
-continued
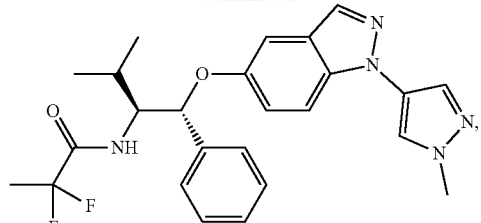
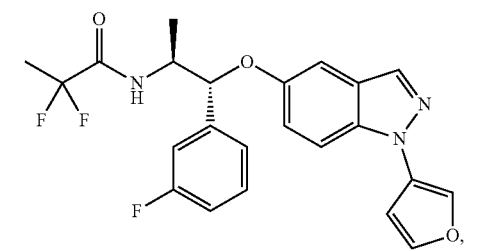
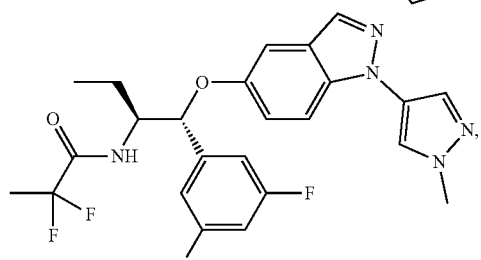
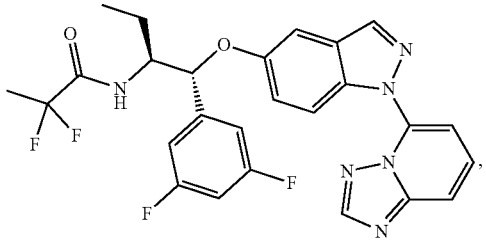
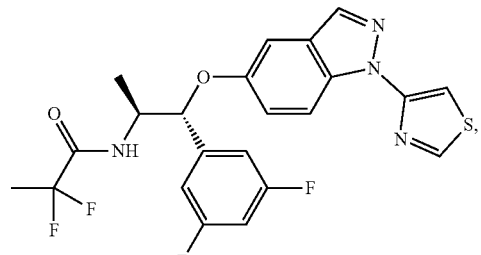
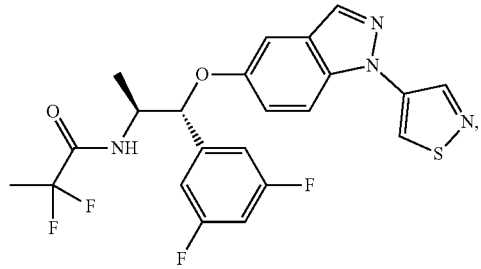

-continued

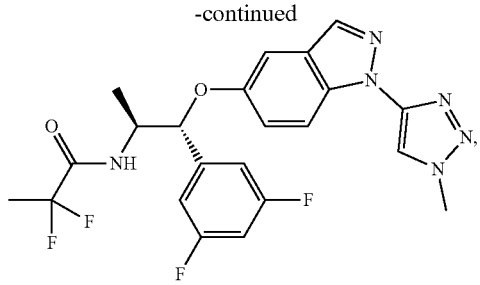
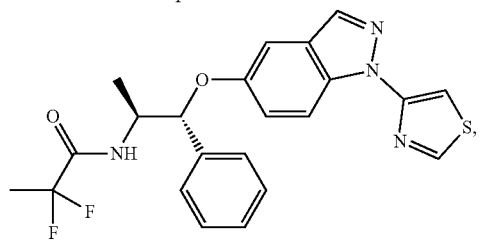
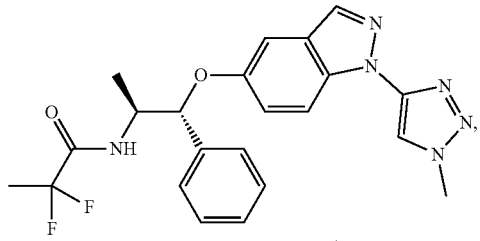
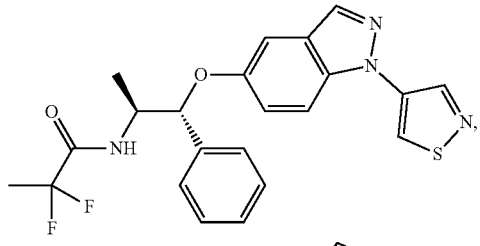
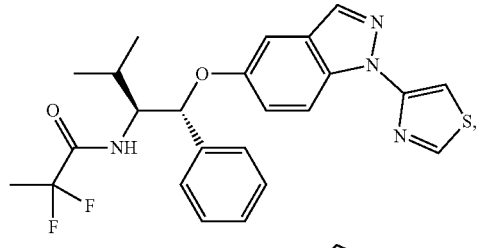
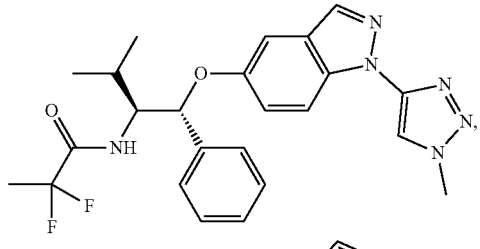
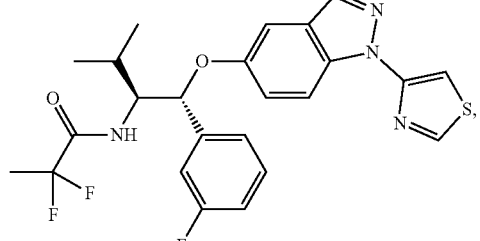

-continued

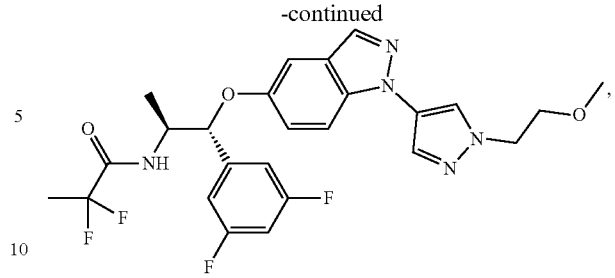
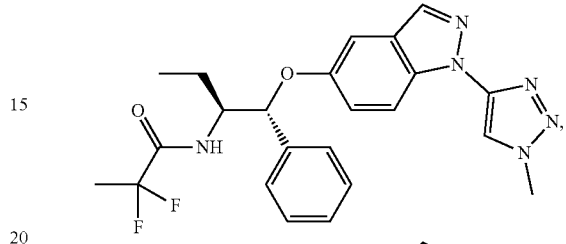
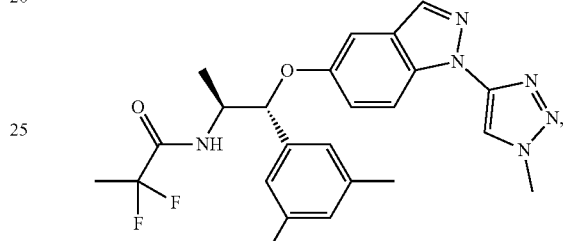
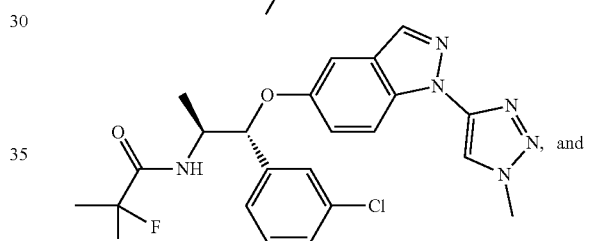
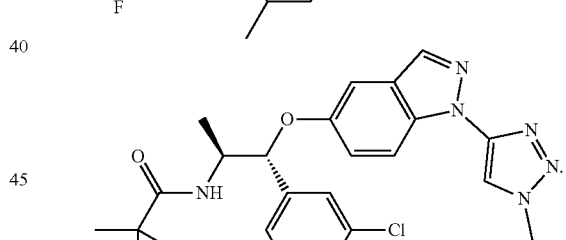

The present disclosure also provides use of the compound or the pharmaceutically acceptable salt thereof in the manufacture of a medicament for diseases related to glucocorticoid receptors.

In some embodiments of the present disclosure, the diseases related to glucocorticoid receptors refer to rheumatoid arthritis.

Technical Effect

The compound designed by the present disclosure has good hMMP1 transcription repression activity, comparable MMTV transcription activation activity, strong anti-inflammatory activity at the cellular level, and has good pharmacokinetic properties.

Definition and Description

Unless otherwise stated, the following terms and phrases used herein have the following meanings. A specific term or phrase should not be considered indefinite or unclear in the absence of a particular definition, but should be understood according to the common meaning. When a trade name appears herein, it is intended to refer to its corresponding commercial product or active ingredient thereof.

The term "pharmaceutically acceptable" is used herein in terms of those compounds, materials, compositions, and/or dosage forms, which are suitable for use in contact with human and animal tissues within the scope of reliable medical judgment, without excessive toxicity, irritation, anaphylactic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by contacting the neutral form of the compound with a sufficient amount of a base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by contacting the neutral form of the compound with a sufficient amount of an acid in a pure solution or a suitable inert solvent. Examples of the pharmaceutically acceptable acid addition salts include salts derived from inorganic acids, such as hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and salts derived from organic acids, such as acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to either base or acid addition salts.

The pharmaceutically acceptable salt of the present disclosure can be prepared from the parent compound that contains an acidic or basic group by conventional chemical methods. Generally, such salt can be prepared by reacting the free acid or base form of the compound with a stoichiometric amount of an appropriate base or acid in water or an organic solvent or a mixture thereof.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereoisomers, (D)-isomers, (L)-isomers, and racemic and other mixtures thereof, such as enantiomers or diastereomer enriched mixtures, all of which are within the scope of the present disclosure. Additional asymmetric carbon atoms may be present in substituents such as alkyl. All these isomers and their mixtures are encompassed within the scope of the present disclosure.

The compounds of the present disclosure may exist in specific. Unless otherwise specified, the term "tautomer" or "tautomeric form" means that at room temperature, the isomers of different functional groups are in dynamic equilibrium and can be transformed into each other quickly. If tautomers possibly exist (such as in solution), the chemical equilibrium of tautomers can be reached. For example, proton tautomer (also called prototropic tautomer) includes interconversion through proton migration, such as keto-enol isomerization and imine-enamine isomerization. Valence tautomer includes some recombination of bonding electrons for mutual transformation. Specific examples of the keto-enol tautomerization are as follows: the tautomerization between two tautomers of pentane-2,4-dione and 4-hydroxy-pent-3-en-2-one; specific examples of imine-enamine tautomerization are as follows:

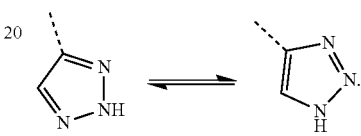

The compound of the present disclosure may contain an unnatural proportion of atomic isotope at one or more than one atom(s) that constitute the compound. For example, the compound can be radiolabeled with a radioactive isotope, such as tritium ($^{3}H$), iodine-125 ($^{125}I$) or C-14 ($^{14}C$). For another example, deuterated drugs can be formed by replacing hydrogen with heavy hydrogen, the bond formed by deuterium and carbon is firmer than that of ordinary hydrogen and carbon, compared with non-deuterated drugs, deuterated drugs have the advantages of reduced toxic and side effects, increased drug stability, enhanced efficacy, prolonged biological half-life of drugs, etc. All isotopic variations of the compound of the present disclosure, whether radioactive or not, are encompassed within the scope of the present disclosure. The term "optional" or "optionally" means that the subsequently described event or circumstance may, but does not necessarily, occur, and the description includes instances where the event or circumstance occurs and instances where it does not.

The term "substituted" means one or more than one hydrogen atom(s) on a specific atom are substituted with the substituent, including deuterium and hydrogen variables, as long as the valence of the specific atom is normal and the substituted compound is stable. When the substituent is an oxygen (i.e., =O), it means two hydrogen atoms are substituted. Positions on an aromatic ring cannot be substituted with a ketone. The term "optionally substituted" means an atom can be substituted by a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted by 0-2 R, the group can be optionally substituted by up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When one of the variables is selected from a single bond, it means that the two groups linked by the single bond are connected directly. For example, when L in A-L-Z represents a single bond, the structure of A-L-Z is actually A-Z.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of chemical bond linking thereto so as to meet the corresponding valence. The chemical bond between the site and other groups can be represented by a straight solid bond

, a straight dashed bond

or a wavy line

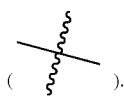.

For example, the straight solid bond in—OCH$_3$ means that it is linked to other groups through the oxygen atom in the group; the straight dashed bonds in

means that it is linked to other groups through the two ends of nitrogen atom in the group; the wave lines in

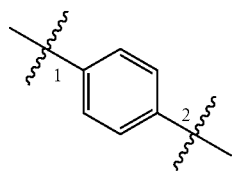 [SMILES: *c1ccc(*)cc1]

means that the phenyl group is linked to other groups through carbon atoms at position 1 and position 2;

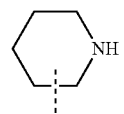

means that it can be linked to other groups through any linkable sites on the piperidinyl by one chemical bond, including at least four types of linkage, including

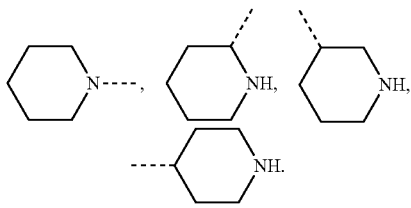

Even though the H atom is drawn on the —N—,

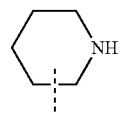

still includes the linkage of

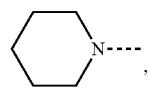

merely when one chemical bond was connected, the H of this site will be reduced by one to the corresponding monovalent piperidinyl;

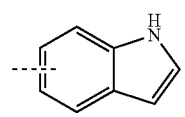

means that any linkable site on the indolyl can be connected with other groups through a chemical bond, including at least 7 connection modes of

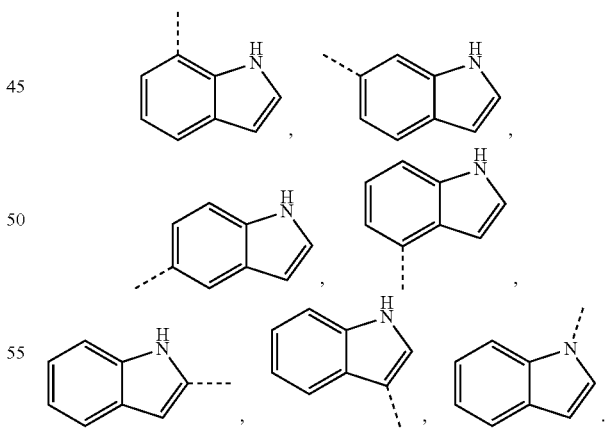

Unless otherwise specified, the term "C$_{1-6}$ alkyl" refers to a linear or branched saturated hydrocarbon group consisting of 1 to 6 carbon atoms. The C$_{1-6}$ alkyl includes C$_{1-5}$, C$_{1-4}$, C$_{1-3}$, C$_{1-2}$, C$_{2-6}$, C$_{2-4}$, C$_6$ and C$_5$ alkyl, etc. It can be monovalent (such as methyl), divalent (such as methylene) or multivalent (such as methine). Examples of C$_{1-6}$ alkyl include, but are not limited to methyl (Me), ethyl (Et), propyl (including n-propyl and isopropyl), butyl (including n-butyl, isobutyl, s-butyl, and t-butyl), pentyl (including n-pentyl, isopentyl and neopentyl), hexyl, etc.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl, etc.; it can be monovalent (such as methyl), divalent (such as methylene) or multivalent (such as methine). Examples of $C_{1-3}$ alkyl include, but are not limited to methyl (Me), ethyl (Et), propyl (including n-propyl and isopropyl), etc.

Unless otherwise specified, the term "$C_{1-3}$ alkoxy" refers to an alkyl group containing 1 to 3 carbon atoms that are connected to the rest of the molecule through an oxygen atom. The $C_{1-3}$ alkoxy includes $C_{1-2}$, $C_{2-3}$, $C_3$ and $C_2$ alkoxy, etc. Examples of $C_{1-3}$ alkoxy include, but are not limited to, methoxy, ethoxy, propoxy (including n-propoxy and isopropoxy), etc.

Unless otherwise specified, the terms "5-membered heteroaromatic ring" and "5-membered heteroaryl" are used interchangeably in the present disclosure, and the term "5-membered heteroaryl" refers to a monocyclic group with a conjugated 7t electronic system consisting of five ring atoms, of which 1, 2, 3 or 4 ring atoms are heteroatoms independently selected from O, S, and N, and the rest are carbon atoms. Wherein the nitrogen atom is optionally quaternized, the nitrogen and sulfur heteroatoms may be optionally oxidized (i.e., NO and $S(O)_p$, p is 1 or 2). The 5-membered heteroaryl can be connected to the rest of the molecule by heteroatom or carbon atom. Examples of the 5-membered heteroaryl include, but are not limited to, pyrrolyl (including N-pyrrolyl, 2-pyrrolyl, and 3-pyrrolyl, etc.), pyrazolyl (including 2-pyrazolyl and 3-pyrazolyl, etc.), imidazolyl (including N-imidazolyl, 2-imidazolyl, 4-imidazolyl and 5-imidazolyl, etc.), oxazolyl (including 2-oxazolyl, 4-oxazolyl and 5-oxazolyl, etc.), triazolyl (1H-1,2,3-triazolyl, 2H-1,2,3-triazolyl, 1H-1,2,4-triazolyl and 4H-1,2,4-triazolyl, etc.), tetrazolyl, isoxazolyl (3-isoxazolyl, 4-isoxazolyl and 5-isoxazolyl, etc.), thiazolyl (including 2-thiazolyl, 4-thiazolyl and 5-thiazolyl, etc.), furanyl (including 2-furanyl and 3-furanyl, etc.), thienyl (including 2-thienyl and 3-thienyl, etc.).

Unless otherwise specified, $C_{n-n+m}$ or $C_{n-Cn+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$, and $C_{12}$, and any range from n to n+m is also included, for example $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, and $C_{9-12}$, etc.; similarly, n membered to n+m membered means that the number of atoms on the ring is from n to n+m, for example, 3- to 12-membered ring includes 3-membered ring, 4-membered ring, 5-membered ring, 6-membered ring, 7-membered ring, 8-membered ring, 9-membered ring, 10-membered ring, 11-membered ring, and 12-membered ring, and any range from n to n+m is also included, for example, 3- to 12-membered ring includes 3- to 6-membered ring, 3- to 9-membered ring, 5- to 6-membered ring, 5- to 7-membered ring, 6- to 7-membered ring, 6- to 8-membered ring, and 6- to 10-membered ring, etc.

The term "leaving group" refers to a functional group or atom which can be replaced by another functional group or atom through a substitution reaction (such as affinity substitution reaction). For example, representative leaving groups include triflate; chlorine, bromine, and iodine; sulfonate group, such as mesylate, tosylate, p-bromobenzenesulfonate, p-toluenesulfonate and the like; acyloxy, such as acetoxy, trifluoroacetoxy and the like.

The term "protecting group" includes, but is not limited to "amino protecting group", "hydroxyl protecting group" or "mercapto protecting group". The term "amino protecting group" refers to a protecting group suitable for preventing the side reactions occurring at the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl)methyl; silyl, such as trimethylsilyl (TMS) and tert-butyldimethylsilyl (TBS), etc. The term "hydroxyl protecting group" refers to a protecting group suitable for preventing the side reactions of hydroxyl. Representative hydroxyl protecting groups include, but are not limited to: alkyl, such as methyl, ethyl, and tert-butyl; acyl, such as alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS), etc.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97).

The solvents used in the present disclosure are commercially available. The following abbreviations are used in the present disclosure: THF stands for tetrahydrofuran; DCM stands for dichloromethane; DMF stands for N,N-dimethylformamide; n-BuLi stands for n-butyllithium; NaH stands for sodium hydride; TFA stands for trifluoroacetic acid; CDI stands for N,N-carbonyldiimidazole; HOBt stands for 1-hydroxybenzotriazole; EDCI stands for 1-ethyl-(3-dimethylaminopropyl)carbodiimide; TBTU stands for O-benzotriazole-N,N,N',N'-tetramethyluronium tetrafluoroborate; HATU stands for 2-(7-azabenzotriazole)-N,N,N',N'-tetramethyluronium hexafluorophosphate; HBTU stands for O-benzotriazole-tetramethyluronium hexafluorophosphate; L-Glutamine stands for L-glutamine; TR stands for transcription repression; TA stands for transcription activation; PMA stands for phorbol 12-myristate 13-acetate; DPBS stands for Dulbecco's phosphate buffered solution; Trypsin stands for Trypsin; DMEM stands for modified Eagle's culture medium; FBS stands for fetal bovine serum; NEAA stands for non-essential amino acids; Sodium Pyruvate stands for Pyruvate Sodium; G418 Geneticin® stands for selective antibiotic (G418 sulfate); MMTV stands for mouse mammary tumor virus; Hygromycin stands for Hygromycin.

DETAILED DESCRIPTION OF THE PREFERRED EMBODIMENT

The present disclosure is described in detail by the embodiments below, but it does not mean that there are any adverse restrictions on the present disclosure. The present disclosure has been described in detail herein, and its specific embodiments have also been disclosed; for one skilled in the art, it is obvious to make various modifications and improvements to the embodiments of the present disclosure without departing from the spirit and scope of the present disclosure.

Reference embodiment 1: Synthesis of compound AA-1-6

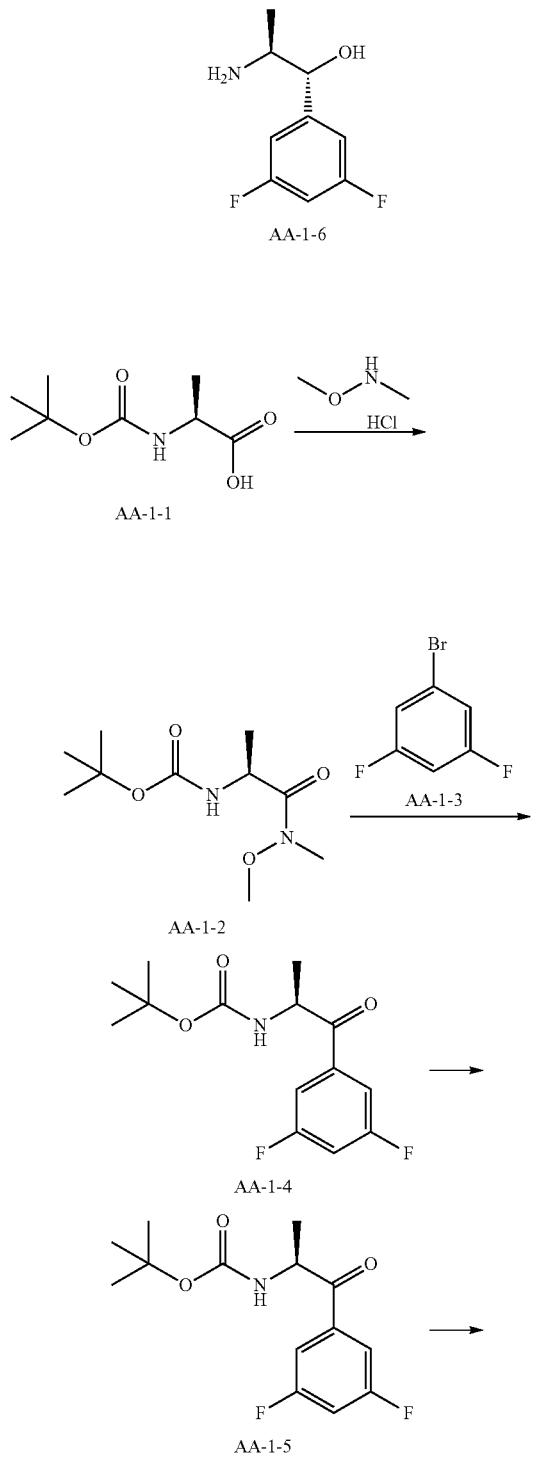

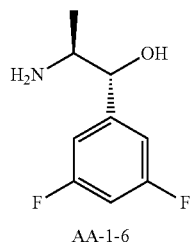

AA-1-6

Step 1: Synthesis of Compound AA-1-2

Compound AA-1-1 (10 g) was added to a dry three-necked flask, dissolved with dichloromethane (100 mL), and N,N-carbonyldiimidazole (10.72 g) was added thereto in batches, and then the addition was completed; the reaction system was replaced with nitrogen for three times, and the mixture was stirred at 25° C. for 1 hour under nitrogen atmosphere. Then, N-methyl-N-methoxyamine hydrochloride (6.44 g) was added thereto, and then triethylamine (5.35 g) was added thereto; after the addition was completed, the reaction system was replaced with nitrogen for three times, and the mixture was stirred at 25° C. for 11 hours under nitrogen atmosphere. After the reaction was completed, the reaction solution was washed successively with saturated citric acid aqueous solution (100 mL), saturated sodium bicarbonate aqueous solution (100 mL) and saturated brine (100 mL), dried over anhydrous sodium sulfate, filtered, and concentrated under reduced pressure to obtain compound AA-1-2.

MS-ESI m/z: 133.1 [M−100+H]$^+$.

Step 2: Synthesis of Compound AA-1-4

Compound AA-1-3 (270.0 g) was added to a dry three-necked flask, and the temperature was lowered to −15° C., and a solution of isopropylmagnesium chloride in tetrahydrofuran (2 mol/L, 700 mL) was slowly added dropwise thereto, and then the temperature of the mixture was maintained at −15° C. and the mixture was stirred for 2 hours. Then compound AA-1-2 (130 g) was dissolved in tetrahydrofuran (1.3 L) solution, and the above tetrahydrofuran solution was added to the reaction system (temperature not exceeding 5° C.). After the addition was completed, the reaction solution was heated to 60° C. and stirred for 1 hour. After the reaction was completed, the reaction solution was cooled to room temperature, poured into saturated ammonium chloride solution (1.5 L), stirred and the phases were separated. Ethyl acetate (1 L×2) was added to the aqueous phase for extraction, and the organic phases were combined, dried over anhydrous sodium sulfate, filtered, and concentrated under reduced pressure to obtain compound AA-1-4.

Step 3: Synthesis of Compound AA-1-5

Isopropanol (3.16 kg) and toluene (12 L) were added to a 50 L jacketed kettle, and AA-1-4 (1.15 kg) was added thereto in batches. After dissolving, aluminum isopropoxide (412.73 g) was added thereto, and the mixture was stirred at 25° C. for 1 hour, and then the temperature was raised to 55° C. and the mixture was continued to stir for 15 hours. After the reaction was completed, the reaction solution was concentrated under reduced pressure to obtain a crude product. The crude product was added with ethyl acetate (5 L), and the pH of the mixture was adjusted to 5 to 6 with 1 mol/L dilute hydrochloric acid, then the phases were separated, and the organic phase was collected. The aqueous phase was extracted with ethyl acetate (5 L×2), and the organic phases were combined, washed with saturated brine (10 L), dried over anhydrous sodium sulfate, and concentrated under reduced pressure to obtain a crude product. The crude product was transferred to a 50 L jacketed kettle, and petroleum ether (8 L) was added thereto, and the mixture was slurried at 25° C. for 16 hours; after the reaction was completed, the reaction solution was filtered, and the filter cake was rinsed with petroleum ether (5 L) in portions, and the filter cake was collected to obtain compound AA-1-5.

$^1$HNMR (400 MHz, CD$_3$OD) δ=6.98 (d, J=7.0 Hz, 2H), 6.79 (t, J=9.2 Hz, 1H), 6.55 (d, J=8.6 Hz, 1H), 4.56 (d, J=5.4 Hz, 1H), 3.75-3.63 (m, 1H), 1.37 (s, 9H), 1.06 (d, J=6.8 Hz, 3H).

Step 4: Synthesis of Compound Aa-1-6

Compound AA-1-5 (145 g) was added to a dry single-necked flask, and then hydrochloric acid/ethyl acetate (4 mol/L, 2 L) was added thereto, and the mixture was stirred at 25° C. for 12 hours. After the reaction was completed, the reaction solution was concentrated under reduced pressure, and the crude product was dissolved in ethyl acetate (1 L); the pH of the mixture was adjusted to 7 to 8 with 4 mol/L sodium hydroxide aqueous solution, and the phases were separated, and the aqueous phase was extracted with ethyl acetate (500 mL×2); the organic phases were combined, dried over anhydrous sodium sulfate, filtered, and concentrated under reduced pressure to obtain the hydrochloride of compound AA-1-6.

$^1$H NMR (400 MHz, CD$_3$OD) δ=7.04-6.97 (m, 2H), 6.84 (tt, J=2.4, 9.0 Hz, 1H), 4.70 (d, J=4.4 Hz, 1H), 3.28-3.16 (m, 1H), 1.02 (d, J=6.6 Hz, 3H).

Referring to the synthesis method of reference embodiment 1, the reference embodiments in the following table were synthesized.

| Reference embodiment | Fragment 1 | Fragment 2 | Compound structure | Compound number |
|---|---|---|---|---|
| 2 | 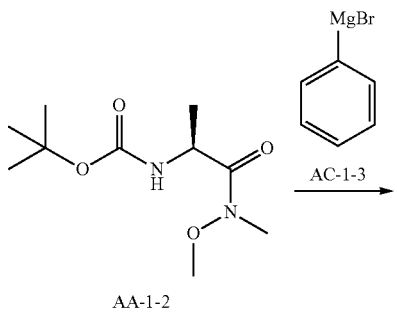 | | | AB-1-6 |

Reference embodiment 4: Synthesis of compound AC-1-6

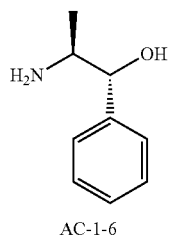

AC-1-6

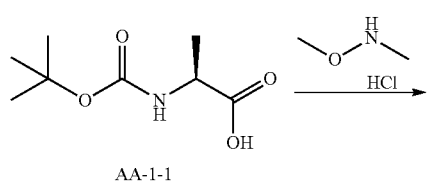
AA-1-1

-continued

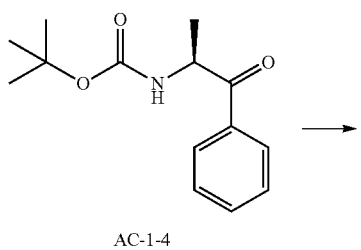
AA-1-2
AC-1-3
AC-1-4

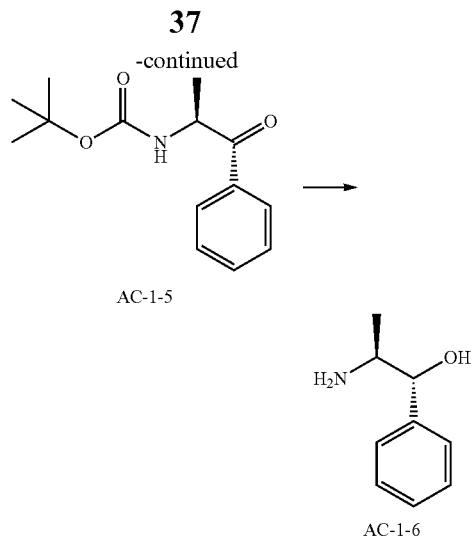

Step 1: Synthesis of Compound AA-1-2

Compound AA-1-1 (100 g) was dissolved in dichloromethane (1.0 L), and N,N'-carbonyldiimidazole (107.1 g, 660.6 mmol) was slowly added thereto at 25° C., and the mixture was stirred for 3 hours, then triethylamine (107.1 g) and N-methyl-N-methoxyamine hydrochloride (64.4 g) were added thereto, and the reaction mixture was stirred and reacted at 25° C. for 12 hours. After the reaction was completed, water (300 mL) and hydrochloric acid (1 mol/L, 100 mL) were added to the reaction system, and the phases were separated; the organic phase was collected, and the aqueous phase was extracted with dichloromethane (500 mL×3), and then the organic phases were combined, dried over sodium sulfate, filtered, and the filtrate was concentrated under reduced pressure. The crude product was separated and purified by column chromatography (eluent: petroleum ether/ethyl acetate=2/1-1/1, volume ratio) to obtain compound AA-1-2.

$^1$H NMR (400 MHz, DMSO-$d_6$) δ=7.05 (J, 1H) 4.35-4.47 (m, 1H) 3.73 (s, 3H) 3.11 (s, 3H) 1.38 (s, 9H) 1.16 (J, 3H).

Step 2: Synthesis of Compound AC-1-4

Tetrahydrofuran (50 mL) was added to a dry three-necked flask, and after the reaction system was replaced with nitrogen for 3 times, the temperature of the system was lowered to −15° C.; and compound AC-1-3 (19.51 g, 107.63 mmol) was added dropwise thereto, and compound AA-1-2 (10 g, 43.05 mmol) was added to tetrahydrofuran (150 mL), and the tetrahydrofuran solution was slowly added to the above system (the temperature was maintained at about −5° C.); the addition was completed, and the reaction was stirred at 25° C. for 12 hours. After the reaction was completed, the reaction solution was slowly poured into saturated ammonium chloride solution (50 mL), extracted with ethyl acetate (300 mL×3), and the organic phases were combined, dried over anhydrous sodium sulfate, filtered, and the filtrate was concentrated under reduced pressure to obtain compound AC-1-4.

Step 3: Synthesis of Compound AC-1-5

Compound AC-1-4 (9 g) was added to toluene (50 mL), and then isopropanol (28.2 g), aluminum isopropoxide (3.69 g) were successively added thereto, and the mixture was stirred at 25° C. for 1 hour under the protection of nitrogen, and heated to 65° C., and stirred and reacted for 12 hours. After the reaction was completed, the reaction mixture was concentrated under reduced pressure, dissolved with ethyl acetate (100 mL), slowly poured into a stirred dilute hydrochloric acid (1 mol/L, 100 mL), then the phases were separated, and the organic phase was collected, and the aqueous phase was extracted with ethyl acetate (150 mL×3); the organic phases were combined, dried over anhydrous sodium sulfate, filtered, and the filtrate was concentrated under reduced pressure to obtain compound AC-1-5.

Step 4: Synthesis of Compound AC-1-6

Compound AC-1-5 (8 g, 31.83 mmol) was dissolved in ethyl acetate (90 mL), and hydrochloric acid/ethyl acetate (4 mol/L, 30 mL) was added thereto, and the reaction mixture was stirred at 25° C. for 12 hours. After the reaction was completed, the reaction mixture was concentrated under reduced pressure. The crude product was added with methyl tert-butyl ether (100 mL), and the mixture was stirred for 1 hour, filtered, and the residual solvent in the solid was concentrated under reduced pressure to remove, then the hydrochloride of compound AC-1-6 was obtained.

$^1$H NMR (400 MHz, DMSO-$d_6$) δ=8.13 (3H, br s) 7.23-7.36 (4H, m) 7.19-7.40 (1H, m) 5.98 (1H, d, J=4.6 Hz) 4.93 (1H, t, J=3.6 Hz) 0.89 (3H, d, J=7.2 Hz).

Reference embodiment 5: Synthesis of compound AD-1-6

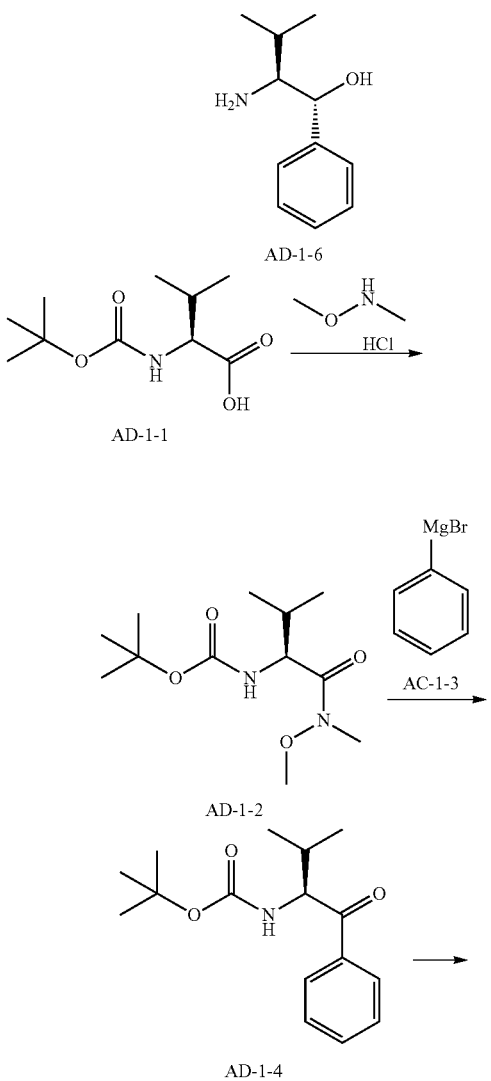

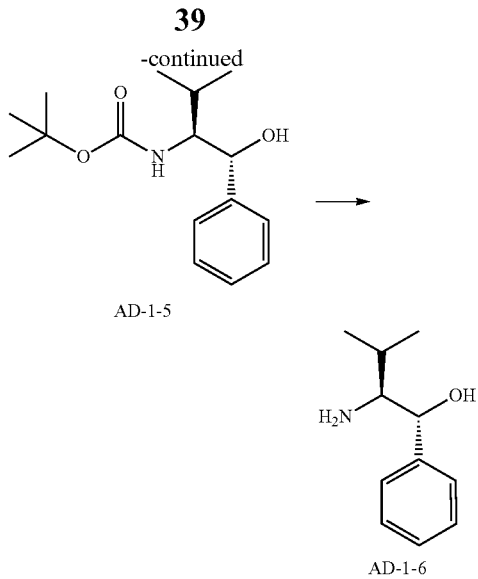

AD-1-5

AD-1-6

Step 1: Synthesis of Compound AD-1-2

Compound AD-1-1 (100 g) was dissolved in dichloromethane (1.0 L), and then N,N-carbonyldiimidazole (93.29 g) was slowly added thereto at 25° C.; after the addition was completed, the reaction mixture was stirred at 25° C. for 12 hours. Then N-methyl-N-methoxyamine hydrochloride (56.12 g) was added thereto, and finally triethylamine (58.22 g) was added thereto, and the reaction mixture was stirred at 25° C. for 6 hours under nitrogen atmosphere. After the reaction was completed, the reaction solution was washed with dilute hydrochloric acid (1 mol/L, 1 L×2), and the phases was separated. The aqueous phase was extracted with dichloromethane (1 L×2), and the organic phases were combined. The organic phase was washed with saturated sodium bicarbonate aqueous solution (1 L), washed with saturated brine (1 L), dried over anhydrous sodium sulfate, filtered, and the filtrate was concentrated under reduced pressure. The crude product was purified by column chromatography (eluent: petroleum ether/ethyl acetate=10/1-2/1, volume ratio) to obtain compound AD-1-2.

$^1$H NMR (400 MHz, DMSO-$d_6$) δ=6.78 (d, J=8.8 Hz, 1H), 4.30 (m, 1H), 3.73 (s, 3H), 3.11 (s, 3H), 1.90 (m, 1H), 1.37 (s, 9H), 0.86 (d, J=6.6 Hz, 3H), 0.83 (d, J=6.8 Hz, 3H).

Step 2: Synthesis of Compound AD-1-4

Compound AC-1-3 (3 mol/L, 96.03 mL) was added to a dry three-necked flask, and the temperature was lowered to 0° C. Then compound AD-1-2 (30 g) was dissolved in tetrahydrofuran (500 mL), and the temperature was controlled at about 5° C., and the tetrahydrofuran solution was slowly added to the above system, and the reaction mixture was stirred for 1 hour. The temperature of the reaction solution was raised to 60° C. and the mixture was continued to stir for 1 hour. After the reaction was completed, the reaction solution was slowly poured into saturated ammonium chloride aqueous solution (500 mL) to quench, and then the phases were separated, and the aqueous phase was extracted with ethyl acetate (500 mL×2). The organic phases were combined, washed with saturated brine (500 mL), dried over anhydrous sodium sulfate, filtered, and the filtrate was concentrated under reduced pressure. The crude product was separated and purified by column chromatography (eluent: petroleum ether/ethyl acetate=10/1-3/1, volume ratio) to obtain compound AD-1-4.

$^1$H NMR (400 MHz, DMSO-$d_6$) δ=8.01-7.92 (m, 2H), 7.67-7.61 (m, 1H), 7.56-7.49 (m, 2H), 4.87 (m, 1H), 2.08 (m, 1H), 1.36 (s, 9H), 0.85-0.86 (m, 3H), 0.80-0.83 (m, 3H).

Step 3: Synthesis of Compound AD-1-5

Compound AD-1-4 (33 g) was added to isopropanol (118.42 mL) and toluene (300 mL), and then aluminum isopropoxide (24.30 g) was added thereto. The reaction system was replaced with nitrogen for three times, and the reaction mixture was stirred at 25° C. for 1 hour, and then heated to 60° C. and stirred for 11 hours. After the reaction was completed, the reaction solution was concentrated under reduced pressure. Ethyl acetate (50 mL) was added to the residue, and the pH of the mixture was adjusted to 5 to 6 with hydrochloric acid (1 mol/L); after the phases were separated, the organic phase was collected. The aqueous phase was extracted with ethyl acetate (50 mL×2). The organic phases were combined, washed with saturated brine (100 mL), dried over anhydrous sodium sulfate, filtered, and the filtrate was concentrated under reduced pressure. The crude product was separated and purified by column chromatography (eluent: petroleum ether/ethyl acetate=10/1-1/1, volume ratio) to obtain compound AD-1-5.

$^1$H NMR (400 MHz, DMSO-$d_6$) δ=7.35-7.32 (m, 2H), 7.24 (t, J=7.6 Hz, 2H), 7.17 (br d, J=7.4 Hz, 1H), 6.29 (d, J=10.4 Hz, 1H), 5.25 (d, J=5.2 Hz, 1H), 4.33 (dd, J=5.2, 9.4 Hz, 1H), 3.52 (dt, J=3.2, 9.8 Hz, 1H), 2.19 (dt, J=3.2, 7.0 Hz, 1H), 1.16 (s, 9H), 0.84 (d, J=6.8 Hz, 3H), 0.80 (d, J=7.0 Hz, 3H).

Step 4: Synthesis of Compound AD-1-6

Compound AD-1-5 (31 g) was added to hydrochloric acid/ethyl acetate (4 mol/L, 200 mL), and the mixture was stirred at 25° C. for 12 hours. After the reaction was completed, the filtrate was concentrated under reduced pressure until a solid was precipitated and filtered. The filter cake was rinsed with ethyl acetate (20 mL) in portions, and the resulting solid was collected to obtain the hydrochloride of compound AD-1-6.

$^1$H NMR (400 MHz, DMSO-$d_6$) δ=7.86 (s, 2H), 7.29-7.41 (m, 5H), 6.09 (d, J=4.0 Hz, 1H), 4.96 (t, J=4.0 Hz, 1H), 3.11 (s, 1H), 1.74-1.61 (m, 1H), 0.91 (d, J=7.0 Hz, 6H).

Reference embodiment 6: Synthesis of compound AA-1

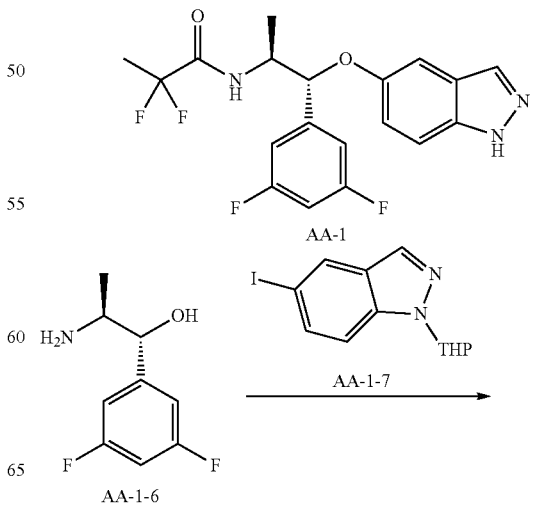

AA-1

AA-1-6

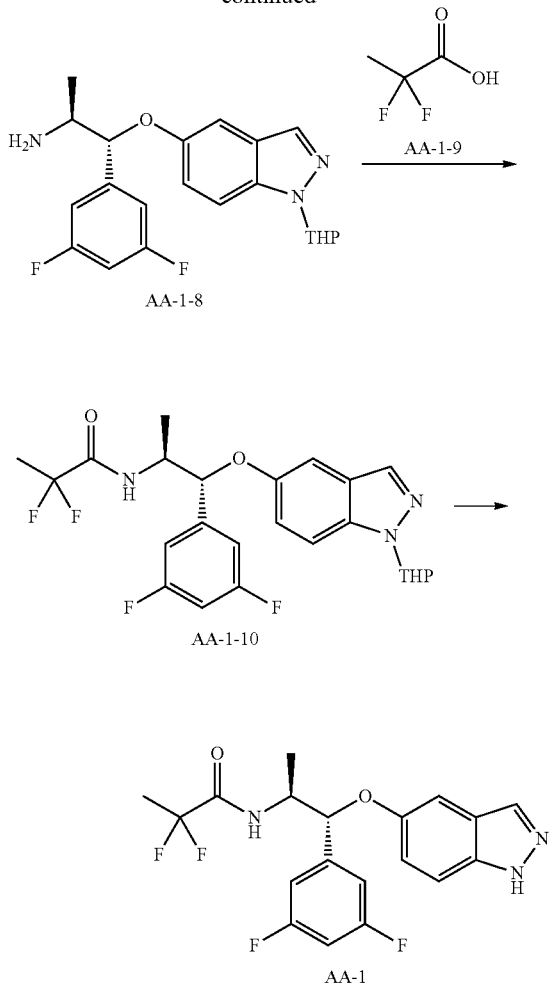

was extracted with ethyl acetate (1 L×2), and the organic phases were combined. The organic phase was washed with saturated brine, dried over anhydrous sodium sulfate, and concentrated under reduced pressure to obtain a crude product. The crude product was separated and purified by chromatographic column (mobile phase: dichloromethane/methanol=50/1-10/1, volume ratio) to obtain compound AA-1-8.

Step 2: Synthesis of Compound AA-1-10

Compound AA-1-8 (43.5 g) and N,N-dimethylformamide (450 mL) were added to a dry single-necked flask, and after the solid was fully dissolved, HOBt (30.34 g), N,N-diisopropylethylamine (29.02 g) and EDCI (64.57 g) were successively added thereto. After the addition was completed, AA-1-9 (12.36 g) was added thereto at last, and the reaction mixture was reacted at 25° C. for 12 hours. After the reaction was completed, water (400 mL) and ethyl acetate (400 mL) were added to the system, and the mixture was stirred and then the phases were separated. The aqueous phase was extracted with ethyl acetate (400 mL×2), and the organic phases were combined. The organic phase was washed with saturated brine (500 mL×5), dried over anhydrous sodium sulfate, filtered, and the filtrate was concentrated under reduced pressure. The crude product was separated and purified by column chromatography (mobile phase: petroleum ether/ethyl acetate=5/1-1/1, volume ratio) to obtain compound AA-1-10.

Step 3: Synthesis of Compound AA-1

Compound AA-1-10 (43 g) and dichloromethane (450 mL) were added to a dry flask, and the mixture was stirred until the solid was fully dissolved, and then trifluoroacetic acid (306.78 g) was added thereto. After the addition was completed, the reaction mixture was stirred at 25° C. for 12 hours. After the reaction was completed, the system was concentrated under reduced pressure to obtain a crude product. The crude product was dissolved in dichloromethane (200 mL), and the pH of the mixture was adjusted to 8 to 9 with saturated sodium bicarbonate aqueous solution, then the phases were separated, and the aqueous phase was extracted with dichloromethane (100 mL×2). The organic phases were combined, washed with saturated brine (400 mL), dried over anhydrous sodium sulfate, and concentrated under reduced pressure to obtain compound AA-1.

Step 1: Synthesis of Compound AA-1-8

Compound AA-1-6 (50 g, hydrochloride), AA-1-7 (87.65 g) and n-butyronitrile (1 L) were added to a dry reaction flask. Then, N,N-dimethylglycine (41.32 g), cesium carbonate (261.09 g) were successively added thereto, and finally cuprous iodide (25.44 g) was added thereto; the reaction system was replaced with nitrogen for three times, and the reaction mixture was stirred at 130° C. for 12 hours. After the reaction was completed, the reaction was quenched by adding water (1 L) and ammonia water (100 mL) with stirring. The phases were separated, and the aqueous phase Referring to the synthesis method of reference embodiment 6, fragment 1 was replaced with AA-1-6, and the reference embodiments in the following table were synthesized.

| Reference embodiment | Fragment 1 | Compound structure | Compound number |
|---|---|---|---|
| 7 | | | AB-1 |

-continued

| Reference embodiment | Fragment 1 | Compound structure | Compound number |
|---|---|---|---|
| 8 | | | AC-1 |
| 11 | | | AF-1 |
| 12 | | | AG-1 |

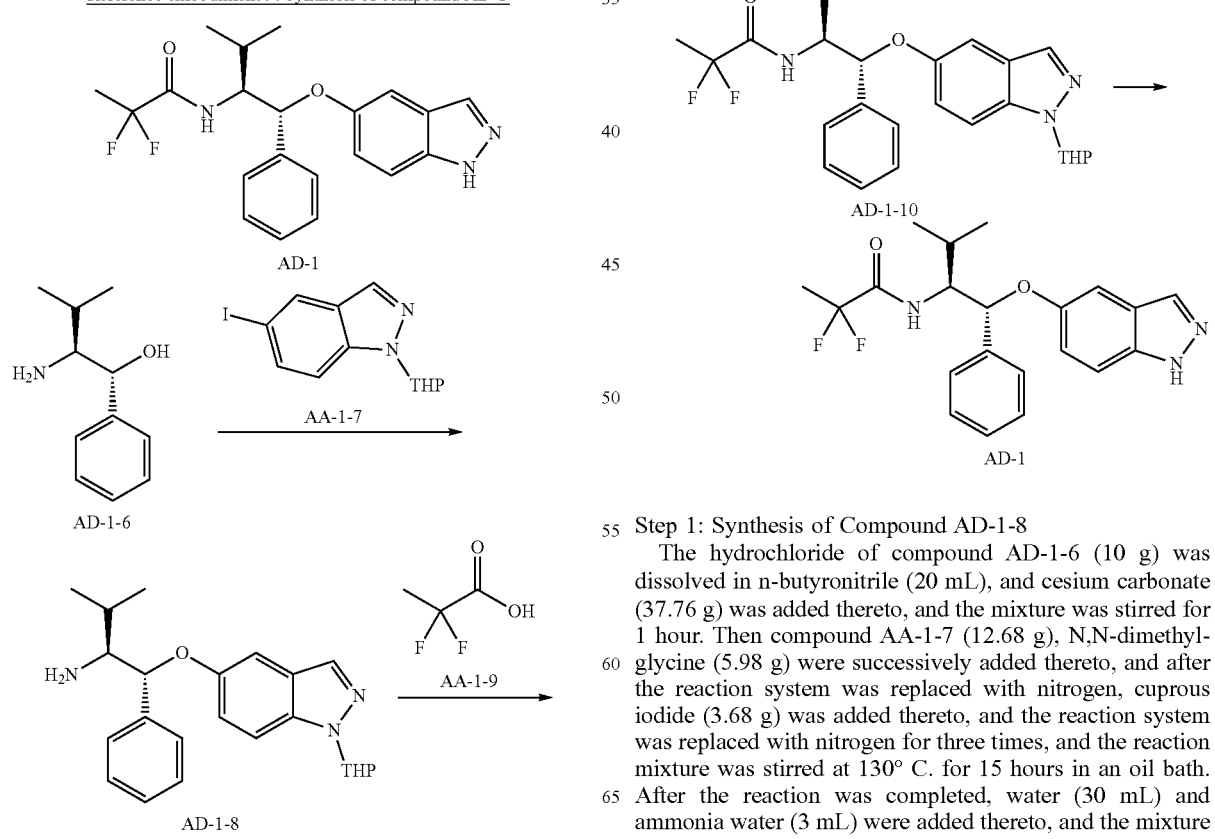

Step 1: Synthesis of Compound AD-1-8

The hydrochloride of compound AD-1-6 (10 g) was dissolved in n-butyronitrile (20 mL), and cesium carbonate (37.76 g) was added thereto, and the mixture was stirred for 1 hour. Then compound AA-1-7 (12.68 g), N,N-dimethylglycine (5.98 g) were successively added thereto, and after the reaction system was replaced with nitrogen, cuprous iodide (3.68 g) was added thereto, and the reaction system was replaced with nitrogen for three times, and the reaction mixture was stirred at 130° C. for 15 hours in an oil bath. After the reaction was completed, water (30 mL) and ammonia water (3 mL) were added thereto, and the mixture was stirred, and then the phases were separated; the organic phase was collected, and the aqueous phase was extracted with ethyl acetate (30 mL×3). The organic phases were combined, washed with saturated brine (50 mL), dried over anhydrous sodium sulfate, filtered, and the filtrate was concentrated under reduced pressure. The crude product was separated and purified by column chromatography (eluent: dichloromethane/methanol=20/1-5/1, volume ratio) to obtain compound AD-1-8.

Step 2: Synthesis of Compound AD-1-10

Compound AA-1-9 (1.28 g), HOBt (2.85 g) and N,N-diisopropylethylamine (4.09 g) were added to N,N-dimethylformamide (40 mL). Then EDCI (4.04 g) was added thereto, and finally compound AD-1-8 (4 g) was added thereto. The reaction solution was stirred at 25° C. for 16 hours. After the reaction was completed, water (80 mL) was added thereto, and the mixture was extracted with ethyl acetate (50 mL×3), and the organic phases were combined. The organic phase was washed with half-saturated brine (100 mL×3), dried over anhydrous sodium sulfate, filtered, and the filtrate was concentrated under reduced pressure. The crude product was separated and purified by flash column chromatography (eluent: petroleum ether/ethyl acetate=20/1-5/1, volume ratio) to obtain compound AD-1-10.

$^1$H NMR (400 MHz, DMSO-d$_6$) δ=8.24 (d, J=10.2 Hz, 1H), 7.91 (s, 1H), 7.58 (d, J=9.0 Hz, 1H), 7.46 (d, J=7.4 Hz, 2H), 7.31-7.25 (m, 2H), 7.23-7.17 (m, 1H), 7.10-7.05 (m, 1H), 7.00 (s, 1H), 5.73 (br d, J=7.4 Hz, 1H), 5.25 (d, J=9.4 Hz, 1H), 4.20 (dt, J=4.0, 9.6 Hz, 1H), 3.87-3.78 (m, 1H), 3.74-3.64 (m, 1H), 2.45-2.36 (m, 1H), 2.35-2.27 (m, 1H), 2.00 (m, 1H), 1.94-1.86 (m, 1H), 1.75-1.66 (m, 1H), 1.55 (d, J=3.4 Hz, 2H), 1.38 (t, J=19.4 Hz, 3H), 0.94-0.88 (m, 6H).

Step 3: Synthesis of Compound AD-1

Compound AD-1-10 (600 mg) was dissolved in dichloromethane (6 mL). Then trifluoroacetic acid (5.08 g, 3.30 mL) was added slowly dropwise to the system, and the mixture was stirred at 25° C. for 12 hours. After the reaction was completed, the reaction solution was concentrated under reduced pressure. The crude product was dissolved in dichloromethane (5 mL), and the pH of the mixture was adjusted to 8 to 9 with saturated sodium bicarbonate aqueous solution, and the phases were separated. The aqueous phase was extracted with dichloromethane (5 mL×3), and the organic phases were combined. The organic phase was washed with saturated brine (10 mL), dried over anhydrous sodium sulfate, filtered, and the filtrate was concentrated under reduced pressure. The crude product was separated and purified by column chromatography (eluent: dichloromethane:methanol=20/1-5/1, volume ratio) to obtain compound AD-1.

$^1$H NMR (400 MHz, DMSO-d$_6$) δ=12.86 (s, 1H), 8.22 (d, J=10.2 Hz, 1H), 7.86 (s, 1H), 7.47 (d, J=7.0 Hz, 1H), 7.18-7.42 (m, 5H), 7.05-6.96 (m, 2H), 5.24 (d, J=9.6 Hz, 1H), 4.19 (dt, J=3.8, 9.6 Hz, 1H), 2.40 (m, 1H), 1.43-1.33 (m, 3H), 0.91 (t, J=6.2 Hz, 6H).

Reference embodiment 13: Synthesis of compound WX026-1

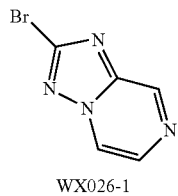

WX026-1

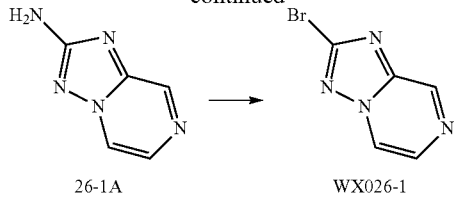

26-1A      WX026-1

Step 1: Synthesis of Compound WX026-1

Compound 26-1A (500 mg), hydrobromic acid (7.48 g, 40% aqueous solution), acetic acid (3 mL) and water (3 mL) were added to a pre-dried single-necked flask, and the mixture was cooled to 0 to 5° C., and sodium nitrite (280.83 mg) was added thereto. After the addition was completed, the reaction was carried out at 0 to 5° C. for 0.5 hours, then cuprous bromide (265.40 mg) was added thereto, and the temperature was raised to 80° C., and the reaction was continued for 12 hours. After the reaction was completed, the reaction solution was cooled to room temperature and concentrated under reduced pressure to obtain a crude product. Water (20 mL) was added to the crude product, and the mixture was extracted with ethyl acetate (20 mL×3). The organic phases were combined, washed with saturated brine (50 mL×2), dried over anhydrous sodium sulfate, filtered, and concentrated under reduced pressure to obtain a crude product. The crude product was separated and purified by thin layer chromatography (developing solvent: petroleum ether/ethyl acetate=5/1, volume ratio) to obtain compound WX026-1.

$^1$H NMR (400 MHz, DMSO-d$_6$) δ=9.40 (d, J=1.6 Hz, 1H), 9.11 (dd, J=1.4, 4.5 Hz, 1H), 8.34 (d, J=4.6 Hz, 1H).

MS-ESI m/z: 198.9/200.9 [M+H]$^+$.

Reference embodiment 14: Synthesis of compound WX027-1

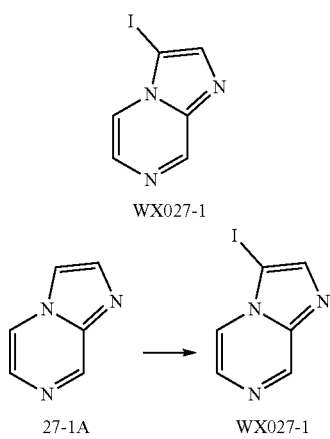

Step 1: Synthesis of Compound WX027-1

Compound 27-1A (100 mg), N-iodosuccinimide (207.75 mg) were added to a pre-dried thumb bottle, and dissolved with dichloromethane (1 mL), and then acetic acid (252.06 mg) was added thereto at 0° C. After the addition was completed, the reaction mixture was stirred at 20° C. for 16 hours. After the reaction was completed, the reaction solution was diluted with water (5 mL), extracted with dichloromethane (5 mL×3), and the organic phases were combined. The organic phase was washed with saturated brine (10 mL×3), dried over anhydrous sodium sulfate, filtered, and concentrated under reduced pressure to obtain a crude product. The crude product was separated and purified by thin layer chromatography silica gel plate (developing solvent: dichloromethane/methanol=10/1, volume ratio) to obtain compound WX027-1.

MS-ESI m/z: 245.9 [M+1]$^+$.

Reference embodiment 15: Synthesis of compound WX028-1

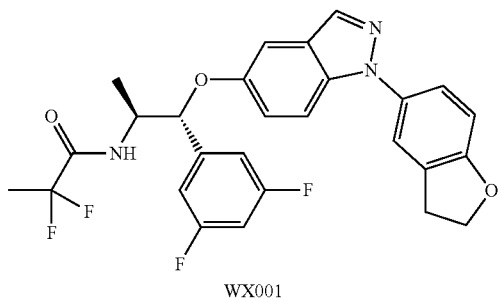

Step 1: Synthesis of Compound WX028-1

Compound 28-1A (0.9 g), malonaldehyde bis(dimethyl acetal) (1.83 g) and ethanol (10 mL) were added to a pre-dried round-bottomed flask, and then acetic acid (3.34 g) was added thereto, and the reaction solution was stirred at 100° C. for 16 hours. After the reaction was completed, the reaction solution was concentrated under reduced pressure to obtain a crude product. The crude product was added to water (30 mL), and the mixture was extracted with ethyl acetate (30 mL×3), and the organic phases were combined. The organic phase was washed with saturated brine (50 mL), dried over anhydrous sodium sulfate, filtered, and concentrated under reduced pressure to obtain a crude product. The crude product was separated by flash column chromatography (eluent: petroleum ether/ethyl acetate=1/0-3/1, volume ratio) to obtain compound WX028-1.

$^1$H NMR (400 MHz, CDCl$_3$) δ=8.54 (dd, J=0.76, 7.04 Hz, 1H), 8.43 (dd, J=1.64, 4.02 Hz, 1H), 7.17-7.23 (m, 1H), 6.68 (s, 1H).

MS-ESI m/z: 199.7 [M+1]$^+$.

Embodiment 1: Synthesis of compound WX001

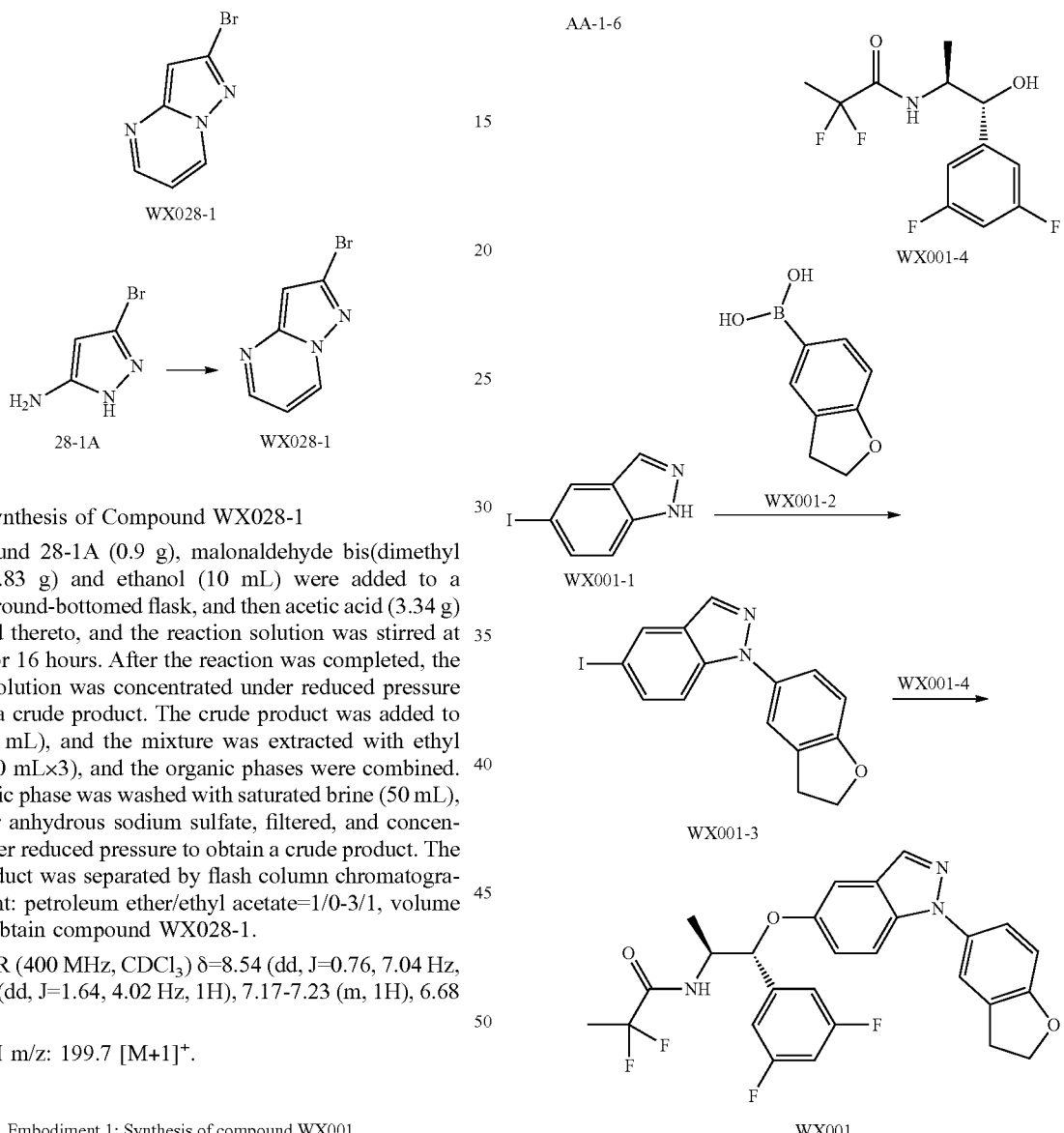

Step 1: Synthesis of Compound WX001-4

Compound AA-1-6 (30 g), and AA-1-9 (17.64 g) were added to a pre-dried three-necked flask, and dissolved with N,N-dimethylformamide (80 mL), and then HOBt (43.31 g), EDCI (61.45 g) and N,N-diisopropylethylamine (62.14 g) were successively added thereto slowly, and the reaction mixture was reacted at 30° C. for 12 hours. After the reaction was completed, saturated brine (100 mL) and ethyl acetate (150 mL) were added to the reaction solution, and the mixture was stirred and the phases were separated, and then the organic phase was collected. The organic phase was dried over anhydrous sodium sulfate, filtered, and concentrated under reduced pressure to obtain compound WX001-4.

MS-ESI m/z: 280.1[M+H]$^+$.

Step 2: Synthesis of Compound WX001-3

Compound WX001-1 (111.62 mg), compound WX001-2 (50.0 mg), copper acetate (110.77 mg), pyridine (48.24 mg) and dichloromethane (3 mL) were added to a pre-dried thumb bottle. The reaction bottle was in an open state and the reaction was carried out for 15 hours. After the reaction was completed, water (10 mL) was added to the reaction solution, and the mixture was extracted with ethyl acetate (10 mL×3), and the organic phases were combined. The organic phase was washed with saturated brine (30 mL), dried over anhydrous sodium sulfate, filtered, and concentrated under reduced pressure to obtain a crude product. The crude product was separated and purified by preparative thin layer chromatography (developing solvent: petroleum ether/ethyl acetate=5/1, volume ratio) to obtain compound WX001-3.

$^1$H NMR (400 MHz, CDCl$_3$) S=8.17-8.10 (m, 1H), 8.06 (s, 1H), 7.61 (dd, J=1.6, 8.8 Hz, 1H), 7.44 (s, 1H), 7.39 (d, J=8.8 Hz, 1H), 7.34 (dd, J=2.4, 8.5 Hz, 1H), 6.90 (d, J=8.4 Hz, 1H), 4.67 (t, J=8.6 Hz, 2H), 3.30 (t, J=8.7 Hz, 2H).

MS-ESI m/z: 363.0[M+H]$^+$.

Step 3: Synthesis of Compound WX001

Compound WX001-3 (50 mg), compound WX001-4 (60 mg), cuprous iodide (15.78 mg), cesium carbonate (161.94 mg), N,N-dimethylglycine (39.01 mg) and n-butyronitrile (5 mL) were added to a pre-dried thumb bottle. The temperature was raised to 130° C. and the reaction mixture was stirred for 12 hours under nitrogen atmosphere. After the reaction was completed, the reaction solution was cooled to room temperature, and water (10 mL) was added thereto, and the mixture was extracted with ethyl acetate (10 mL×3). The organic phases were combined, washed with saturated brine (20 mL), dried over anhydrous sodium sulfate, filtered, and concentrated under reduced pressure. The crude product was separated and purified by preparative HPLC (column type: Phenomenex Luna C18 150 mm×25 mm 5 µm; mobile phase: [H$_2$O (0.05% HCl)-ACN]; B(ACN) %: 45%-65%, 12 min) to obtain compound WX001.

$^1$H NMR (400 MHz, CDCl$_3$) S=7.96 (s, 1H), 7.52 (d, J=9.0 Hz, 1H), 7.44 (s, 1H), 7.33 (dd, J=2.0, 8.4 Hz, 1H), 7.11 (dd, J=2.2, 9.0 Hz, 1H), 7.00-6.93 (m, 2H), 6.91 (d, J=2.2 Hz, 1H), 6.89 (d, J=8.4 Hz, 1H), 6.75 (tt, J=2.2, 8.8 Hz, 1H), 6.69 (d, J=8.6 Hz, 1H), 5.35 (d, J=2.8 Hz, 1H), 4.66 (t, J=8.6 Hz, 2H), 4.43-4.33 (m, 1H), 3.29 (t, J=8.8 Hz, 2H), 1.77 (t, J=19.4 Hz, 3H), 1.24 (d, J=6.8 Hz, 3H).

MS-ESI m/z: 514.0 [M+H]$^+$.

Embodiment 2: Synthesis of compound WX002

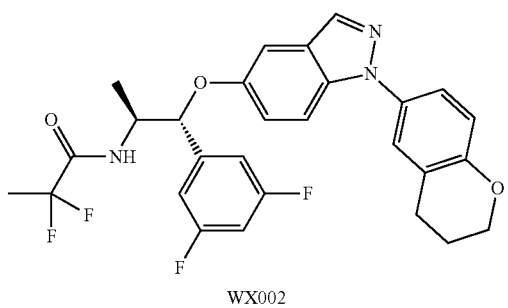

WX002

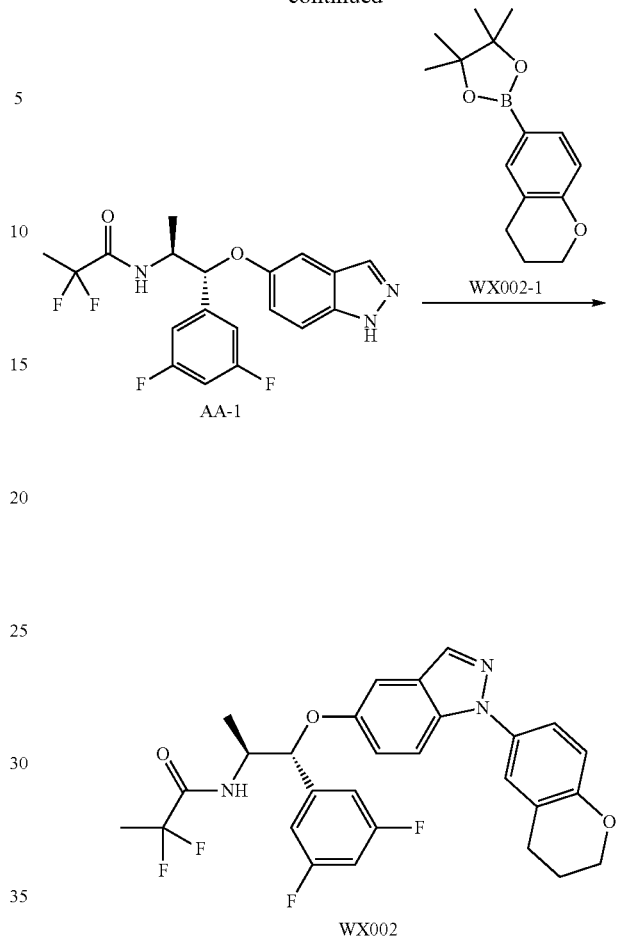

Compound AA-1 (70 mg), compound WX002-1 (50.20 mg), copper acetate (64.32 mg), pyridine (28.01 mg) and N,N-dimethylformamide (2 mL) were added to a pre-dried thumb bottle, and the reaction mixture was reacted at 60° C. for 12 hours with the condenser tube open. After the reaction was completed, the reaction solution was cooled to room temperature, and ice water (10 mL) was added thereto, and the mixture was extracted with ethyl acetate (10 mL×3). The organic phases were combined, washed with saturated brine (20 mL), dried over anhydrous sodium sulfate, filtered, and concentrated under reduced pressure to obtain a crude product. The crude product was separated and purified by preparative HPLC (column type: Phenomenex Luna C18 150 mm×25 mm 5 µm; mobile phase: [H$_2$O (0.05% HCl)-ACN]; B(ACN) %: 50%-70%, 12 min) to obtain compound WX002.

$^1$H NMR (400 MHz, CDCl$_3$) δ=7.98 (s, 1H), 7.54 (d, J=9.0 Hz, 1H), 7.37-7.28 (m, 2H), 7.12 (d, J=8.8 Hz, 1H), 6.96 (d, J=5.7 Hz, 2H), 6.91 (d, J=6.4 Hz, 2H), 6.75 (t, J=8.8 Hz, 1H), 6.69 (d, J=8.2 Hz, 1H), 5.36 (s, 1H), 4.45-4.33 (m, 1H), 4.26-4.22 (m, 2H), 2.86 (t, J=6.2 Hz, 2H), 2.09-2.02 (m, 2H), 1.77 (t, J=19.4 Hz, 3H), 1.24 (d, J=6.8 Hz, 3H).

MS-ESI m/z: 528.3 [M+H]$^+$.

Referring to the synthesis method of embodiment 2, fragment 1 was replaced with WX002-1, fragment 2 was replaced with AA-1, and the embodiments in the following table were synthesized.

| Embodiment | Fragment 1 | Fragment 2 | Compound structure | Compound number |
|---|---|---|---|---|
| 3 | | AA-1 | | WX003 |
| 4 | | AD-1 | | WX004 |
| 5 | | AD-1 | | WX005 |
| 6 | | AD-1 | | WX006 |
| 7 | | AD-1 | | WX007 |
| 8 | | AD-1 | | WX008 |

-continued
| Embodiment | Fragment 1 | Fragment 2 | Compound structure | Compound number |
|---|---|---|---|---|
| 9 | 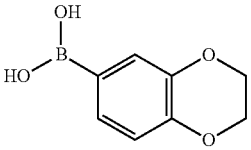 [SMILES: OB(O)c1ccc2c(c1)OCCO2] | AD-1 | 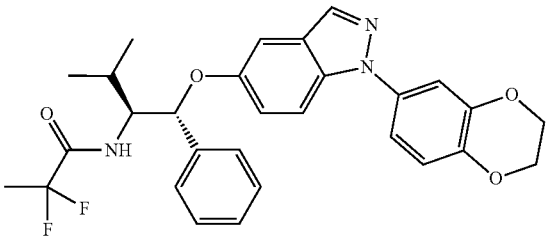 [SMILES: CC(C)[C@H](NC(=O)C(C)(F)F)[C@H](Oc1ccc2c(cnn2-c2ccc3c(c2)OCCO3)c1)c1ccccc1] | WX009 |
| 12 | 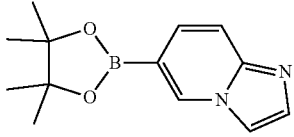 [SMILES: CC1(C)OB(c2ccc3nccn3c2)OC1(C)C] | AC-1 | 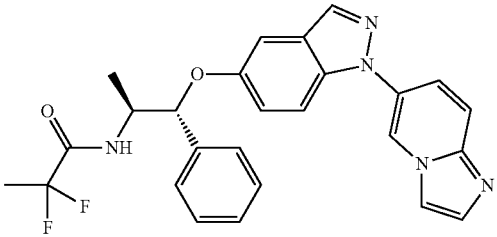 [SMILES: C[C@H](NC(=O)C(C)(F)F)[C@H](Oc1ccc2c(cnn2-c2ccc3nccn3c2)c1)c1ccccc1] | WX012 |
| 13 | 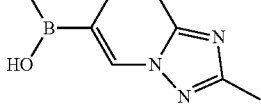 | AA-1 | 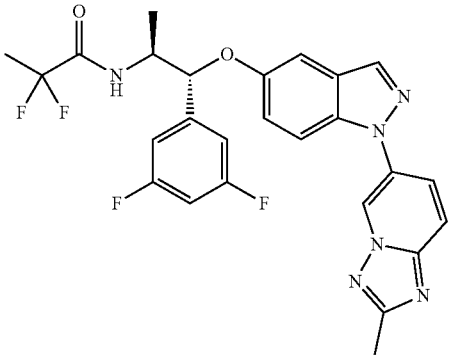 [SMILES: Cc1nc2ccc(-n3ncc4cc(O[C@H](c5cc(F)cc(F)c5)[C@H](C)NC(=O)C(C)(F)F)ccc43)cn2n1] | WX013 |
| 14 | 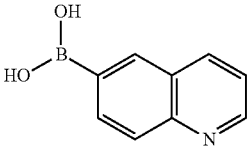 [SMILES: OB(O)c1ccc2ncccc2c1] | AA-1 | 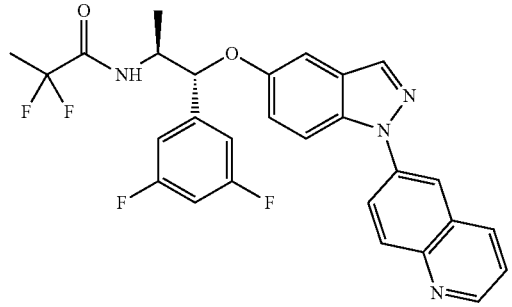 [SMILES: C[C@H](NC(=O)C(C)(F)F)[C@H](Oc1ccc2c(cnn2-c2ccc3ncccc3c2)c1)c1cc(F)cc(F)c1] | WX014 |

Embodiment 15: Synthesis of compound WX015

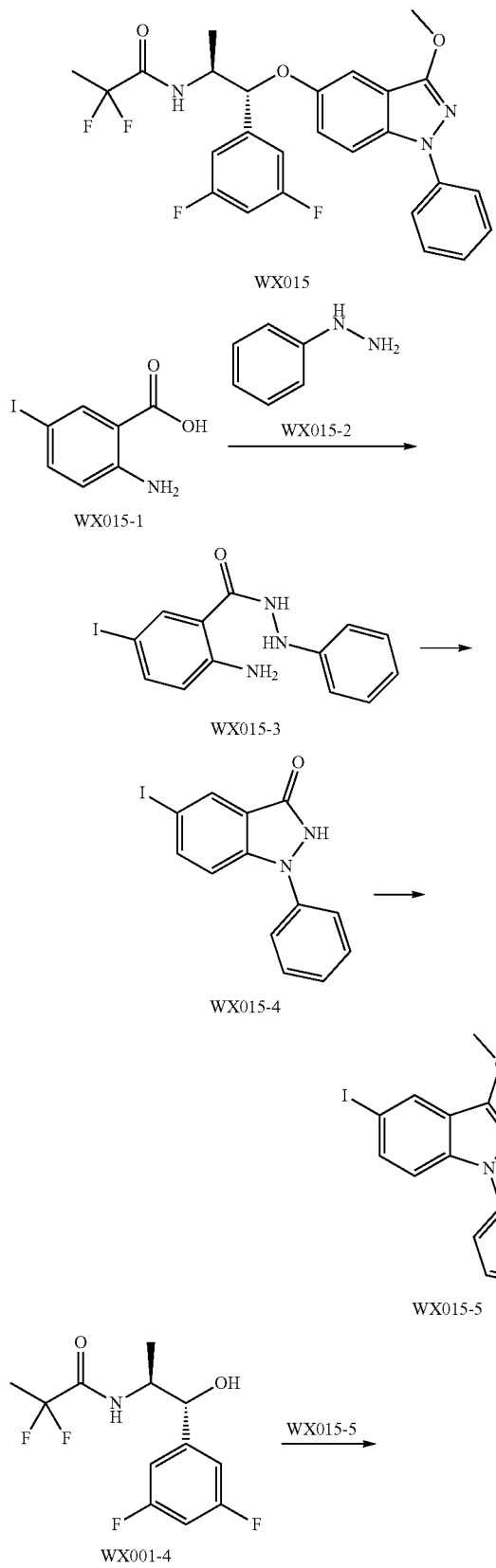

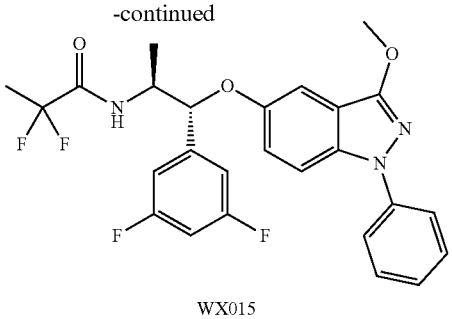

WX015

Step 1: Synthesis of Compound WX015-3

Compound WX015-1 (12.18 g) and dichloromethane (100 mL) were added to a pre-dried single-necked flask, and after the mixture was stirred until the solid was dissolved, compound WX015-2 (5.01 g) and N,N-carbonyldiimidazole (7.51 g) were added thereto, and the mixture was continued to stir at 20° C. for 10 minutes. After the reaction was completed, water (100 mL) was added to the reaction solution, and a solid was precipitated. The mixture was filtered and dried under vacuum to obtain compound WX015-3.

MS-ESI m/z: 354.1 [M+H]$^+$.

Step 2: Synthesis of Compound WX015-4

Compound WX015-3 (1 g) was added to a pre-dried three-necked flask, dissolve with a mixed solution of ethanol (5 mL) and dilute hydrochloric acid (1 mol/L, 5 mL), and the mixture was slowly heated from 20° C. to 76° C. and reacted for 10 minutes, and then a solution of sodium nitrite (0.586 g) dissolved in water (1.5 mL) was added thereto, and the reaction mixture was heated and stirred at 76° C. for 1 hour. After the reaction was completed, water (25 mL) was added to the reaction solution to dilute, and a solid was precipitated; the mixture was filtered, and the filter cake was concentrated under reduced pressure to obtain a crude product. The crude product was purified by slurrying (petroleum ether/ethyl acetate=10/1, volume ratio) to obtain compound WX015-4.

MS-ESI m/z: 337.0 [M+H]$^+$.

Step 3: Synthesis of Compound WX015-5

Compound WX015-4 (400 mg) was added to a pre-dried thumb bottle, and dissolved with dimethyl sulfoxide (1 mL), and then potassium carbonate (493.42 mg) and iodomethane (506.74 mg) were added thereto. The reaction mixture was stirred at 30° C. for 2 hours. After the reaction was completed, the reaction solution was diluted with water (3 mL), extracted with ethyl acetate (3 mL×3), and the organic phases were combined, washed with saturated brine (10 mL), dried over anhydrous sodium sulfate, filtered, and concentrated under reduced pressure to obtain a crude product. The crude product was separated and purified by column chromatography (eluent: petroleum ether/ethyl acetate=15/1-1/1, volume ratio) to obtain compound WX015-5.

MS-ESI m/z: 351.0 [M+H]$^+$.

Step 4: Synthesis of Compound WX015.

Compound WX001-4 (80 mg) was added to a pre-dried thumb bottle, and dissolved with toluene (1 mL), and then cesium carbonate (223.32 mg), 3,4,7,8-tetramethyl-1,10-phenanthroline (64.79 mg), cuprous iodide (21.76 mg) and compound WX015-5 (70.18 mg) were added thereto; the reaction mixture was stirred at 85° C. for 6 hours, and then heated to 110° C. and continued to stir for 10 hours. After the reaction was completed, water (5 mL) was added to the reaction solution to dilute, and the mixture was extracted with ethyl acetate (5 mL×2), and the organic phases were combined. The organic phase was washed with saturated brine (15 mL), dried over anhydrous sodium sulfate, filtered, and concentrated under reduced pressure to obtain a crude product. The crude product was separated and purified by preparative HPLC (column type: Phenomenex Luna C18 150 mm×25 mm 5 μm; mobile phase: [H₂O (0.05% HCl)-ACN]; B(ACN) %: 60%-75%, 12 min) to obtain compound WX015.

$^1$H NMR (400 MHz, CDCl$_3$) δ=7.64 (d, J=7.8 Hz, 2H) 7.58 (d, J=9.0 Hz, 1H) 7.48 (t, J=7.8 Hz, 2H) 7.22-7.26 (m, 1H) 7.13 (dd, J=9.0, 2.2 Hz, 1H) 6.97 (d, J=6.0 Hz, 2H) 6.89 (d, J=1.8 Hz, 1H) 6.76 (t, J=8.82 Hz, 1H) 6.64 (d, J=7.6 Hz, 1H) 5.36 (d, J=2.8 Hz, 1H) 4.35-4.43 (m, 1H) 4.11 (s, 3H) 1.78 (t, J=19.2 Hz, 3H) 1.24 (d, J=6.8 Hz, 3H).

MS-ESI m/z: 502.2 [M+H]$^+$.

Embodiment 17: Synthesis of compound WX017

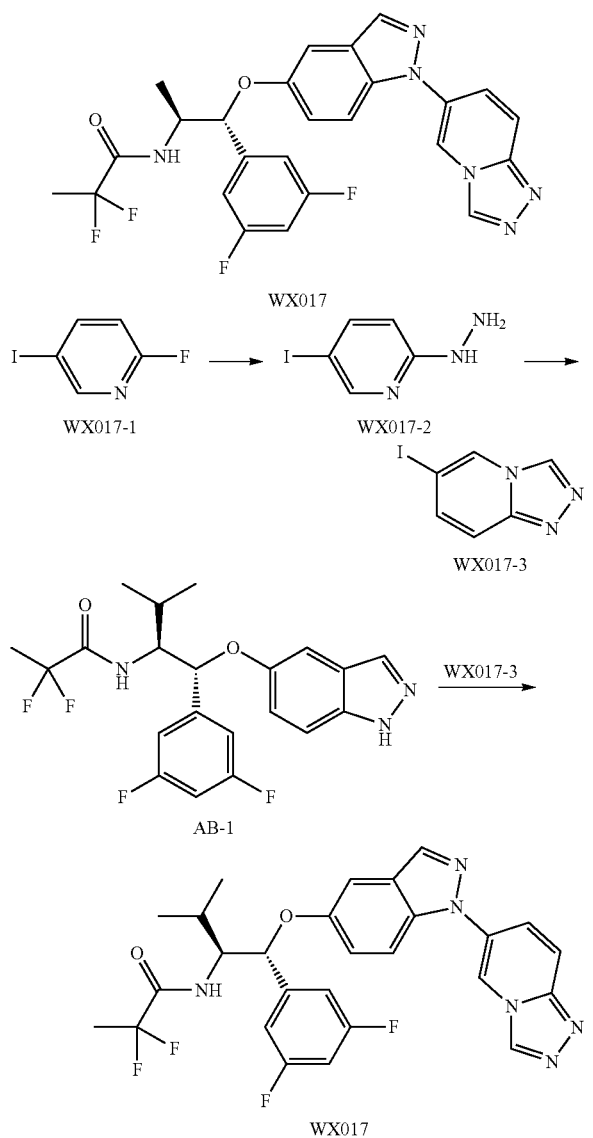

Step 1: Synthesis of Compound WX017-2

Compound WX017-1 (5 g) and ethanol (50 mL) were added to a pre-dried round bottom flask, and then hydrazine hydrate (5.73 g, 98% content) was added thereto, and the mixture was stirred at 80° C. for 2 hours, and then heated to 100° C. and continued to stir for 6 hours. After the reaction was completed, the reaction solution was cooled to about 10° C., and a large amount of solid was precipitated; the mixture was filtered, and the filter cake was rinsed with ethanol. The filter cake was dried under vacuum to obtain compound WX017-2.

MS-ESI m/z: 236.0 [M+H]$^+$.

Step 2: Synthesis of Compound WX017-3

Compound WX017-2 (5 g) was added to a dry single-necked flask, dissolved with dichloromethane (50 mL), and then trimethyl orthoformate (9.03 g) and trifluoroacetic acid (2.43 g) were added thereto, and the reaction was carried out at 20° C. under stirring for 2 hours. After the reaction was completed, water (20 mL) was added to the reaction solution, and the pH of the mixture was adjusted to 9 to 10 with potassium carbonate solid, and a large amount of solid was precipitated. The reaction solution was filtered, the filter cake was rinsed with dichloromethane, and dried under vacuum to obtain compound WX017-3.

MS-ESI m/z: 245.9 [M+H]$^+$.

Step 3: Synthesis of Compound WX017

Compound AB-1 (300 mg), WX017-3 (260.41 mg), potassium phosphate (300.80 mg), cuprous oxide (56.36 mg) and N,N-dimethylacetamide (3 mL) were added to a pre-dried thumb bottle, and the reaction was carried out at 140° C. for 16 hours. After the reaction was completed, water (50 mL) was added to the reaction solution, and the mixture was extracted with ethyl acetate (50 mL); after the phases were separated, the organic phase was collected. The aqueous phase was extracted with ethyl acetate (20 mL×2), and the organic phases were combined. The organic phase was washed with saturated brine (50 mL), dried over anhydrous sodium sulfate, and concentrated under reduced pressure to obtain a crude product. The crude product was separated and purified by thin layer chromatography (developing agent: ethyl acetate) and then purified by preparative HPLC (column type: Phenomenex Luna C18 150 mm×25 mm 5 μm; mobile phase: [H₂O (0.05% HCl)-ACN]; B(ACN) %: 40%-45%, 12 min) to obtain compound WX017.

$^1$H NMR (400 MHz, CD$_3$OD) δ=9.53 (s, 1H), 9.33 (s, 1H), 8.61 (d, J=9.80 Hz, 1H), 8.25 (s, 1H), 8.21 (d, J=9.92 Hz, 1H), 7.94 (d, J=9.16 Hz, 1H), 7.34 (dd, J=2.2, 9.2 Hz, 1H), 7.27 (d, J=2.2 Hz, 1H), 7.12 (d, J=6.0 Hz, 2H), 6.82-6.88 (m, 1H), 5.35 (d, J=9.2 Hz, 1H), 4.36 (dt, J=4.4, 9.6 Hz, 1H), 2.38-2.53 (m, 1H), 1.56 (t, J=19.0 Hz, 3H), 1.03 (t, J=7.4 Hz, 6H).

MS-ESI m/z: 541.2 [M+H]$^+$.

Embodiment 18: Synthesis of compound WX018

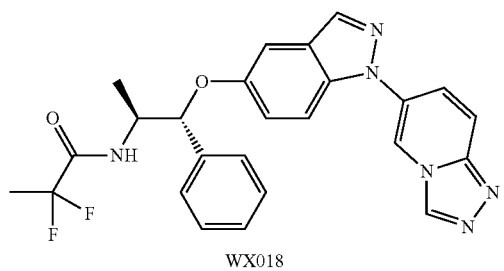

-continued

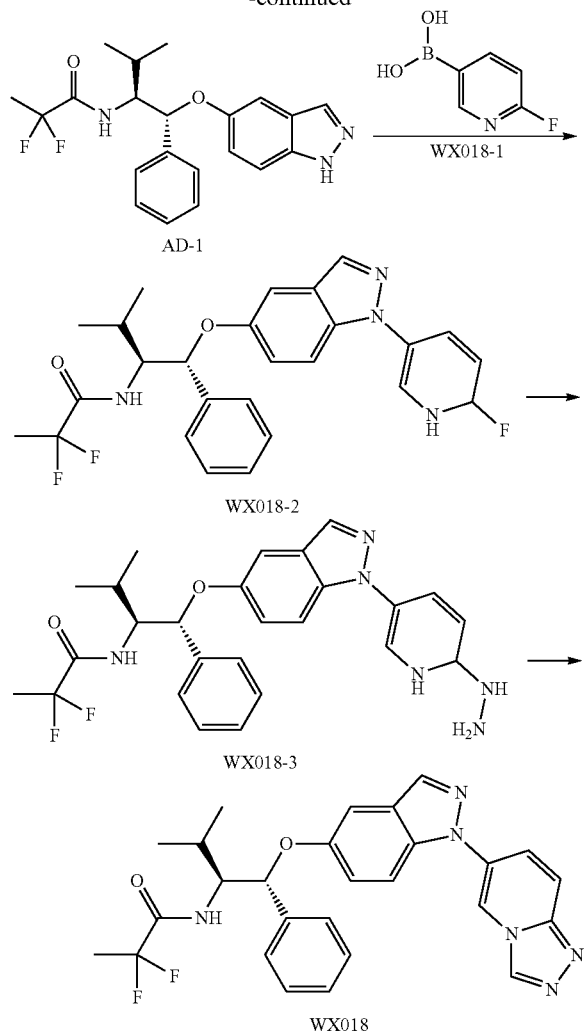

Step 1: Synthesis of Compound WXO18-2

Compound AD-1 (4 g) was added to a pre-dried single-necked flask, dissolved with N,N-dimethylformamide (40 mL), and then copper acetate (3.75 g), compound WX018-1 (2.91 g) and pyridine (2.45 g) were added thereto. The reaction mixture was stirred under the protection of oxygen (15 psi) at 60° C. for 16 hours. After the reaction was completed, the reaction solution was poured into water (50 mL) and ammonia water (50 mL), and the mixture was extracted with ethyl acetate (50 mL×3), and the organic phases were combined. The organic phase was washed with saturated brine (100 mL), dried over anhydrous sodium sulfate, filtered, and concentrated under reduced pressure. The crude product was purified by column chromatography (eluent: petroleum ether/ethyl acetate=1/0-9/1, volume ratio) to obtain compound WX018-2.

$^1$H NMR (400 MHz, CDCl$_3$) δ=8.48 (d, J=1.4 Hz, 1H) 7.99-8.05 (m, 1H) 7.93 (s, 1H) 7.84-7.90 (m, 1H) 7.45 (d, J=9.2 Hz, 1H) 7.18-7.36 (m, 5H) 6.99-7.00 (m, 2H) 6.24 (d, J=10.0 Hz, 1H) 5.20 (d, J=5.8 Hz, 1H) 4.34 (dt, J=10.4, 5.2 Hz, 1H) 1.98-2.08 (m, 1H) 1.59 (t, J=19.4 Hz, 3H) 0.95 (dd, J=6.6, 4.4 Hz, 6H).

Step 2: Synthesis of Compound WX018-3

Compound WX018-2 (300 mg) was added to a pre-dried thumb bottle, dissolved with ethanol (3 mL), and then hydrazine hydrate (158.81 mg, 98% content) was added thereto, and the mixture was stirred at 80° C. for 20 hours. After the reaction was completed, the reaction solution was concentrated under reduced pressure to obtain compound WX018-3.

Step 3: Synthesis of Compound WX018

Compound WX018-3 (300 mg) was added to a pre-dried thumb bottle, dissolved with dichloromethane (3 mL), and then trimethyl orthoformate (257.50 mg) and trifluoroacetic acid (69.17 mg) were added thereto. The reaction mixture was stirred at 20° C. for 8 hours. After the reaction was completed, the reaction solution was added with water (5 mL), extracted with dichloromethane (5 mL×3), and the organic phases were combined. The organic phase was washed with saturated brine (15 mL×3), dried over anhydrous sodium sulfate, filtered, and concentrated under reduced pressure to obtain a crude product. The crude product was separated and purified by preparative HPLC (column type: Luna C18 100 mm×30 mm 5 μm; mobile phase: [H$_2$O (0.05% HCl)-ACN]; B(ACN) %: 38%-52%, 10 min) to obtain compound WX018.

$^1$H NMR (400 MHz, CD$_3$OD) δ=9.36 (s, 1H) 9.09 (s, 1H) 8.21-8.26 (m, 1H) 8.11-8.16 (m, 1H) 8.02 (d, J=9.8 Hz, 1H) 7.80 (d, J=9.2 Hz, 1H) 7.48 (d, J=7.4 Hz, 2H) 7.27-7.33 (m, 2H) 7.23-7.26 (m, 2H) 7.20 (d, J=1.8 Hz, 1H) 5.31 (d, J=9.0 Hz, 1H) 4.35-4.44 (m, 1H) 2.40-2.50 (m, 1H) 1.40 (t, J=19.0 Hz, 3H) 1.02 (dd, J=6.8, 4.6 Hz, 6H).

MS-ESI W/z: 505.1 [M+1]$^+$.

Referring to the synthesis method of embodiment 18, fragment 1 was replaced with WX018-1, fragment 2 was replaced with AD-1, and the embodiments in the following table were synthesized.

| Embodiment | Fragment 1 | Fragment 2 | Compound structure | Compound number |
|---|---|---|---|---|
| 19 | ![HO-B(OH)-pyridine-F] | AA-1 | [structure] | WX019 |

| Embodiment | Fragment 1 | Fragment 2 | Compound structure | Compound number |
|---|---|---|---|---|
| 20 | | AD-1 | | WX020 |
| 22 | | AC-1 | | WX022 |
| 23 | | AA-1 | | WX023 |

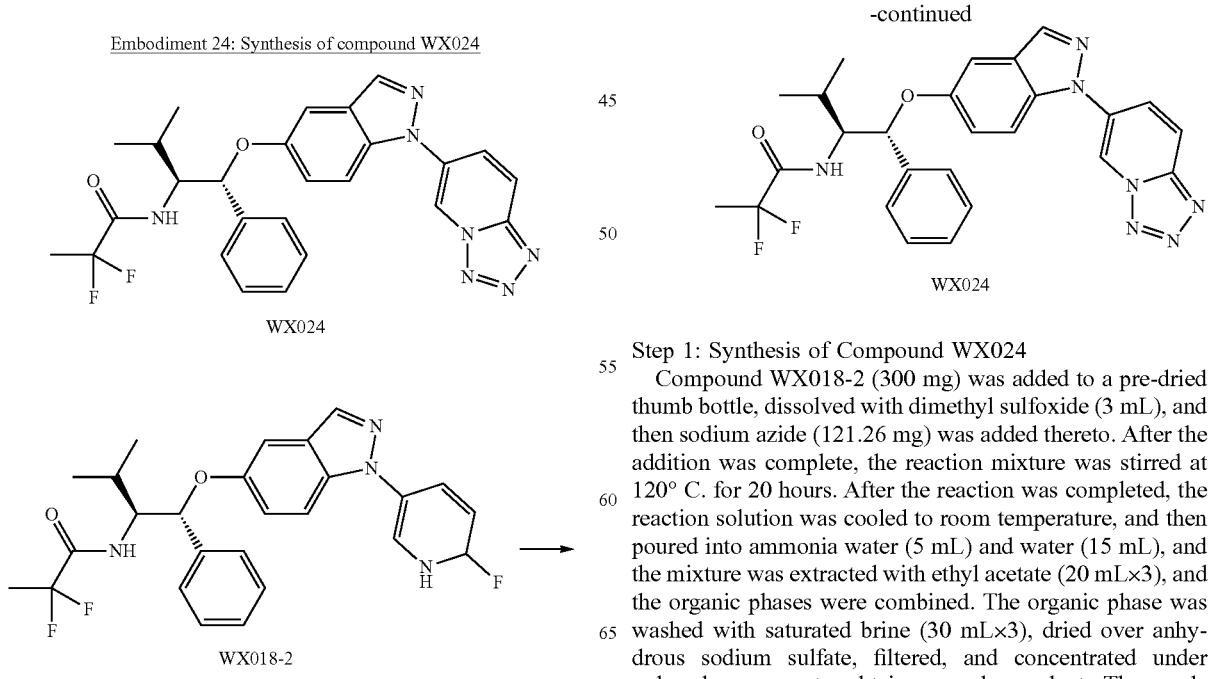

Step 1: Synthesis of Compound WX024

Compound WX018-2 (300 mg) was added to a pre-dried thumb bottle, dissolved with dimethyl sulfoxide (3 mL), and then sodium azide (121.26 mg) was added thereto. After the addition was complete, the reaction mixture was stirred at 120° C. for 20 hours. After the reaction was completed, the reaction solution was cooled to room temperature, and then poured into ammonia water (5 mL) and water (15 mL), and the mixture was extracted with ethyl acetate (20 mL×3), and the organic phases were combined. The organic phase was washed with saturated brine (30 mL×3), dried over anhydrous sodium sulfate, filtered, and concentrated under reduced pressure to obtain a crude product. The crude product was separated and purified by preparative HPLC. Separation conditions: (column type: Luna C18 100 mm×30 mm 5 μm; mobile phase: [H₂O (0.05% HCl)-ACN]; B(ACN) %: 45%-70%, 10 min) to obtain compound WX024.

¹H NMR (400 MHz, CDCl₃) δ=9.17 (s, 1H) 8.22-8.26 (m, 1H) 8.15-8.19 (m, 1H) 8.09 (s, 1H) 7.67 (d, J=9.0 Hz, 1H) 7.37-7.45 (m, 4H) 7.31-7.36 (m, 1H) 7.25 (d, J=2.2 Hz, 1H) 7.05 (d, J=2.0 Hz, 1H) 6.32 (d, J=10.8 Hz, 1H) 5.31 (d, J=5.8 Hz, 1H) 4.43 (dt, J=10.30, 5.2 Hz, 1H) 2.07-2.16 (m, 1H) 1.69 (t, J=19.4 Hz, 3H) 1.04 (d, J=6.8 Hz, 6H).

MS-ESI m/z: 506.1[M+1]⁺.

Embodiment 24: Synthesis of compound WX025

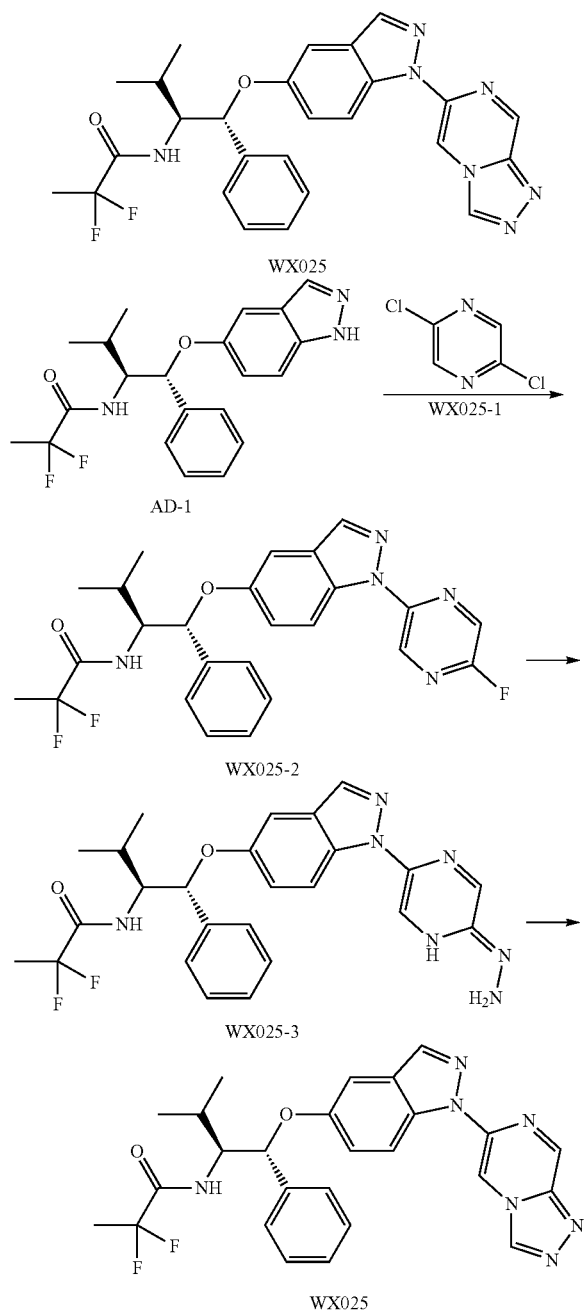

Step 1: Synthesis of Compound WX025-2

Compound AD-1 (500 mg) and N,N-dimethylformamide (5 mL) were added to a pre-dried thumb bottle, and sodium hydride (103.24 mg, 60% purity) and compound WX025-1 (384.54 mg) were added thereto at 0° C., and the reaction was raised to 20° C. and stirred for 1 hour. After the reaction was completed, water (20 mL) was added to the reaction solution, and the mixture was extracted with ethyl acetate (20 mL×3), and the organic phases were combined. The organic phase was washed with saturated brine (50 mL), dried over anhydrous sodium sulfate, filtered, and concentrated under reduced pressure to obtain a crude product. The crude product was separated and purified by flash column chromatography (eluent: petroleum ether/ethyl acetate=1/0-5/1, volume ratio) to obtain compound WX025-2.

¹H NMR (400 MHz, CDCl₃) δ=9.04 (d, J=1.26 Hz, 1H), 8.41 (d, J=9.2 Hz, 1H), 8.26-8.36 (m, 1H), 7.96 (s, 1H), 7.24-7.37 (m, 5H), 7.13 (dd, J=2.4, 9.2 Hz, 1H), 6.90 (d, J=2.2 Hz, 1H), 6.25 (d, J=10.4 Hz, 1H), 5.15-5.30 (m, 1H), 4.34 (td, J=5.2, 10.4 Hz, 1H), 1.96-2.09 (m, 1H), 1.59 (t, J=19.4 Hz, 3H), 0.90-0.99 (m, 6H).

MS-ESI m/z: 500.0 [M+1]⁺.

Step 2: Synthesis of Compound WX025-3

Compound WX025-2 (370 mg) and ethanol (5 mL) were added to a pre-dried round bottom flask, and the temperature of the reaction was lowered to 0° C., and then hydrazine hydrate (189.03 mg, 183.52 μL, 98% content) was slowly added thereto. After the addition was completed, the reaction solution was heated to 80° C. and stirred for 16 hours. After the reaction was completed the reaction solution was concentrated under reduced pressure to obtain a crude product of compound WX025-3.

¹H NMR (400 MHz, CDCl₃)=9.12 (d, J=1.4 Hz, 1H), 8.49 (d, J=9.00 Hz, 1H), 8.35-8.42 (m, 1H), 8.03-8.14 (m, 1H), 7.28-7.45 (m, 3H), 7.27-7.45 (m, 1H), 7.07-7.24 (m, 1H), 6.98 (d, J=2.4 Hz, 1H), 6.82 (br s, 2H), 6.34 (br s, 1H), 5.25-5.30 (m, 1H), 4.42 (td, J=4.84, 10.4 Hz, 1H), 2.07-2.17 (m, 1H), 1.67 (dt, J=1.8, 19.4 Hz, 3H), 0.98-1.06 (m, 5H).

Step 3: Synthesis of Compound WX025

Compound WX025-3 (250 mg) and dichloromethane (3 mL) were added to a pre-dried thumb bottle, and the temperature of the reaction system was lowered to 0° C., and then trimethyl orthoformate (214.16 mg) and trifluoroacetic acid (57.53 mg) were added thereto. The temperature was raised to 20° C. and the reaction mixture was stirred for 4 hours. After the reaction was completed, the reaction solution was added with water (10 mL), extracted with dichloromethane (10 mL×3). The organic phases were combined, washed with saturated brine (20 mL), dried over anhydrous sodium sulfate, filtered, and the filtrate was concentrated under reduced pressure to obtain a crude product. The crude product was purified by preparative HPLC (column type: Luna C18 100 mm×30 mm 5 μm; mobile phase: [H₂O (0.05%)-ACN]; B(ACN) %: 40%-55%, 10 min) to obtain compound WX025.

¹H NMR (400 MHz, CD₃OD)=9.41 (d, J=10.8 Hz, 2H), 8.97 (s, 1H), 8.41 (d, J=9.2 Hz, 1H), 8.07 (s, 1H), 7.49 (br d, J=7.2 Hz, 2H), 7.27-7.36 (m, 2H), 7.18-7.27 (m, 2H), 7.13 (d, J=2.2 Hz, 1H), 5.28 (d, J=9.2 Hz, 1H), 4.34-4.44 (m, 1H), 2.47 (qd, J=6.8, 11.2 Hz, 1H), 1.40 (t, J=19.0 Hz, 3H), 1.02 (dd, J=4.6, 6.8 Hz, 6H).

MS-ESI m/z: 506.2 [M+1]⁺.

Embodiment 26: Synthesis of compound WX026

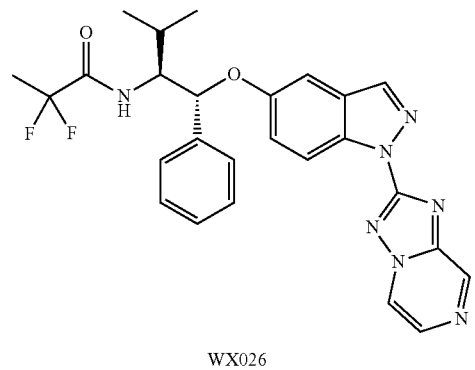

WX026

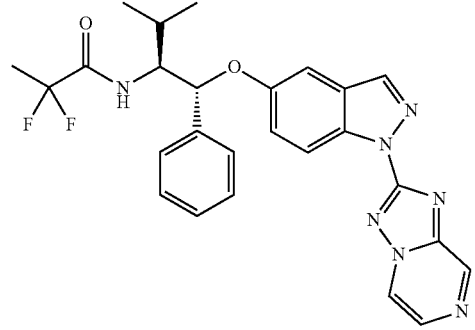

WX026

Step 1: Synthesis of Compound WX026

Compound AD-1 (155.74 mg), compound WX026-1 (80 mg), potassium phosphate (170.66 mg), N,N-dimethyl-1,2-cyclohexyldiamine (57.18 mg) and N,N-dimethylformamide (1 mL) were added to a pre-dried single-necked flask. After the reaction system was replaced with nitrogen for three times, cuprous iodide (38.28 mg) was added thereto. The reaction solution was heated to 65° C. and reacted for 12 hours. After the reaction was completed, the reaction solution was cooled to room temperature. Water (10 mL) was added to the reaction solution, and the mixture was extracted with ethyl acetate (10 mL×3), and the organic phases were combined. The organic phase was washed with saturated brine (30 mL), dried over anhydrous sodium sulfate, filtered, and concentrated under reduced pressure to obtain a crude product. The crude product was separated and purified by preparative HPLC (column type: Phenomenex Luna C18 100 mm×30 mm 5 μm; mobile phase: [H$_2$O (0.05% HCl)-ACN]; B(ACN) %: 35%-65%, 10 min) to obtain compound WX026.

$^1$H NMR (400 MHz, CDCl$_3$) δ=9.32 (s, 1H), 8.65 (s, 1H), 8.49 (d, J=9.2 Hz, 1H), 8.28 (s, 2H), 7.47-7.41 (m, 2H), 7.38 (t, J=7.4 Hz, 2H), 7.32 (t, J=7.0 Hz, 2H), 7.02 (s, 1H), 6.32 (d, J=9.6 Hz, 1H), 5.30 (d, J=5.8 Hz, 1H), 4.43 (td, J=5.2, 10.12 Hz, 1H), 2.18-2.08 (m, 1H), 1.67 (t, J=19.4 Hz, 3H), 1.04 (t, J=6.4 Hz, 6H).

MS-ESI m/z: 506.2 [M+H]$^+$.

Referring to the synthesis method of embodiment 26, fragment 1 was replaced with WX026-1, fragment 2 was replaced with AD-1, and the embodiments in the following table were synthesized.

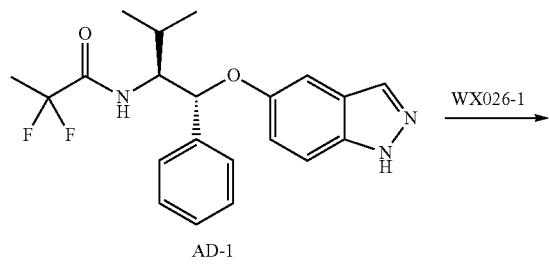

AD-1

| Embodiment | Fragment 1 | Fragment 2 | Compound structure | Compound number |
|---|---|---|---|---|
| 27 | (iodo-imidazo[1,2-a]pyrazine) | AD-1 | (structure) | WX027 |
| 28 | (bromo-pyrazolo[1,5-a]pyrimidine) | AD-1 | (structure) | WX028 |

-continued
| Embodiment | Fragment 1 | Fragment 2 | Compound structure | Compound number |
|---|---|---|---|---|
| 29 | 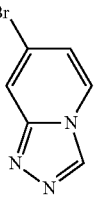 | AA-1 | 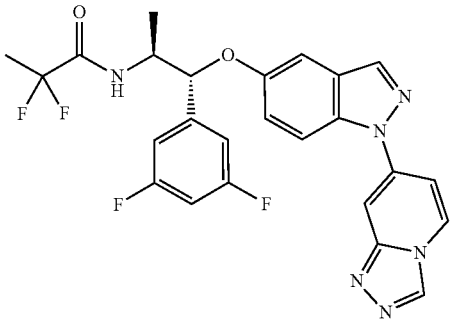 [SMILES: C[C@H](NC(=O)C(C)(F)F)[C@H](Oc1ccc2c(cnn2-c2ccn3cnnc3c2)c1)c1cc(F)cc(F)c1] | WX029 |
| 30 | 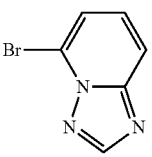 | AA-1 | 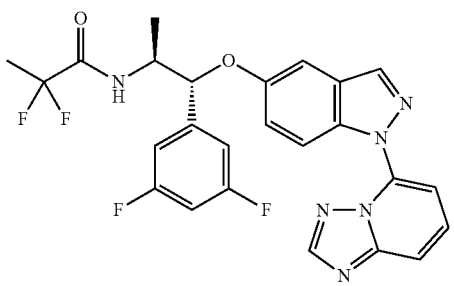 [SMILES: C[C@H](NC(=O)C(C)(F)F)[C@H](Oc1ccc2c(cnn2-c2cccc3ncnn23)c1)c1cc(F)cc(F)c1] | WX030 |
Embodiment 31: Synthesis of compound WX031
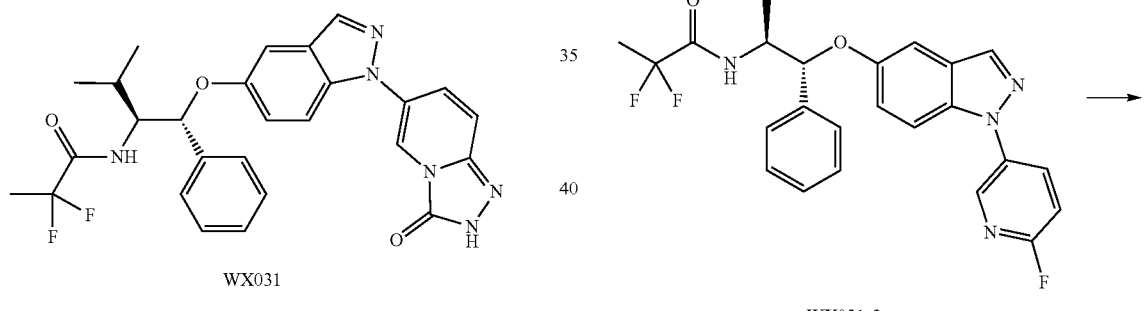
-continued
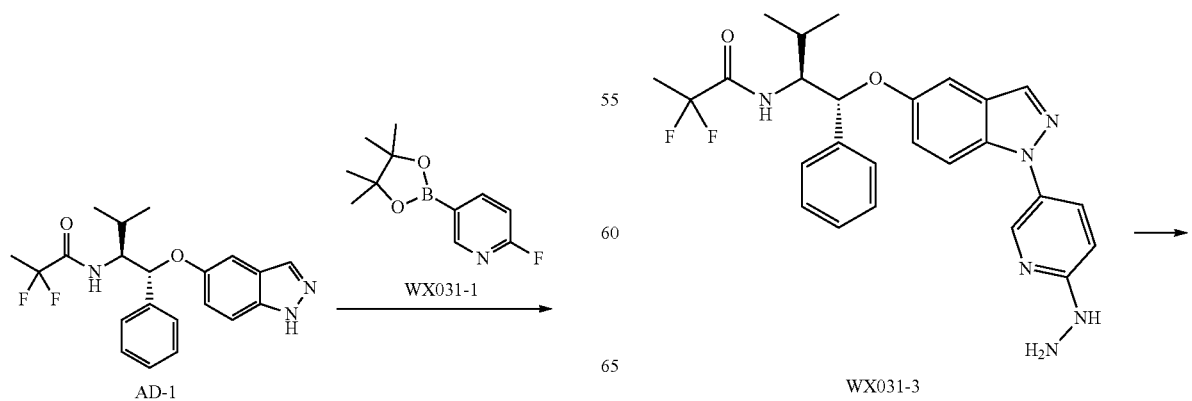

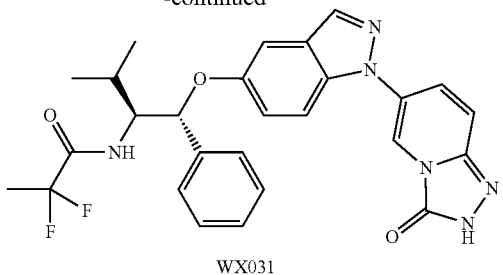

WX031

Step 1: Synthesis of Compound WX031-2

Compound AD-1 (5 g), compound WX031-1 (2.88 g) and N,N-dimethylformamide (20 mL) were added to a pre-dried round bottom flask, and then pyridine (5.10 g) and anhydrous copper acetate (4.69 g) were added thereto; the reaction system was replaced with oxygen for three times, and the reaction mixture was stirred at 60° C. for 12 hours under the protection of oxygen (15 psi). After the reaction was completed, dichloromethane (30 mL) was added to the reaction solution, and a mixed solution of water (30 mL) and ammonia water (5 mL) was added thereto for washing; after the phases were separated, the organic phase was collected. The aqueous phase was extracted with dichloromethane (20 mL×2), and the organic phases were combined. The organic phase was washed with saturated brine (30 mL×2), dried over anhydrous sodium sulfate, filtered, and concentrated under reduced pressure to obtain a crude product. The crude product was separated and purified by automatic chromatography column machine COMBI-FLASH (80 g SepaFlash® Silica Flash Column, eluent: 0 to 20% EA/PE, flow rate: 60 mL/min) to obtain compound WX031-2.

$^1$H NMR (400 MHz, DMSO-$d_6$) δ=8.62 (d, J=1.6 Hz, 1H), 8.29-8.39 (m, 1H), 8.18-8.29 (m, 2H), 7.74 (d, J=9.0 Hz, 1H), 7.50 (d, J=7.2 Hz, 2H), 7.36-7.42 (m, 1H), 7.25-7.33 (m, 2H), 7.12-7.25 (m, 3H), 5.33 (d, J=9.4 Hz, 1H), 4.23 (dt, J=4.0, 9.8 Hz, 1H), 2.35-2.45 (m, 1H), 1.39 (t, J=19.4 Hz, 3H), 0.93 (t, J=6.2 Hz, 6H).

Step 2: Synthesis of Compound WX031-3

Compound WX031-2 (600 mg) and ethanol (6 mL) were added to a pre-dried reaction flask, and then hydrazine hydrate (635.22 mg, 616.72 μL, 98% content) was added thereto, and the reaction mixture was stirred at 80° C. for 12 hours. After the reaction was completed the reaction solution was concentrated under reduced pressure to obtain a crude product of compound WX031-3.

$^1$H NMR (400 MHz, DMSO-$d_6$) δ=8.20-8.31 (m, 2H), 8.10 (s, 1H), 7.75 (s, 1H), 7.71 (dd, J=2.20, 8.8 Hz, 1H), 7.43-7.53 (m, 3H), 7.29 (br t, J=7.4 Hz, 2H), 7.22 (br d, J=7.2 Hz, 1H), 7.04-7.14 (m, 2H), 6.86 (d, J=9.0 Hz, 1H), 5.30 (br d, J=9.4 Hz, 1H), 4.21 (br dd, J=5.8, 9.4 Hz, 1H), 2.41 (br dd, J=6.8, 11.2 Hz, 1H), 1.39 (br t, J=19.4 Hz, 3H), 0.92 (br t, J=6.4 Hz, 6H).

Step 3: Synthesis of Compound WX031

Compound WX031-3 (200 mg) and dichloromethane (2 mL) were added to the pre-dried reaction flask, and then triethylamine (122.77 mg) was added thereto, and the reaction system was replaced with nitrogen for three times; bis(trichloromethyl)carbonate (60.01 mg) was added thereto at 0° C., and after the addition was completed, the reaction mixture was stirred at 30° C. for 1 hour. After the reaction was completed, water (10 mL) was added to the reaction solution, and the mixture was extracted with ethyl acetate (10 mL×5). The organic phases were combined, washed with saturated brine (20 mL), dried over anhydrous sodium sulfate, filtered, and concentrated under reduced pressure to obtain a crude product. The crude product was purified by preparative HPLC (column type: Luna C18 100 mm×30 mm 5 μm; mobile phase: [H$_2$O (0.05%)-ACN]; B(ACN) %: 43%-58%, 10 min) to obtain compound WX031.

$^1$H NMR (400 MHz, DMSO-$d_6$) δ=12.67 (s, 1H), 8.26 (d, J=9.80 Hz, 1H), 8.22 (s, 1H), 8.04 (s, 1H), 7.67 (d, J=9.16 Hz, 1H), 7.55 (d, J=10.92 Hz, 1H), 7.49 (d, J=7.28 Hz, 2H), 7.41 (d, J=10.04 Hz, 1H), 7.26-7.33 (m, 2H), 7.21 (dd, J=8.06, 15.06 Hz, 2H), 7.13 (s, 1H), 5.31 (d, J=9.40 Hz, 1H), 4.17-4.27 (m, 1H), 2.41 (d, J=4.64 Hz, 1H), 1.39 (t, J=19.38 Hz, 3H), 0.92 (t, J=6.22 Hz, 6H).

MS-ESI m/z: 521.2[M+1]$^+$.

Embodiment 32: Synthesis of compound WX032

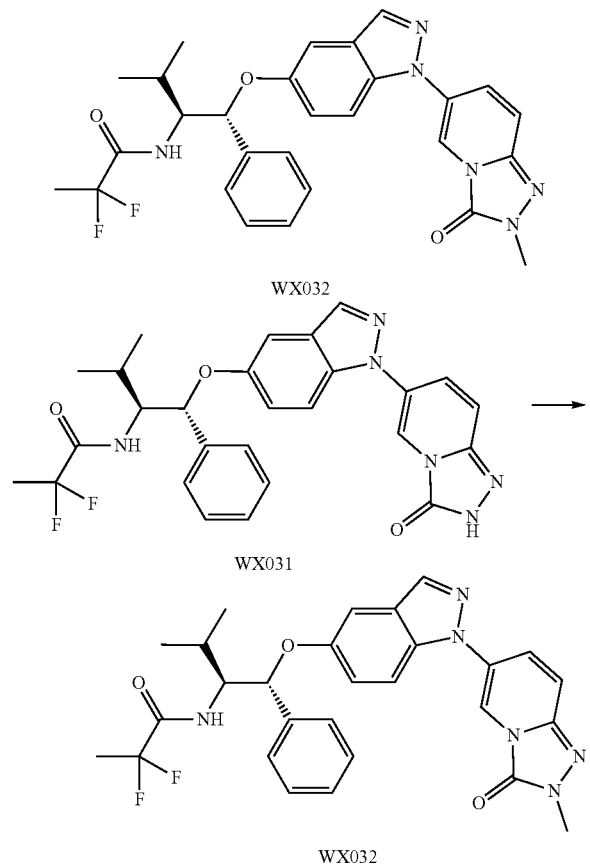

WX032

Step 1: Synthesis of Compound WX032

Compound WX031 (100 mg), sodium iodide (115.19 mg) and acetonitrile (1 mL) were added to a pre-dried reaction flask, and then iodomethane (81.80 mg) was added dropwise thereto, and the reaction was stirred at 80° C. for 48 hours. After the reaction was completed, saturated ammonium chloride solution (10 mL) was added to the reaction solution, and the mixture was extracted with ethyl acetate (10 mL×3), and the organic phases were combined. The organic phase was washed with saturated brine (30 mL), dried over anhydrous sodium sulfate, filtered, and the filtrate was concentrated under reduced pressure to obtain a crude product. The crude product was purified by thin layer chromatography silica gel plate (developing solvent: ethyl acetate) to obtain compound WX032.

$^1$H NMR (400 MHz, CDCl$_3$) δ=8.09 (s, 1H), 8.02 (s, 1H), 7.61 (dd, J=9.54, 15.94 Hz, 2H), 7.38-7.49 (m, 4H), 7.33-7.37 (m, 1H), 7.30 (d, J=4.02 Hz, 1H), 7.21 (d, J=9.16 Hz, 1H), 7.02 (s, 1H), 6.36 (d, J=9.54 Hz, 1H), 5.31 (d, J=5.78 Hz, 1H), 4.45 (td, J=4.96, 10.16 Hz, 1H), 3.76 (s, 3H), 2.16 (dd, J=6.54, 11.80 Hz, 1H), 1.71 (t, J=19.26 Hz, 3H), 1.07 (t, J=6.20 Hz, 6H).

MS-ESI m/z: 535.2[M+1]$^+$.

Embodiment 33: Synthesis of compound WX033

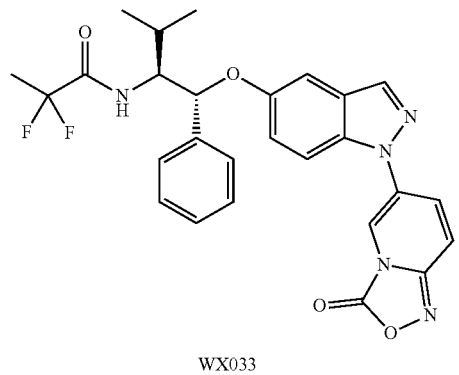

WX033

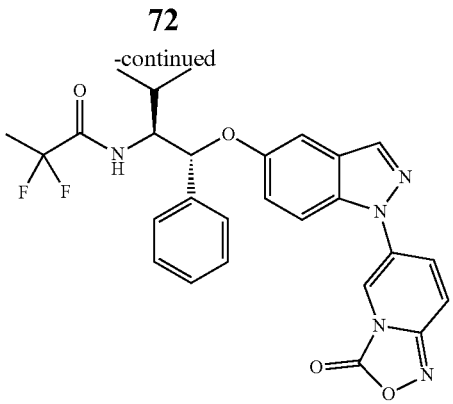

WX033

Step 1: Synthesis of Compound WX033-2

Compound WX031-2 (400 mg) and dimethyl sulfoxide (4 mL) were added to a pre-dried reaction flask, and then hydroxylamine hydrochloride (288.05 mg) and sodium bicarbonate (348.22 mg) were added thereto, and the reaction was stirred at 90° C. for 12 hours. After the reaction was completed, the reaction solution was added with water (20 mL), extracted with dichloromethane (20 mL×3), and the organic phases were combined. The organic phase was washed with saturated brine (30 mL), dried over anhydrous sodium sulfate, filtered, and the filtrate was concentrated under reduced pressure to obtain a crude product. The crude product was separated and purified by automatic chromatography column machine COMBI-FLASH (20 g Sepa-Flash® Silica Flash, mobile phase 0 to 70% EA/PE@35 mL/min) to obtain compound WX033-2.

$^1$H NMR (400 MHz, DMSO-d$_6$) δ=9.00 (s, 1H), 8.77 (d, J=1.52 Hz, 1H), 8.35 (d, J=2.38 Hz, 1H), 8.26 (d, J=9.92 Hz, 1H), 8.15 (s, 1H), 7.89 (dd, J=2.64, 8.92 Hz, 1H), 7.55 (d, J=8.92 Hz, 1H), 7.48 (d, J=7.16 Hz, 2H), 7.27-7.34 (m, 2H), 7.22 (d, J=7.28 Hz, 1H), 7.08-7.15 (m, 2H), 6.98 (d, J=8.92 Hz, 1H), 5.29 (d, J=9.54 Hz, 1H), 4.21 (dt, J=4.08, 9.76 Hz, 1H), 2.37-2.43 (m, 1H), 1.38 (t, J=19.46 Hz, 3H), 0.91 (t, J=6.54 Hz, 6H).

MS-ESI m/z: 496.2[M+1]$^+$.

Step 2: Synthesis of Compound WX033

Compound WX033-2 (120 mg) and dichloromethane (2 mL) were added to a pre-dried reaction flask, and then triethylamine (73.52 mg) was added thereto; the reaction system was replaced with nitrogen for three times, and then triphosgene (35.93 mg) was added thereto at 0° C., and the reaction mixture was stirred at 30° C. for 0.5 hours under nitrogen atmosphere. After the reaction was completed, water (10 mL) was added to the reaction solution, and the mixture was extracted with ethyl acetate (10 mL×5), and the organic phases were combined. The organic phase was washed with saturated brine (20 mL), dried over anhydrous sodium sulfate, filtered, and the filtrate was concentrated under reduced pressure to obtain a crude product. The crude product was purified by thin layer chromatography silica gel plate (developing solvent: ethyl acetate) to obtain WX033.

$^1$H NMR (400 MHz, DMSO-d$_6$) δ=8.28-8.37 (m, 2H), 8.14 (s, 1H), 7.81 (d, J=9.30 Hz, 1H), 7.75 (d, J=9.16 Hz, 1H), 7.55 (d, J=7.40 Hz, 2H), 7.49 (d, J=10.04 Hz, 1H), 7.32-7.40 (m, 2H), 7.28 (t, J=6.96 Hz, 2H), 7.19 (s, 1H), 5.38 (d, J=9.40 Hz, 1H), 4.22-4.35 (m, 1H), 2.42-2.50 (m, 1H), 1.45 (t, J=19.38 Hz, 3H), 0.98 (t, J=5.84 Hz, 6H).

MS-ESI m/z: 522.2[M+1]$^+$.

Embodiment 34: Synthesis of compound WX034

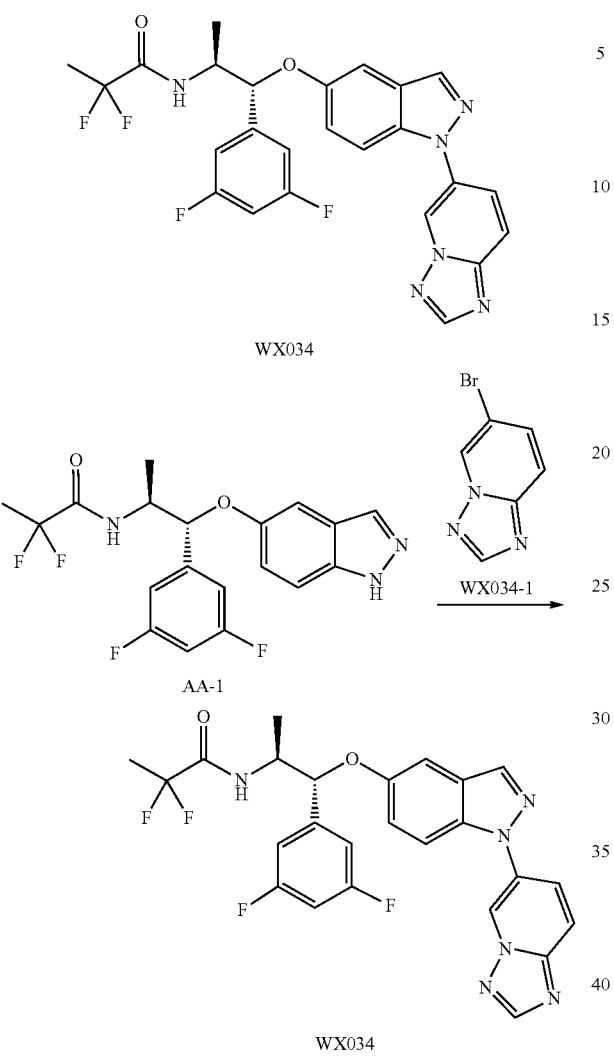

Embodiment 35: Synthesis of compound WX035

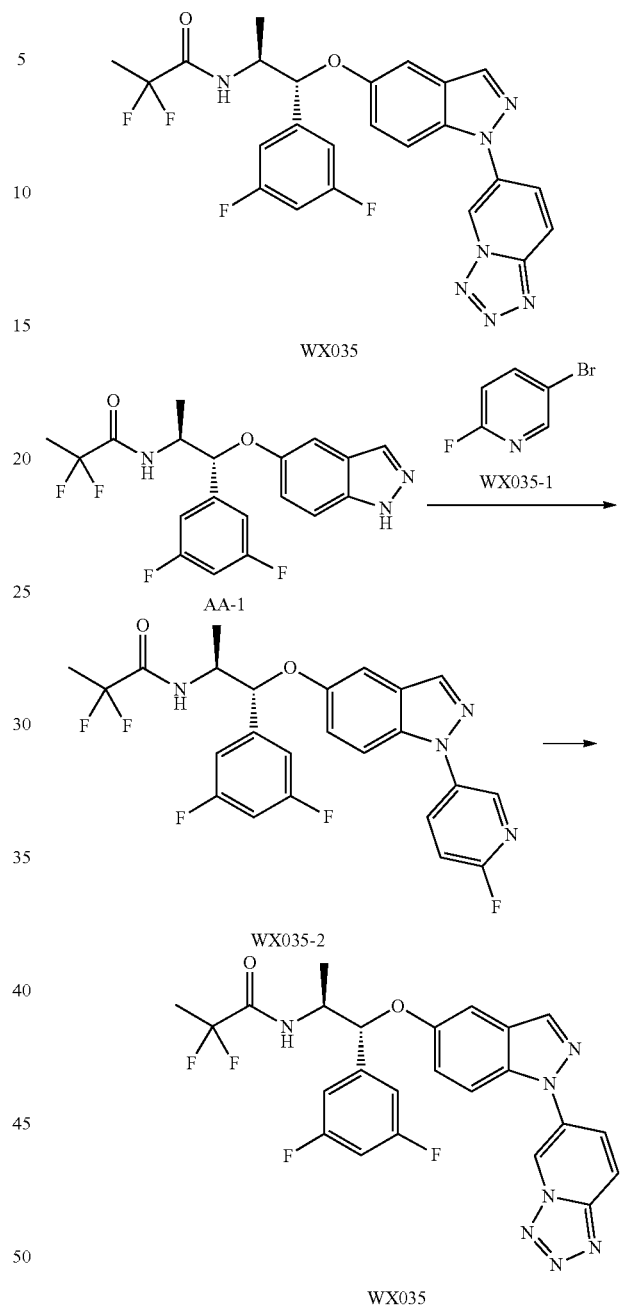

Step 1: Synthesis of Compound WX034

Compound AA-1 (500 mg) was dissolved in toluene (10 mL), and compound WX034-1 (375.6 mg), 2-di-tert-butylphosphino-2',4',6'-triisopropylbiphenyl (107.4 mg), sodium tert-butoxide (364.6 mg) and tris(dibenzylideneacetone)dipalladium (115.8 mg) were sequentially added thereto, and the reaction was stirred at 120° C. for 12 hours under nitrogen atmosphere. After the reaction was completed, the reaction solution was cooled to 50° C., filtered, the filter cake was washed with ethyl acetate (50 mL×2), and the filtrate was concentrated under reduced pressure to obtain a crude product. The crude product was separated and purified by preparative HPLC (column type: Phenomenex Luna C18 100 mm×30 mm×5 μm; mobile phase: [H$_2$O (10 mM NH$_4$HCO$_3$)-ACN]; B(ACN) %: 35%-55%, 10 min) to obtain compound WX034.

$^1$H NMR (400 MHz, DMSO-d$_6$) δ=9.46 (s, 1H) 8.78 (d, 1H) 8.63 (s, 1H) 8.32 (s, 1H) 8.02-8.10 (m, 2H) 7.84 (d, 1H) 7.21-7.29 (m, 2H) 7.12-7.16 (m, 2H) 5.30 (d, 1H) 4.19-4.30 (m, 1H) 1.58 (t, 3H) 1.35 (d, 3H).

MS-ESI m/z: 512.5. [M+H]$^+$.

Step 1: Synthesis of Compound WX035-2

Compound AA-1 (500 mg) was dissolved in toluene (25 mL), and then WX035-1 (244.8 mg), tris(dibenzylideneacetone)dipalladium (231.6 mg), and sodium tert-butoxide (243.1 mg) and 2-di-tert-butylphosphino-2',4',6'-triisopropylbiphenyl (107.4 mg) were successively added thereto, and the reaction was stirred at 110° C. for 12 hours under nitrogen atmosphere. After the reaction was completed, the reaction solution was filtered, the filter cake was washed with ethyl acetate (50 mL×2), and the filtrate was concentrated under reduced pressure to obtain a crude product. The crude product was separated and purified by preparative HPLC (column type: Phenomenex Luna C18 100 mm×30 mm 5 µm; mobile phase: [H₂O (0.04% HCl)-ACN]; B(ACN) %: 40%-70%, 10 min) to obtain compound WX035-2.

MS-ESI m/z: 491.2[M+H]$^+$.

Step 2: Synthesis of Compound WX035

Compound WX035-2 (200 mg) was dissolved in dimethyl sulfoxide (3 mL), and then sodium azide (79.5 mg) was added thereto, and the reaction was carried out at 130° C. for 12 hours under nitrogen atmosphere. After the reaction was completed, the reaction solution was cooled to room temperature, poured into diluted sodium hypochlorite aqueous solution (20 mL), extracted with ethyl acetate (20 mL×3), and then the phases were separated, and the organic phases were combined. The organic phase was washed with saturated brine (20 mL), dried over anhydrous sodium sulfate, filtered, and concentrated under reduced pressure to obtain a crude product. The crude product was separated and purified by preparative HPLC (column type: Phenomenex Luna C18 100 mm×30 mm 5 µm; mobile phase: [H₂O (0.04% HCl)-ACN]; B(ACN) %: 35%-65%, 10 min) to obtain compound WX035.

MS-ESI m/z: 514.1 [M+H]$^+$.

$^1$H NMR (400 MHz, DMSO-d$_6$) δ=9.80 (s, 1H) 8.36 (d, J=10.0 Hz, 1H) 8.34 (s, 1H) 8.29 (d, J=10.0 Hz, 1H) 7.95 (d, J=8.0 Hz, 1H) 7.26 (d, J=9.20 Hz, 1H) 7.21 (s, 1H) 7.09 (d, J=8.0 Hz, 3H) 5.26 (d, J=7.4 Hz, 1H) 4.12-4.27 (m, 1H) 1.53 (t, J=19.6 Hz, 3H) 1.31 (d, J=8.0 Hz, 3H).

Referring to the synthesis method of embodiment 35, fragment 1 was replaced with WX035-1, and the embodiments in the following table were synthesized.

| Embodiment | Fragment 1 | Fragment 2 | Compound structure | Compound number |
|---|---|---|---|---|
| 36 | | AA-1 | | WX036 |

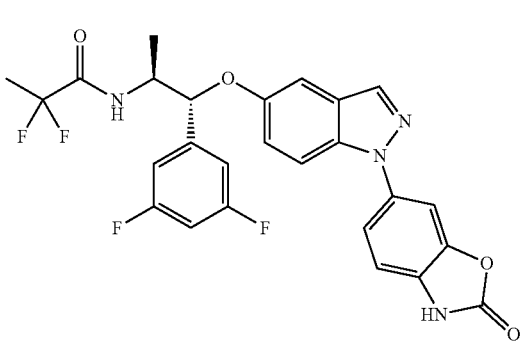 [SMILES: C[C@H](NC(=O)C(C)(F)F)[C@H](Oc1ccc2c(cnn2-c2ccc3[nH]c(=O)oc3c2)c1)c1cc(F)cc(F)c1]

Embodiment 37: Synthesis of compound WX037

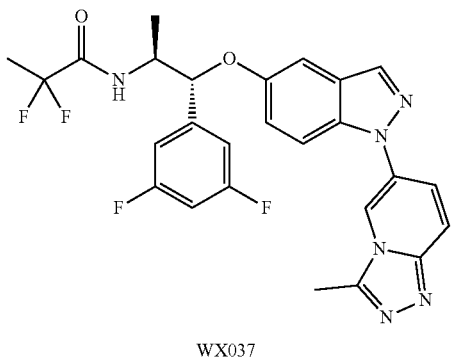

WX037

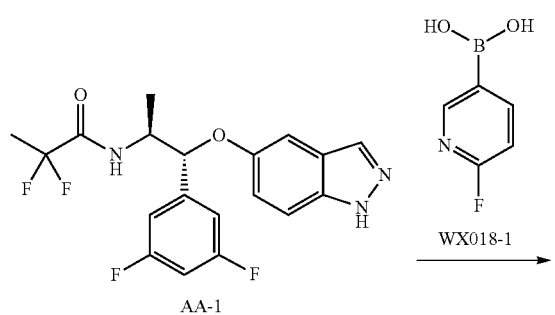

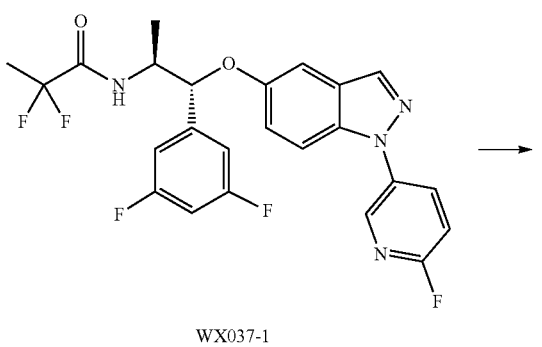

WX037-2

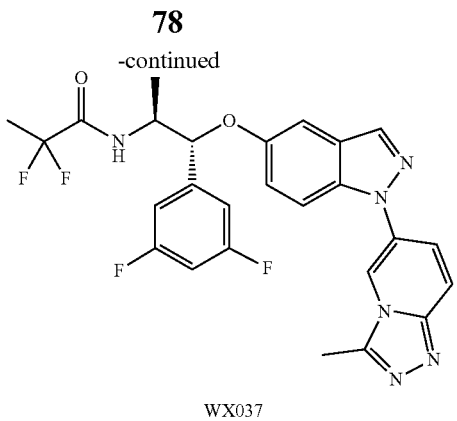

WX037

Step 1: Synthesis of Compound WX037-1

Compound AA-1 (2 g) and compound WX018-1 (0.72 g) were dissolved in N,N-dimethylformamide (20 mL), and then pyridine (2.00 g), anhydrous copper acetate (1.84 g) were added thereto, and the reaction system was replaced with oxygen for three times, and the temperature was raised to 60° C. and the reaction was stirred for 12 hours under the protection of oxygen (15 psi). After the reaction was completed, the reaction solution was poured into water (50 mL), and extracted with ethyl acetate (20 mL). The organic phase was washed with half-saturated brine (50 mL), washed with saturated brine (50 mL), dried over anhydrous sodium sulfate, filtered, and the filtrate was concentrated under reduced pressure at 45° C. The residue was separated and purified by column chromatography (eluent: petroleum ether/ethyl acetate=9/1-7/3, volume ratio) to obtain compound WX037-1.

MS-ESI m/z: 491.1 [M+H]$^+$.

Step 2: Synthesis of Compound WX037-2

Compound WX037-1 (300 mg) was added to ethanol (3 mL), and then hydrazine hydrate (312.48 mg, 98% content) was slowly added thereto, and the reaction was stirred at 80° C. for 2 hours. After the reaction was completed, the reaction solution was concentrated under reduced pressure at 50° C. to obtain compound WX037-2.

MS-ESI m/z: 503.1 [M+H]$^+$.

Step 3: Synthesis of Compound WX037

Compound WX037-2 (307.36 mg) was dissolved in dichloromethane (5 mL), and after the reaction system was replaced with nitrogen, triethyl orthoacetate (396.95 mg) and trifluoroacetic acid (69.75 mg) were added thereto at 0° C., and the reaction mixture was stirred at 20° C. 12 hours. After the reaction was completed, the reaction solution was added with water (10 mL), extracted with dichloromethane (5 mL×3), and the organic phases were combined. The organic phase was washed with saturated brine (10 mL), dried over anhydrous sodium sulfate, filtered, and the filtrate was concentrated under reduced pressure to obtain a crude product. The crude product was purified by preparative HPLC (column type: Luna Omega 5 μm Polar C18 100A; mobile phase: [H$_2$O (0.04% HCl)-ACN]; B(ACN) %: 32%-48%, 7 min) to obtain compound WX037.

$^1$H NMR (400 MHz, DMSO-d$_6$) δ=8.91 (s, 1H), 8.73 (d, J=8.8 Hz, 1H), 8.32 (s, 1H), 7.88-8.04 (m, 3H), 7.22-7.29 (m, 2H), 7.09-7.18 (m, 3H), 5.30 (d, J=7.6 Hz, 1H), 4.19-4.29 (m, 1H), 2.79 (s, 3H), 1.56 (t, J=19.6 Hz, 3H), 1.34 (d, J=6.4 Hz, 3H).

MS-ESI m/z: 527.1 [M+H]$^+$.

Referring to the synthesis method of embodiment 37, fragment 1 was replaced with WX018-1, and the embodiments in the following table were synthesized.

| Embodiment | Fragment 1 | Compound structure | Compound number |
|---|---|---|---|
| 38 | (structure) | (structure) | WX038 |

Embodiment 39: Synthesis of compound WX039

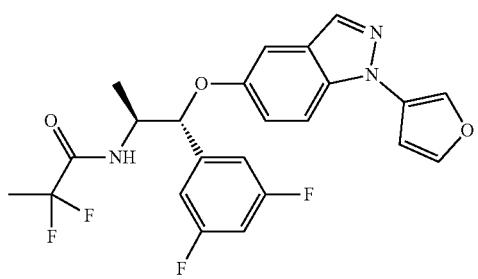

WX039

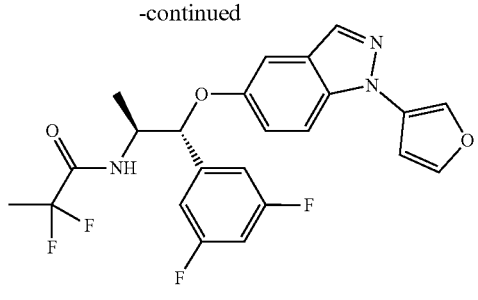

-continued

WX039

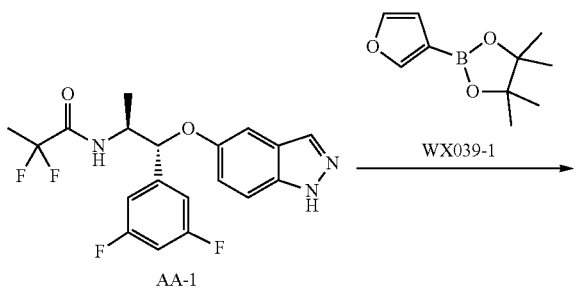

AA-1 → WX039-1

Compound AA-1 (200 mg) and compound WX039-1 (147.24 mg) were dissolved in N,N-dimethylformamide (2 mL), and then copper acetate (183.77 mg) and pyridine (160.06 mg) were added thereto, and after the reaction system was replaced with oxygen for three times, and the reaction was stirred at 100° C. for 12 hours under oxygen atmosphere (15 psi). After the reaction was completed, the reaction solution was poured into water (10 mL), and ammonia water (1 mL) was added thereto, and ethyl acetate (10 mL×3) was added for extraction. The organic phases were combined, washed successively with half-saturated brine (20 mL×2) and saturated brine (30 mL), dried over anhydrous sodium sulfate, filtered, and the filtrate was concentrated under reduced pressure at 45° C. The crude product was purified by preparative HPLC (column type: Welch Xtimate C18 150×25 mm×5 μm; mobile phase: [$H_2O$ (0.04% HCl)-ACN]; B(ACN) %: 35%-55%, 8 min) to obtain target compound WX039.

$^1$H NMR (400 MHz, DMSO-$d_6$) δ:8.74 (d, J=8.4 Hz, 1H), 8.33 (s, 1H), 8.16 (s, 1H), 7.82 (s, 1H), 7.75 (d, J=9.2 Hz, 1H), 7.23 (dd, J=9.2, 2.0 Hz, 1H), 7.08-7.20 (m, 4H), 7.03 (d, J=0.8 Hz, 1H), 5.26 (d, J=7.2 Hz, 1H), 4.17-4.29 (m, 1H), 1.56 (t, J=19.6 Hz, 3H), 1.34 (d, J=6.8 Hz, 3H).

MS-ESI m/z: 462.1 [M+H]$^+$.

Referring to the synthesis method of embodiment 39, fragment 1 was replaced with WX039-1, fragment 2 was replaced with AA-1, and the embodiments in the following table were synthesized.

| Embodiment | Fragment 1 | Fragment 2 | Compound structure | Compound number |
|---|---|---|---|---|
| 40 | 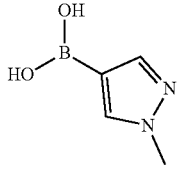 | AA-1 | 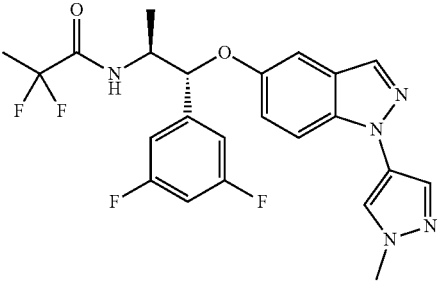 [SMILES: C[C@H](NC(=O)C(C)(F)F)[C@H](Oc1ccc2c(cnn2-c2cnn(C)c2)c1)c1cc(F)cc(F)c1] | WX040 |
| 41 | 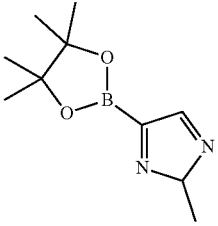 | AA-1 | 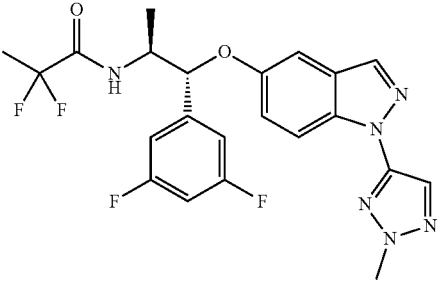 [SMILES: C[C@H](NC(=O)C(C)(F)F)[C@H](Oc1ccc2c(cnn2-c2cnn(C)n2)c1)c1cc(F)cc(F)c1] | WX041 |
| 42 | 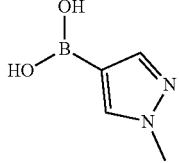 | AB-1 | 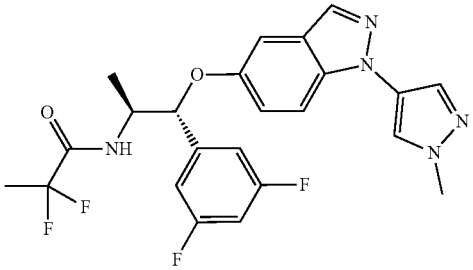 [SMILES: C[C@H](NC(=O)C(C)(F)F)[C@H](Oc1ccc2c(cnn2-c2cnn(C)c2)c1)c1cc(F)cc(F)c1] | WX042 |
| 43 | 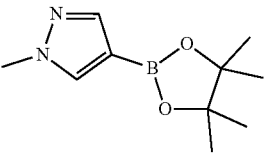 | AC-1 | 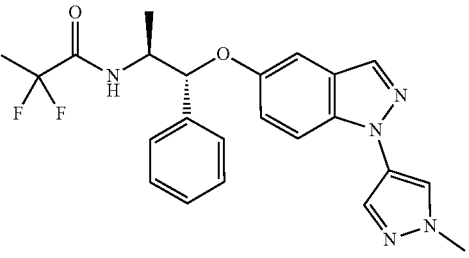 [SMILES: C[C@H](NC(=O)C(C)(F)F)[C@H](Oc1ccc2c(cnn2-c2cnn(C)c2)c1)c1ccccc1] | WX043 |
| 44 | 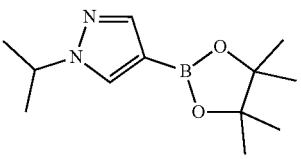 [SMILES: CC(C)n1cc(B2OC(C)(C)C(C)(C)O2)cn1] | AC-1 | 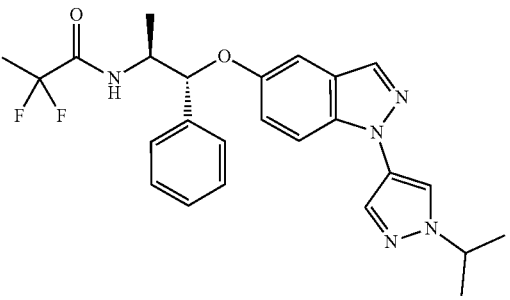 [SMILES: CC(C)n1cc(-n2ncc3cc(O[C@H](c4ccccc4)[C@H](C)NC(=O)C(C)(F)F)ccc32)cn1] | WX044 |

-continued

| Embodiment | Fragment 1 | Fragment 2 | Compound structure | Compound number |
|---|---|---|---|---|
| 45 | 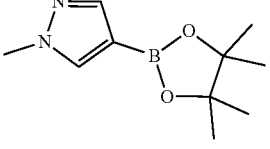 | AD-1 | 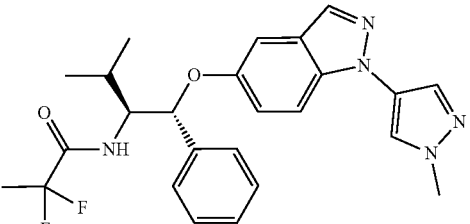 | WX045 |
| 46 | 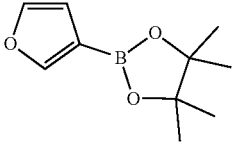 | AF-1 | 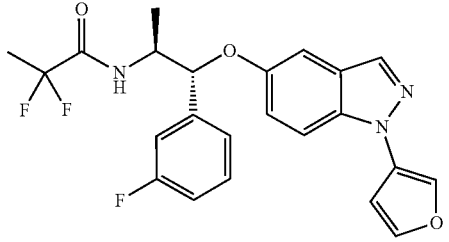 [SMILES: C[C@H](NC(=O)C(C)(F)F)[C@H](Oc1ccc2c(cnn2-c2ccoc2)c1)c1cccc(F)c1] | WX046 |
| 47 | 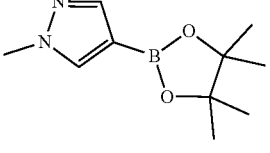 | AG-1 | 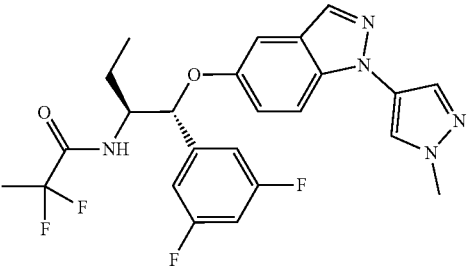 [SMILES: CC[C@H](NC(=O)C(C)(F)F)[C@H](Oc1ccc2c(cnn2-c2cnn(C)c2)c1)c1cc(F)cc(F)c1] | WX047 |

Embodiment 48: Synthesis of compound WX048

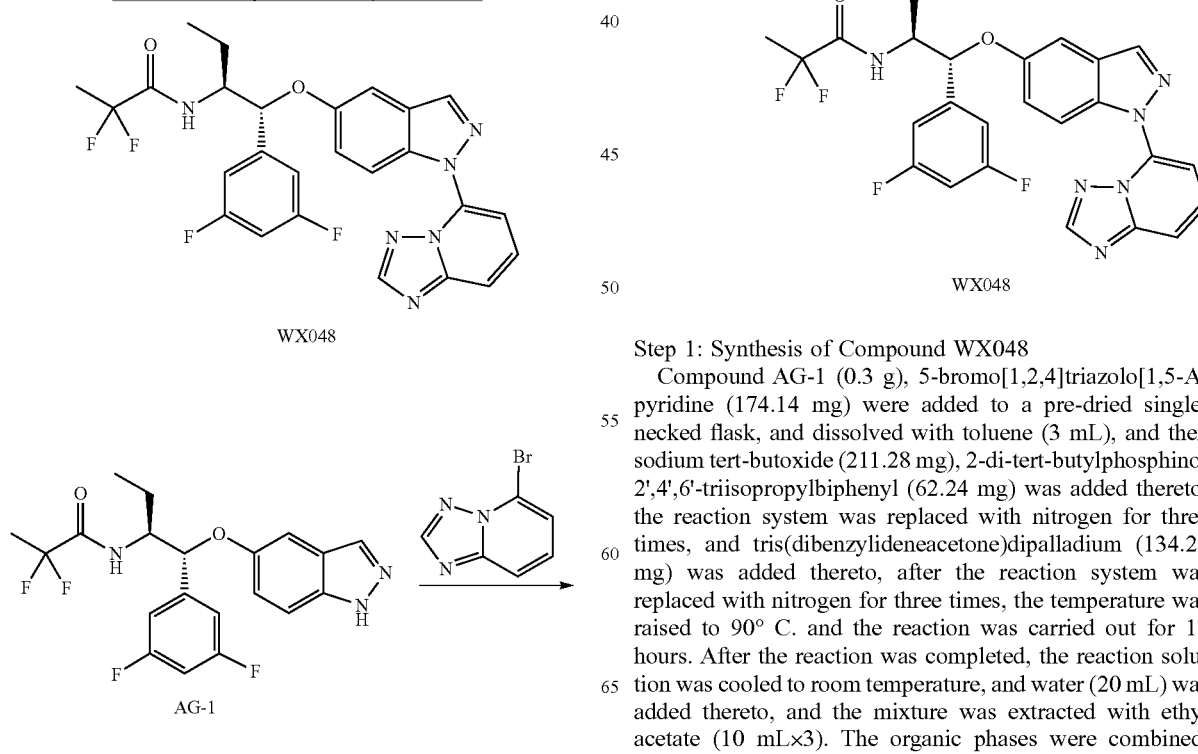

WX048

Step 1: Synthesis of Compound WX048

Compound AG-1 (0.3 g), 5-bromo[1,2,4]triazolo[1,5-A]pyridine (174.14 mg) were added to a pre-dried single-necked flask, and dissolved with toluene (3 mL), and then sodium tert-butoxide (211.28 mg), 2-di-tert-butylphosphino-2',4',6'-triisopropylbiphenyl (62.24 mg) was added thereto; the reaction system was replaced with nitrogen for three times, and tris(dibenzylideneacetone)dipalladium (134.21 mg) was added thereto, after the reaction system was replaced with nitrogen for three times, the temperature was raised to 90° C. and the reaction was carried out for 16 hours. After the reaction was completed, the reaction solution was cooled to room temperature, and water (20 mL) was added thereto, and the mixture was extracted with ethyl acetate (10 mL×3). The organic phases were combined, washed successively with saturated brine (30 mL), dried over anhydrous sodium sulfate, filtered, and concentrated to dryness under reduced pressure. The crude product was purified by column chromatography (eluent: petroleum ether/ethyl acetate=5/1 to 0/1, volume ratio) and then separated and purified by preparative HPLC (column type: Welch Xtimate C18 150×25 mm×5 μm; mobile phase: [H$_2$O (0.04% HCl)-ACN]; B(ACN) %: 30%-50%, 8 min) to obtain WX048.

$^1$H NMR (400 MHz, CD$_3$OD) δ=8.56 (s, 1H), 8.29 (s, 1H), 7.97-7.94 (m, 2H), 7.49 (dd, J=3.0, 5.6 Hz, 1H), 7.32-7.26 (m, 1H), 7.25-7.19 (m, 2H), 7.07 (br d, J=6.2 Hz, 2H), 6.90-6.82 (m, 1H), 5.27 (d, J=7.0 Hz, 1H), 4.18 (ddd, J=3.0, 7.2, 10.4 Hz, 1H), 2.04-1.95 (m, 1H), 1.74 (ddd, J=7.2, 11.0, 14.0 Hz, 1H), 1.60 (t, J=19.2 Hz, 3H), 0.97 (t, J=7.4 Hz, 3H).

MS-ESI m/z: 527.3 [M+H]$^+$.

Embodiment 49: Synthesis of compound WX049

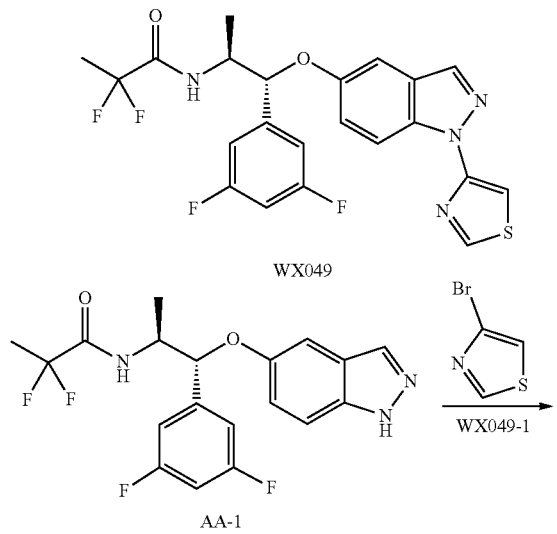

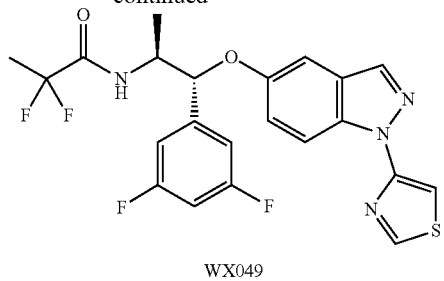

WX049

Step 1: Synthesis of Compound WX049

AA-1 (0.2 g) and N,N-dimethylformamide (8 mL) were added to a dry single-necked flask, and then WX049-1 (99.57 mg), potassium phosphate (214.77 mg) and iodide Copper (48.17 mg) and (1R,2R)-(−)-N,N-dimethylcyclohexane-1,2-diamine (71.96 mg) were added thereto, and the reaction system was replaced with nitrogen for three times, and then the reaction was carried out at 90° C. for 12 hours. After the reaction was completed, ammonia water (3 mL) and water (10 mL) were added to the reaction solution, and the mixture was stirred for 30 min, and filtered. The filtrate was added with ethyl acetate (15 mL) for extraction, and the organic phase was washed with saturated brine (15 mL×2), dried over anhydrous sodium sulfate, filtered, and the filtrate was concentrated under reduced pressure to obtain a crude product. The crude product was separated and purified by preparative HPLC (column type: Phenomenex luna C18 80*40 mm*3 μm; mobile phase: [H$_2$O (0.04% HCl)-ACN]; B(ACN) %: 57%-77%, 7 min) to obtain compound WX049.

$^1$H NMR (400 MHz, CD$_3$OD) δ=1.35 (d, J=6.64 Hz, 3H) 1.57 (t, J=19.52 Hz, 3H) 4.24 (br dd, J=15.32, 6.90 Hz, 1H) 5.28 (d, J=7.28 Hz, 1H) 7.12 (br d, J=7.78 Hz, 3H) 7.16-7.23 (m, 2H) 7.32 (br s, 1H) 7.73 (s, 1H) 8.27 (br d, J=8.66 Hz, 1H) 8.77 (br d, J=8.54 Hz, 1H) 9.28 (s, 1H).

MS-ESI m/z: 479.1 [M+H]$^+$.

Referring to the synthesis method of embodiment 49, fragment 1 was replaced with WX049-1, fragment 2 was replaced with AA-1, and the embodiments in the following table were synthesized.

| Embodiment | Fragment 1 | Fragment 2 | Compound structure | Compound number |
|---|---|---|---|---|
| 50 | ![Br-isothiazole] | AA-1 | ![WX050 structure] | WX050 |
| 51 | ![methyl-triazole-Br] | AA-1 | ![WX051 structure] | WX051 |

| Embodiment | Fragment 1 | Fragment 2 | Compound structure | Compound number |
|---|---|---|---|---|
| 52 | 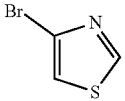 | AC-1 | 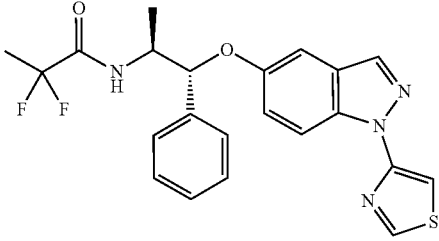 [SMILES: C[C@H](NC(=O)C(C)(F)F)[C@H](Oc1ccc2c(cnn2-c2cscn2)c1)c1ccccc1] | WX052 |
| 53 | 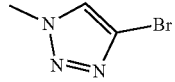 | AC-1 | 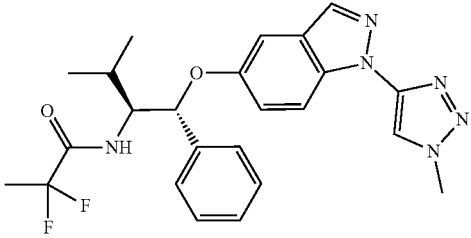 [SMILES: CC(C)[C@H](NC(=O)C(C)(F)F)[C@H](Oc1ccc2c(cnn2-c2cn(C)nn2)c1)c1ccccc1] | WX053 |
| 54 | 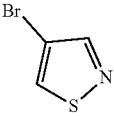 | AC-1 | 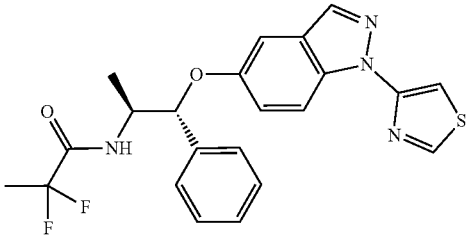 [SMILES: C[C@H](NC(=O)C(C)(F)F)[C@H](Oc1ccc2c(cnn2-c2cscn2)c1)c1ccccc1] | WX054 |
| 55 | 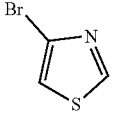 | AD-1 | 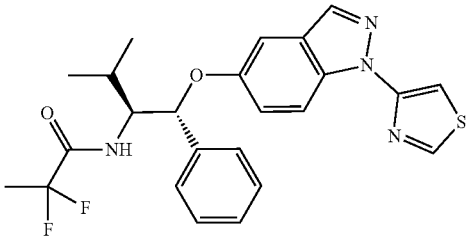 [SMILES: CC(C)[C@H](NC(=O)C(C)(F)F)[C@H](Oc1ccc2c(cnn2-c2cscn2)c1)c1ccccc1] | WX055 |
| 56 |  | AD-1 | 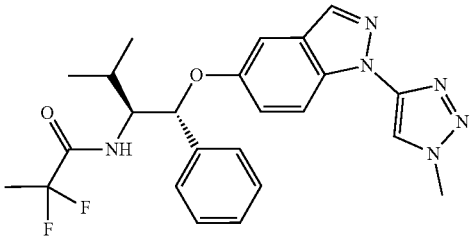 [SMILES: CC(C)[C@H](NC(=O)C(C)(F)F)[C@H](Oc1ccc2c(cnn2-c2cn(C)nn2)c1)c1ccccc1] | WX056 |
| 57 |  | AF-1 | 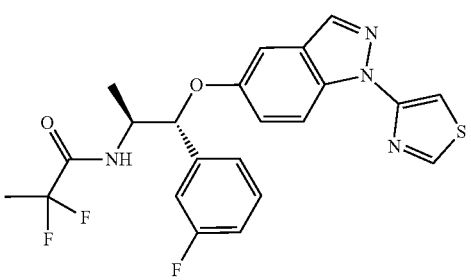 [SMILES: C[C@H](NC(=O)C(C)(F)F)[C@H](Oc1ccc2c(cnn2-c2cscn2)c1)c1cccc(F)c1] | WX057 |

Embodiment 58: Synthesis of compound WX058

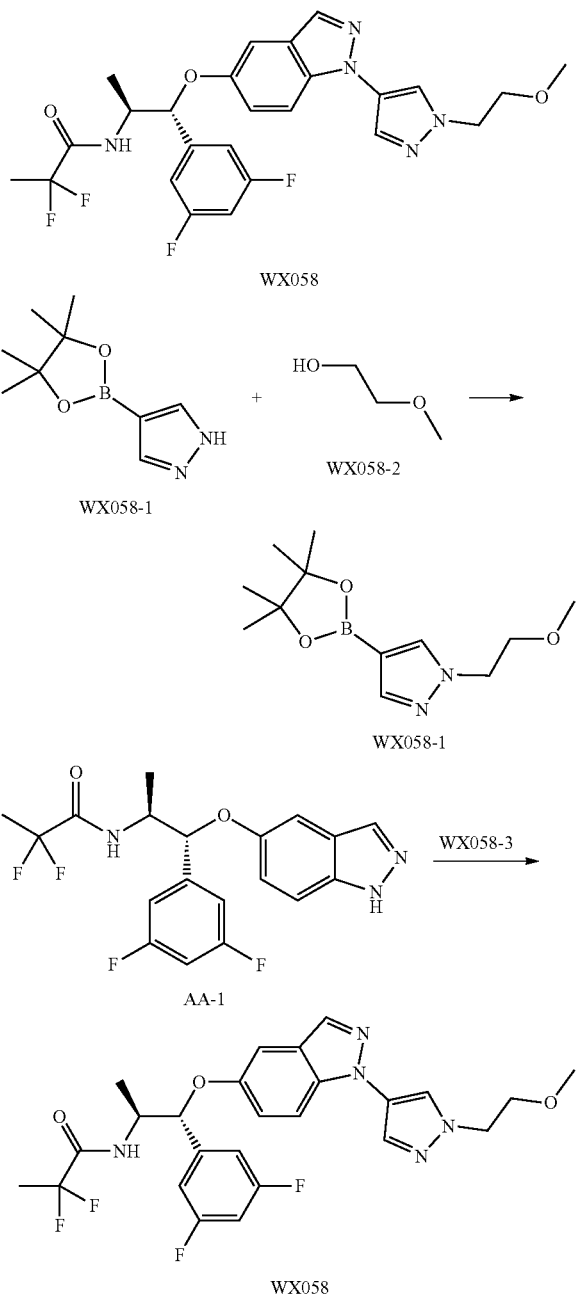

Step 1: Synthesis of Compound WX058-3

WX058-2 (196.08 mg) and WX058-1 (0.5 g) were added to a pre-dried round bottom flask, dissolved with tetrahydrofuran (15 mL), and then N,N,N,N-tetramethylazodicarbonamide (665.55 mg) and tributylphosphine (782.01 mg) were added thereto. After the reaction system was replaced with nitrogen for three times, the reaction was carried out at 20° C. for 12 hours. After the reaction was completed, water (30 mL) was added to the reaction solution, and the mixture was extracted with ethyl acetate (20 mL×2). The organic phases were combined, washed with saturated brine (15 mL×2), dried over anhydrous sodium sulfate, filtered, and the filtrate was concentrated under reduced pressure. The crude product was separated by column chromatography (eluent: petroleum ether/ethyl acetate=3/1-1/1, volume ratio) to obtain WX058-3.

Step 2: Synthesis of Compound WX058

Compound AA-1 (0.5 g) and compound WX058-3 (317.67 mg) were added to a pre-dried thumb bottle, dissolved with N,N-dimethylformamide (10 mL), and then copper acetate (457.71 mg) and pyridine (498.33 mg) were sequentially added thereto; the reaction system was replaced with oxygen for three times, and the reaction was carried out at 80° C. for 12 hours. After the reaction was completed, ammonia water (3 mL) and water (10 mL) were added to the reaction solution, and the mixture was stirred for 30 min, and filtered. The filtrate was added with ethyl acetate (20 mL) for extraction, and the organic phases were combined, washed with saturated brine (20 mL×2), dried over anhydrous sodium sulfate, filtered, and the filtrate was concentrated under reduced pressure. The crude product was separated and purified by preparative HPLC (columntype: Phenomenexluna C18 250×50 mm×10 μm; mobile phase: [$H_2O$ (0.1% TFA)-ACN]; B(ACN) %: 40%-60%, 10 min), 0.2 mL of concentrated hydrochloric acid was added to the solution, and the mixture was lyophilized to obtain WX058.

$^1$H NMR (400 MHz, $CD_3OD$) δ=8.12 (s, 1H), 8.00 (s, 1H), 7.88 (s, 1H), 7.53 (d, J=9.12 Hz, 1H), 7.24 (dd, J=9.12, 2.24 Hz, 1H), 7.01-7.12 (m, 3H), 6.79-6.92 (m, 1H), 5.27 (d, J=6.38 Hz, 1H), 4.38 (t, J=5.08 Hz, 2H), 4.29-4.35 (m, 1H), 3.79 (t, J=5.00 Hz, 2H), 3.35 (s, 3H), 1.60 (t, J=19.08 Hz, 3H), 1.38 (d, J=6.76 Hz, 3H).

MS-ESI m/z: 520.2 [M+H]$^+$.

Embodiment 59: Synthesis of compound WX059

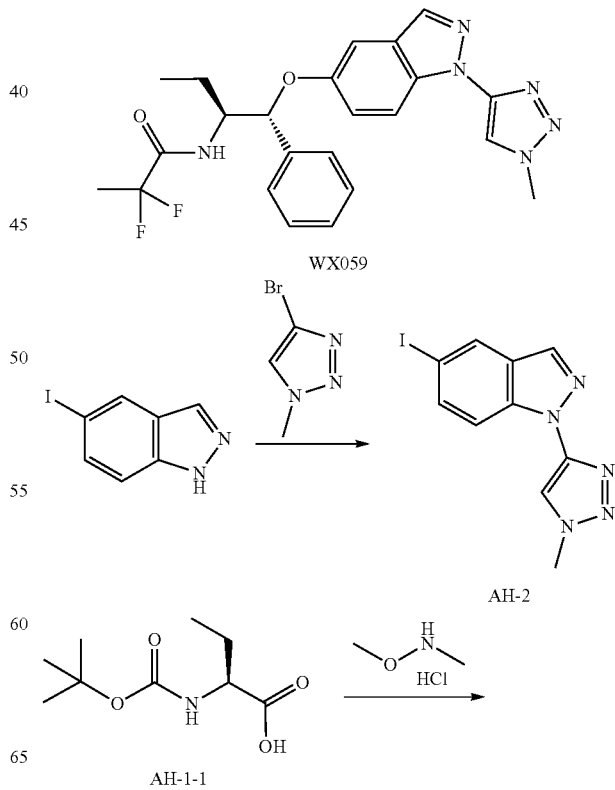

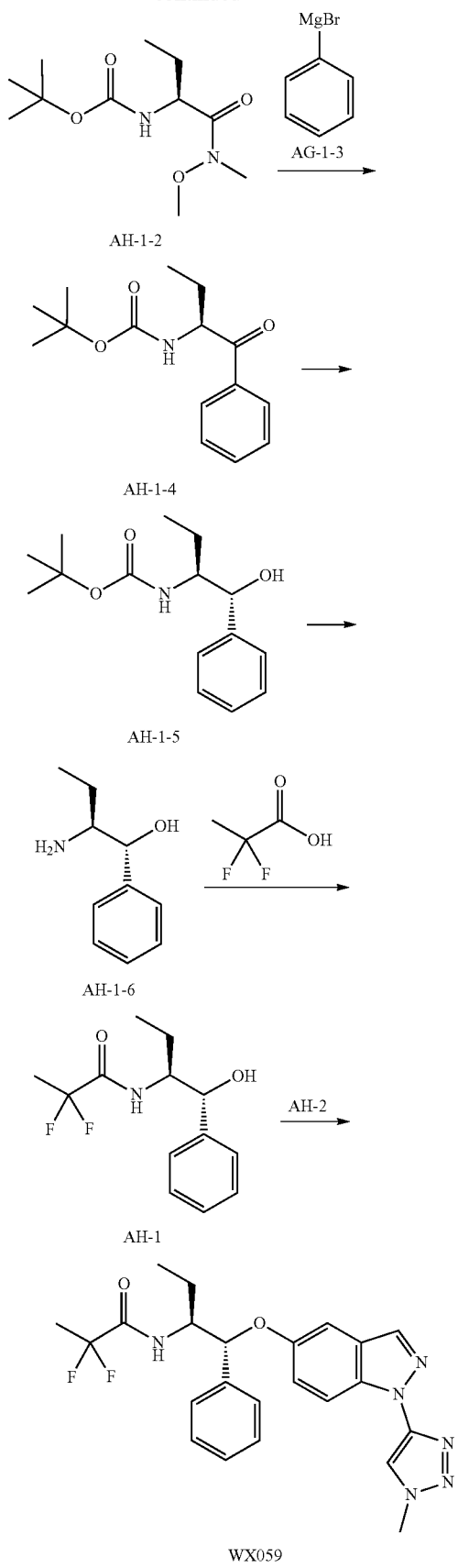

Referring to the synthesis method of the hydrochloride of AC-1-6 in reference embodiment 4, the hydrochloride of AH-1-6 was synthesized.

Step 1: Synthesis of Compound AH-1

AH-1-6 (1 g, hydrochloride) and 2,2-difluoropropionic acid (654.81 mg) were added to ethyl acetate (15 mL), and then N-methylmorpholine (2.51 g), 50% ethyl acetate solution of propylphosphonic anhydride (4.73 g, 4.42 mL) was added dropwise, and the reaction was stirred at 20° C. for 2 hours. After the reaction was completed, the reaction solution was poured into water (15 mL), and extracted with ethyl acetate (10 mL×3). The organic phases were combined, washed with saturated brine (30 mL), dried over anhydrous sodium sulfate, filtered, and the filtrate was concentrated under reduced pressure at 45° C. The crude product was slurried with a mixed solvent of (petroleum ether/ethyl acetate=3/1, volume ratio, 20 mL), filtered, and the solid was collected to obtain AH-1.

$^1$H NMR (400 MHz, DMSO-d$_6$) δ: 8.22 (d, J=9.2 Hz, 1H), 7.25-7.34 (m, 4H), 7.17-7.23 (m, 1H), 5.46 (s, 1H), 4.48 (d, J=7.6 Hz, 1H), 3.69-3.82 (m, 1H), 1.73-1.83 (m, 1H), 1.49-1.55 (m, 1H), 1.39-1.49 (m, 3H), 0.77 (t, J=7.4 Hz, 3H).

Step 2: Synthesis of Compound AH-2

In a dry single-necked flask, 5-iodo-1H indazole (5 g) and 4-bromo-1-methyl-1H-1,2,3-triazole (4.31 g) were added to 1,4-dioxane (100 mL), and then potassium carbonate (8.50 g) and (1R,2R)-N,N-dimethyl-1,2-cyclohexanediamine (1.46 g) were added thereto, and cuprous iodide (2.73 g) was added thereto under the protection of nitrogen; after the addition was completed, the reaction system was replaced with nitrogen for three times, and the reaction was carried out at 110° C. for 6 hours. The reaction solution was filtered, and water (500 mL) was added to the filtrate, and then the phases were separated, and the aqueous phase was extracted with ethyl acetate (200 mL×2). The organic phases were combined, washed with saturated brine (300 mL), dried over anhydrous sodium sulfate, filtered, and the filtrate was concentrated to dryness under reduced pressure. AH-2 was purified by column chromatography (mesh number of silica gel: 100-200 mesh, eluent: petroleum ether/ethyl acetate=10/1-1/1, volume ratio).

$^1$H NMR (400 MHz, DMSO-d$_6$) δ=8.49 (s, 1H), 8.33 (d, J=14.00 Hz, 2H), 8.06 (d, J=8.76 Hz, 1H), 7.81 (dd, J=8.82, 1.32 Hz, 1H), 4.15 (s, 3H).

Step 3: Synthesis of Compound WX059

Compound AH-1 (400 mg) and AH-2 (505.46 mg) were added to N,N-dimethylacetamide (8 mL), and then cesium carbonate (1.52 g), N,N-dimethylglycine (160.33 mg) were added thereto; after the reaction system was replaced with nitrogen, cuprous iodide (296.10 mg) was added thereto, and the reaction system was replaced with nitrogen for three times, and then the temperature was raised to 125° C. and the reaction was stirred for 16 hours under the protection of nitrogen. After the reaction was completed, the reaction solution was poured into water (20 mL), and extracted with ethyl acetate (10 mL×3). The organic phases were combined, washed with half-saturated brine (30 mL×2), washed with saturated brine (30 mL), and dried over anhydrous sodium sulfate. The organic phase was filtered, and the filtrate was concentrated under reduced pressure at 45° C. The crude product was separated by preparative HPLC (column type: Welch Xtimate C18 100×25 mm×3 μm; mobile phase: [H$_2$O (0.05% HCl)-ACN]; B(ACN) %: 30%-60%, 8 min) to obtain target compound WX059.

$^1$H NMR (400 MHz, CD$_3$OD) δ=8.15 (s, 1H), 8.03 (d, J=9.2 Hz, 1H), 8.01 (s, 1H), 7.44-7.42 (m, 2H), 7.34-7.30

(m, 2H), 7.22-7.29 (m, 2H), 7.06 (d, J=2.4 Hz, 1H), 5.23 (d, J=6.8 Hz, 1H), 4.18-4.25 (m, 1H), 4.17 (s, 3H), 1.93-2.05 (m, 1H), 1.78-1.70 (m, 1H), 1.49 (t, J=19.0 Hz, 3H), 0.95 (t, J=7.6 Hz, 3H).

MS-ESI m/z: 455.2 [M+H]$^+$.

Embodiment 60: Synthesis of compound WX060

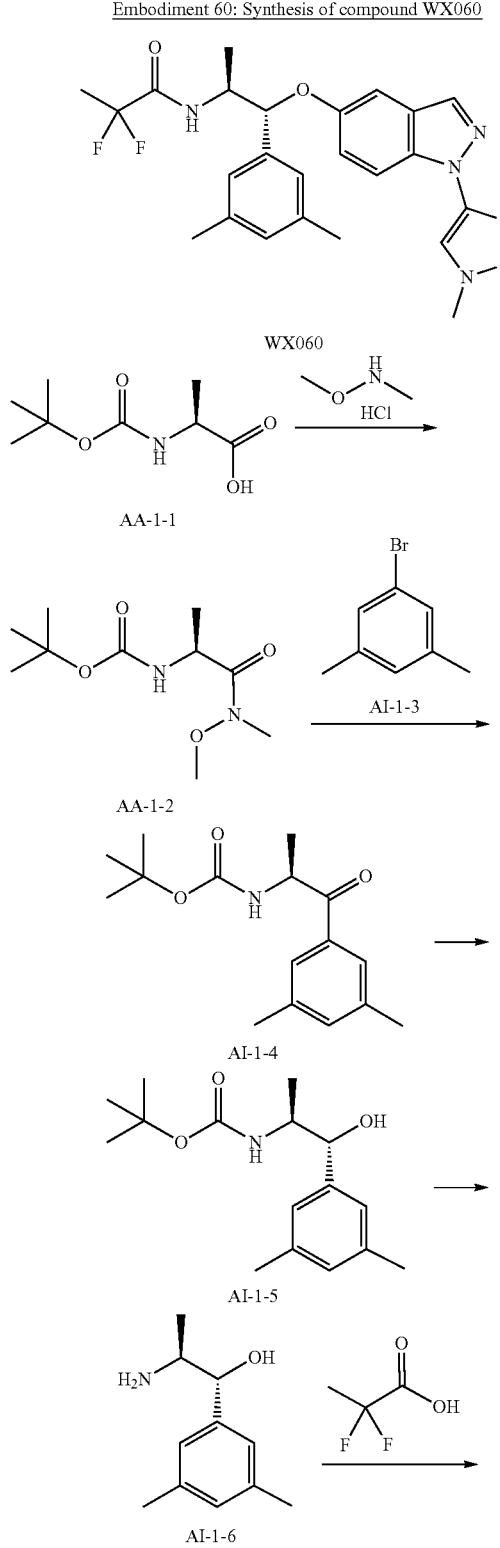

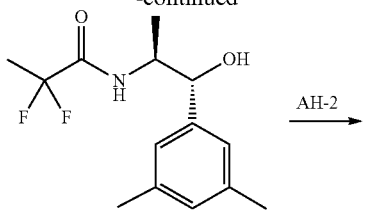

Referring to the synthesis method of AA-1-6 in reference embodiment 4, the hydrochloride of AI-1-6 was synthesized.

Step 1: Synthesis of Compound AI-1

AI-1-6 (1.57 g, hydrochloride) and 2,2-difluoropropionic acid (881.11 mg) were added to ethyl acetate (20 mL), and then N-methylmorpholine (3.68 g) was added thereto, and 50% ethyl acetate solution of propylphosphonic anhydride (6.95 g, 6.49 mL) was added dropwise thereto, and the reaction was stirred at 20° C. for 2 hours. After the reaction was completed, the reaction solution was poured into water (50 mL), and the phases were separated, and the organic phase was collected. The aqueous phase was extracted with ethyl acetate (20 mL), and the organic phases were combined. The organic phase was washed with saturated brine (50 mL), dried over anhydrous sodium sulfate, filtered, and the filtrate was concentrated under reduced pressure. The crude product was added with a mixed solvent of (petroleum ether/ethyl acetate=3/1, volume ratio, 30 mL) and stirred for 30 minutes. The solid was collected by filtration and dried under vacuum to obtain AI-1.

Step 2: Synthesis of Compound WX060

AI-1 (300 mg) and AH-2 (359.50 mg) were added to N,N-dimethylacetamide (6 mL), and then cesium carbonate (1.08 g), N,N-dimethylglycine (114.03 g) were added thereto. After the reaction system was replaced with nitrogen, cuprous iodide (210.60 mg) was added thereto, and the temperature was raised to 125° C. and the reaction was stirred for 16 hours under the protection of nitrogen. After the reaction was completed, the reaction solution was poured into water (20 mL), and extracted with ethyl acetate (10 mL×3). The organic phase was washed with half-saturated brine (30 mL×2), washed with saturated brine (30 mL), and dried over anhydrous sodium sulfate. The organic phase was filtered, and the filtrate was concentrated under reduced pressure at 45° C. The crude product was separated by preparative HPLC (column type: Phenomenex luna C18 80 mm×40 mm×3 μm; mobile phase: [H$_2$O (0.04% HCl)-ACN]; B(ACN) %: 50%-68%, 7 min), and then purified by thin layer chromatography (developing agent: petroleum ether/ethyl acetate=1/1, v/v) to obtain compound WX060.

$^1$H NMR (400 MHz, DMSO-d$_6$) δ: 8.69 (d, J=8.4 Hz, 1H), 8.40 (s, 1H), 8.20 (s, 1H), 8.10 (d, J=9.2 Hz, 1H), 7.28 (dd, J=9.0, 2.2 Hz, 1H), 7.08 (d, J=2.0 Hz, 1H), 7.01 (s, 2H), 6.88 (s, 1H), 5.21 (d, J=6.4 Hz, 1H), 4.13-4.19 (m, 1H), 4.12 (s, 3H), 2.23 (s, 6H), 1.53 (t, J=19.6 Hz, 3H), 1.28 (d, J=6.8 Hz, 3H).

MS-ESI m/z: 469.3 [M+H]$^+$.

Referring to the synthesis method of embodiment 60, fragment 1 was replaced with AI-1-3, and the embodiments in the following table were synthesized.

| Embodiment | Fragment 1 | Compound structure | Compound number |
|---|---|---|---|
| 61 | 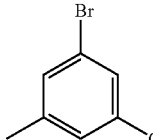 | 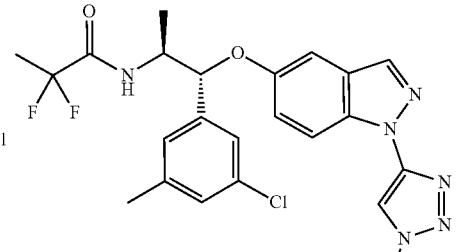 | WX061 |
| 62 | 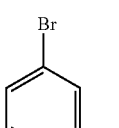 | 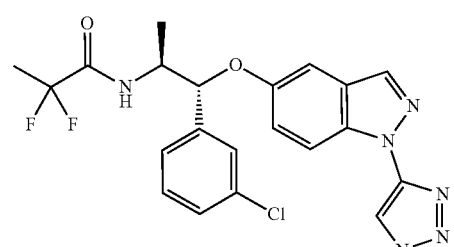 | WX062 |

NMR and MS Data of Each Reference Embodiment

| Reference embodiment | Compound | $^1$H-NMR | MS [M + H]$^+$ |
|---|---|---|---|
| 2 | AB-1-6 | $^1$H NMR (400 MHz, DMSO-$d_6$) δ = 7.11-7.01 (m, 3H), 4.38 (d, J = 7.4 Hz, 1H), 2.57 (dd, J = 4.0, 7.2 Hz, 1H), 1.89 (quin, J = 4.0, 6.8 Hz, 1H), 0.90 (d, J = 7.0 Hz, 3H), 0.81 (d, J = 6.8 Hz, 3H) | 216.1 |
| 8 | AC-1 | $^1$H NMR (400 MHz, DMSO-$d_6$) = 12.88 (br s, 1H), 8.68 (br d, J = 8.8 Hz, 1H), 7.86 (s, 1H), 7.37-7.43 (m, 2H), 7.32 (t, J = 7.4 Hz, 2H), 7.20-7.27 (m, 1H), 7.05 (dd, J = 2.2, 8.92 Hz, 1H), 6.97 (d, J = 1.8 Hz, 1H), 5.19 (d, J = 7.04 Hz, 1H), 4.14-4.26 (m, 1H), 1.47 (t, J = 19.4 Hz, 3H), 1.30 (d, J = 6.6 Hz, 3H) | 360.1 |
| 9 | AD-1 | $^1$H NMR (400 MHz, CDCl$_3$) δ = 7.86 (s, 1H) 7.35-7.41 (m, 7H) 7.10 (dd, J = 9.0, 2.2 Hz, 1H) 6.93 (d, J = 2.0 Hz, 1H) 6.33 (br d, J = 10.4 Hz, 1H) 5.24 (d, J = 5.8 Hz, 1H) 2.07-2.16 (m, 1H) 1.69-1.79 (m, 3H) 1.02 (dd, J = 8.2, 7.0 Hz, 6H) | 388.2 |

-continued

| Reference embodiment | Compound | ¹H-NMR | MS [M + H]⁺ |
|---|---|---|---|
| 11 | 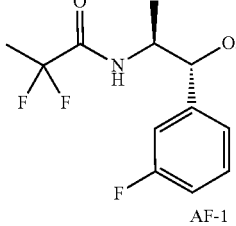 AF-1 | ¹H NMR (400 MHz, CDCl₃) δ = 7.92 (s, 1H), 7.45 (d, J = 9.0 Hz, 1H), 7.36 (dt, J = 5.8, 8.0 Hz, 1H), 7.22-7.17 (m, 2H), 7.11 (dd, J = 2.0, 9.6 Hz, 1H), 7.00 (dt, J = 2.0, 8.4 Hz, 1H), 6.91 (d, J = 2.2 Hz, 1H), 6.70 (br d, J = 8.4 Hz, 1H), 5.37 (d, J = 3.2 Hz, 1H), 4.46-4.37 (m, 1H), 1.83-1.70 (m, 3H), 1.24 (d, J = 7.0 Hz, 3H) | 378.2 |

15

NMR and MS Data of Each Embodiment

| Embodiments | Compound | ¹H-NMR | MS [M + H]⁺ |
|---|---|---|---|
| 3 | 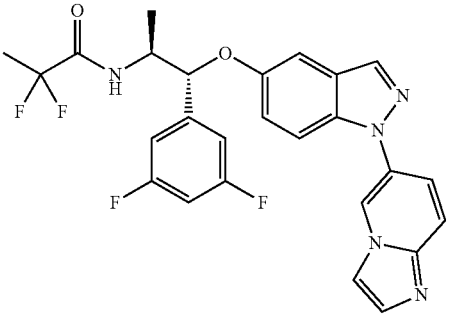 WX003 | ¹H NMR (400 MHz, CD₃OD) δ = 8.93 (s, 1H), 8.13 (s, 1H), 8.01 (s, 1H), 7.75 (s, 2H), 7.72 (d, J = 9.0 Hz, 2H), 7.28 (dd, J = 2.2, 9.2 Hz, 1H), 7.15 (d, J = 2.2 Hz, 1H), 7.07 (d, J = 6.0 Hz, 2H), 6.83-6.91 (m, 1H), 5.30 (d, J = 6.4 Hz, 1H), 4.35 (quin, J = 6.6 Hz, 1H), 1.61 (t, J = 19.0 Hz, 3H), 1.39 (d, J = 6.8 Hz, 3H) | 512.2 |
| 4 | 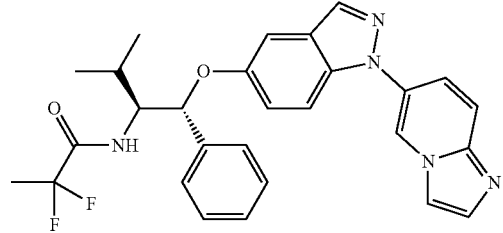 WX004 | ¹H NMR (400 MHz, CD₃OD) δ = 9.30 (s, 1H) 8.46 (dd, J = 9.8, 1.6 Hz, 1H) 8.32 (d, J = 1.8 Hz, 1H) 8.2 (s, 1H) 8.05-8.12 (m, 2H) 7.49 (d, J = 7.2 Hz, 2H) 7.24-7.32 (m, 4H) 7.21-7.24 (m, 1H) 5.31 (d, J = 9.0 Hz, 1H) 4.39 (dd, J = 9.0, 4.2 Hz, 1H) 2.43-2.50 (m, 1H) 1.39 (t, J = 19.0 Hz, 3H) 1.01 (dd, J = 7.0, 4.8 Hz, 6H) | 504.1 |
| 5 | 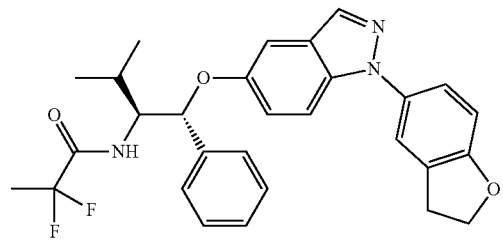 WX005 | ¹H NMR (400 MHz, CDCl₃) δ = 7.88 (d, J = 0.6 Hz, 1H) 7.43 (d, J = 9.0 Hz, 1H) 7.36-7.39 (m, 3H) 7.32 (t, J = 7.4 Hz, 2H) 7.23-7.29 (m, 2H) 7.04 (dd, J = 9.0, 2.2 Hz, 1H) 6.90 (d, J = 2.2 Hz, 1H) 6.83 (d, J = 8.4 Hz, 1H) 6.29 (d, J = 10.4 Hz, 1H) 5.21 (d, J = 6.0 Hz, 1H) 4.60 (t, J = 8.8 Hz, 2H) 4.37 (dt, J = 10.4, 5.2 Hz, 1H) 3.23 (t, J = 8.6 Hz, 2H) 2.08 (dq, J = 11.6, 6.8 Hz, 1H) 1.56-1.66 (m, 3H) 0.98 (dd, J = 7.8, 7.0 Hz, 6H) | 506.1 |
| 6 | 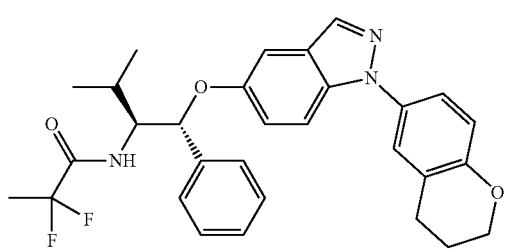 WX006 | ¹H NMR (400 MHz, CDCl₃) δ = 7.93 (s, 1H) 7.50 (d, J = 9.0 Hz, 1H) 7.41-7.44 (m, 2H) 7.33-7.40 (m, 3H) 7.31 (s, 2H) 7.09 (dd, J = 2.2, 1H) 6.95 (d, J = 2.2 Hz, 1H) 6.91 (d, J = 8.4 Hz, 1H) 6.33 (d, J = 9.8 Hz, 1H) 5.26 (d, J = 5.8 Hz, 1H) 4.41 (dt, J = 10.4, 5.2 Hz, 1H) 4.22-4.27 (m, 2H) 2.86 (t, J = 6.4 Hz, 2H) 2.10-2.17 (m, 1H) 2.03-2.07 (m, 2H) 1.61-1.71 (m, 3H) 1.03 (dd, J = 8.8, 6.8 Hz, 6H) | 520.2 |

| Embodiments | Compound | ¹H-NMR | MS [M + H]⁺ |
|---|---|---|---|
| 7 | 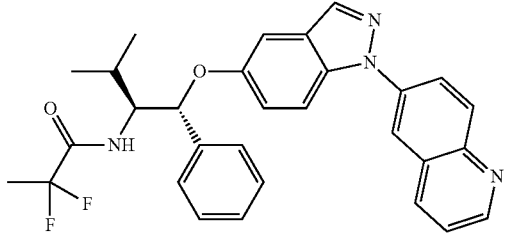 WX007 | ¹H NMR (400 MHz, CDCl₃) δ = 9.00 (s, 1H), 8.86 (d, J = 9.4 Hz, 1H), 8.73 (s, 1H), 8.45 (d, J = 8.4 Hz, 1H), 8.30 (s, 1H), 8.09 (s, 1H), 7.84 (s, 1H), 7.77 (d, J = 9.0 Hz, 1H), 7.36-7.46 (m, 4H), 7.30-7.35 (m, 1H), 7.23 (d, J = 8.0 Hz, 1H), 7.05 (s, 1H), 6.34 (d, J = 9.8 Hz, 1H), 5.32 (d, J = 5.8 Hz, 1H), 4.43 (td, J = 5.2, 10.4 Hz, 1H), 2.06-2.18 (m, 1H), 1.68 (t, J = 19.2 Hz, 3H), 1.04 (d, J = 6.8 Hz, 6H) | 515.1 |
| 8 | 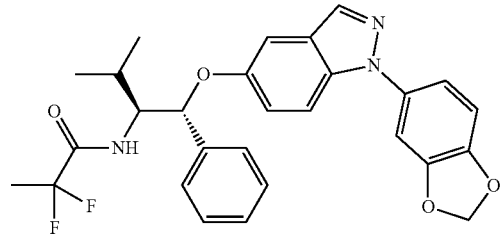 WX008 | ¹H NMR (400 MHz, CDCl₃) δ = 7.84 (s, 1H), 7.42 (d, J = 9.0 Hz, 1H), 7.25-7.38 (m, 4H), 7.16-7.24 (m, 1H), 7.03 (s, 1H), 6.99 (d, J = 11.2 Hz, 2H), 6.87 (s, 1H), 6.82 (d, J = 8.2 Hz, 1H), 6.25 (d, J = 9.4 Hz, 1H), 5.95 (s, 2H), 5.17 (d, J = 5.4 Hz, 1H), 4.27-4.37 (m, 1H), 2.04 (d, J = 5.4 Hz, 1H), 1.58 (t, J = 19.2 Hz, 3H), 0.87-0.99 (m, 1H), 0.94 (t, J = 7.0 Hz, 5H) | 508.1 |
| 9 | 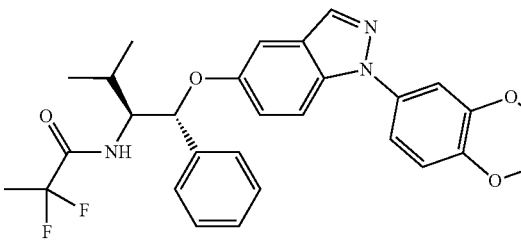 WX009 | ¹H NMR (400 MHz, CDCl₃) δ = 7.93 (s, 1H), 7.54 (d, J = 9.2 Hz, 1H), 7.34-7.45 (m, 4H), 7.31 (d, J = 7.2 Hz, 1H), 7.16 (d, J = 2.4 Hz, 1H), 7.11 (ddd, J = 2.4, 5.8, 8.6 Hz, 2H), 6.98 (d, J = 8.6 Hz, 1H), 6.95 (d, J = 2.0 Hz, 1H), 6.34 (d, J = 10.2 Hz, 1H), 5.26 (d, J = 5.8 Hz, 1H), 4.41 (td, J = 5.2, 10.2 Hz, 1H), 4.31 (s, 4H), 2.08-2.20 (m, 1H), 1.66 (t, J = 19.32 Hz, 3H), 1.03 (dd, J = 7.0, 8.4 Hz, 6H) | 522.2 |
| 12 | 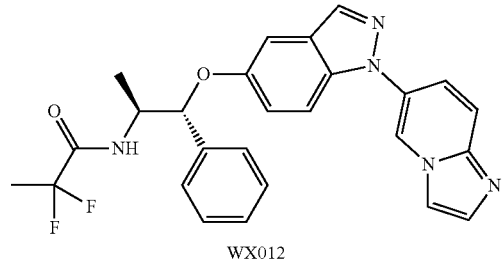 WX012 | ¹H NMR (400 MHz, DMSO-d₆) δ = 9.08 (s, 1H), 8.72 (d, J = 8.4 Hz, 1H), 8.23 (s, 1H), 8.06 (s, 1H), 7.72-7.81 (m, 2H), 7.70 (s, 1H), 7.65 (d, J = 9.4 Hz, 1H), 7.39-7.45 (m, 2H), 7.35 (t, J = 7.4 Hz, 2H), 7.27 (d, J = 7.2 Hz, 1H), 7.20-7.25 (m, 1H), 7.14 (d, J = 2.0 Hz, 1H), 5.29 (d, J = 7.0 Hz, 1H), 4.16-4.29 (m, 1H), 1.50 (t, J = 19.6 Hz, 3H), 1.32 (d, J = 6.8 Hz, 3H) | 476.1 |
| 13 | 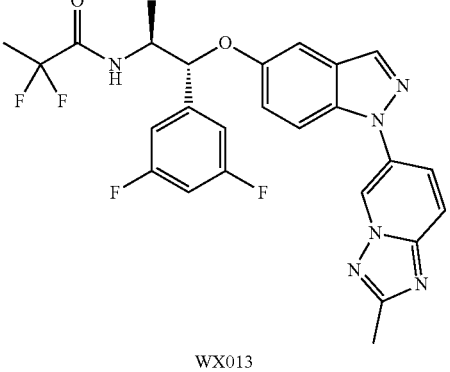 WX013 | ¹H NMR (400 MHz, DMSO-d₆) δ = 9.33 (1H, s) 8.77 (1H, d, J = 8.80 Hz) 8.29 (1H, s) 8.00 (1H, dd, J = 9.6, 2.0 Hz) 7.89 (1H, d, J = 9.4 Hz) 7.79 (1H, d, J = 9.0 Hz) 7.06-7.28 (5 H, m) 5.28 (1H, d, J = 7.4 Hz) 4.00 - 4.28 (1H, m) 2.50 (3H, s) 1.57 (3H, t, J = 19.6 Hz) 1.34 (3H, d, J = 6.8 Hz) | 527.2 |

-continued

| Embodiments | Compound | ¹H-NMR | MS [M + H]⁺ |
|---|---|---|---|
| 14 | WX014 | ¹H NMR (400 MHz, CD₃OD) δ = 8.88 (dd, J = 5.6, 1.2 Hz, 1H) 8.48 (dd, J = 10.4, 1.2 Hz, 1H) 8.10-8.33 (m, 4H) 7.89 (d, J = 9.6 Hz, 1H) 7.61 (dd, J = 12.8, 4.4 Hz, 1H) 7.30 (dd, J = 9.0, 2.4 Hz, 1H) 7.17 (d, J = 2.20 Hz, 1H) 7.04 - 7.12 (m, 2H) 6.88 (t, J = 2.2 Hz, 1H) 5.31 (d, J = 6.2 Hz, 1H) 4.29-4.44 (m, 1H) 1.61 (t, J = 19.0 Hz, 3H) 1.40 (d, J = 6.8 Hz, 3H) | 523.2 |
| 19 | WX019 | ¹H NMR (400 MHz, DMSO-d₆) δ = 9.29 (s, 1H), 9.10 (s, 1H), 8.76 (d, J = 9.2 Hz, 1H), 8.30 (s, 1H), 7.97 (d, J = 10.0 Hz, 1H), 7.90 (d, J = 9.2 Hz, 1H), 7.83 (d, J = 9.6, 2.0 Hz, 1H), 7.28 (dd, J = 9.2, 2.4 Hz, 1H), 7.23 (d, J = 2.0 Hz, 1H), 7.08-7.20 (m, 3H), 5.30 (d, J = 7.6 Hz, 1H), 4.20-4.29 (m, 1H), 1.57 (t, J = 19.6 Hz, 3H), 1.35 (d, J = 6.8 Hz, 3H) | 513.2 |
| 20 | WX020 | ¹H NMR (400 MHz, CD₃OD) δ = 9.66 (d, J = 2.4 Hz, 1H), 9.35 (d, J = 2.5 Hz, 1H), 8.66 (s, 1H), 8.16 (s, 1H), 8.12 (d, J = 10.2 Hz, 1H), 7.74 (d, J = 9.2 Hz, 1H), 7.47 (d, J = 7.6 Hz, 2H), 7.32-7.27 (m, 2H), 7.26-7.19 (m, 3H), 5.29 (d, J = 9.2 Hz, 1H), 4.39 (td, J = 4.8, 9.4 Hz, 2H), 2.45 (dd, J = 6.8, 11.8 Hz, 1H), 1.38 (t, J = 19.2 Hz, 3H), 1.00 (t, J = 6.2 Hz, 6H) | 506.2 |
| 22 | WX022 | ¹HNMR (400 MHz, DMSO-d₆) δ = 9.27 (s, 1H), 9.07 (s, 1H), 8.71 (d, J = 8.6 Hz, 1H), 8.27-8.27 (m, 1H), 8.27 (s, 1H), 7.96 (d, J = 9.8 Hz, 1H), 7.87 (d, J = 9.0 Hz, 1H), 7.81 (dd, J = 2.0, 9.8 Hz, 1H), 7.39-7.44 (m, 2H), 7.34 (t, J = 7.4 Hz, 2H), 7.22-7.28 (m, 2H), 7.15 (d, J = 12.0 Hz, 1H), 5.29 (d, J = 6.8 Hz, 1H), 4.20-4.27 (m, 1H), 1.49 (t, J = 19.4 Hz, 3H), 1.32 (d, J = 6.8 Hz, 3H) | 477.1 |

-continued

| Embodiments | Compound | ¹H-NMR | MS [M + H]⁺ |
|---|---|---|---|
| 23 | 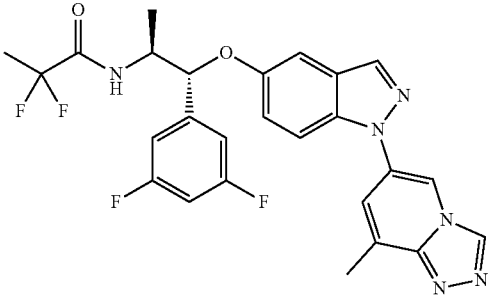 WX023 | ¹H NMR (400 MHz, DMSO-d₆) δ = 9.27 (s, 1H) 8.95 (s,1H) 8.77 (d, 1H, J = 8.8 Hz) 8.29 (s, 1H) 7.89 (d,1H, J = 9.2 Hz) 7.64-7.68 (m, 1H) 7.08-7.30 (m, 5H) 5.29 (d, J = 7.4 Hz, 1H) 4.20-4.29 (m, 1H) 2.60-2.69 (m, 3H) 1.57 (t, J = 19.6 Hz, 3H) 1.32-1.39 (m, 3H) | 527.2 |
| 27 | 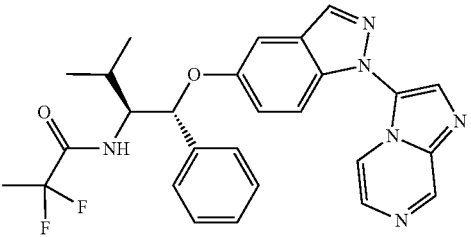 WX027 | ¹H NMR (400 MHz, CDCl₃) δ = 9.19 (s, 1H) 8.23 (s, 1H) 8.09 (s, 1H) 7.87-8.01 (m, 1H) 7.24-7.37 (m, 6H) 7.14 (dd, J = 9.10, 1.8 Hz, 1H) 6.98 (d, J = 2.2 Hz, 1H) 6.23 (d, J = 9.6 Hz, 1H) 5.23 (d, J = 5.8 Hz, 1H) 4.35 (dt, J = 10.4, 5.2 Hz, 1H) 1.99-2.07 (m, 1H) 1.60 (t, J = 19.4 Hz, 3H) 0.96 (dd, J = 6.8, 1.8 Hz, 6H) | 505.1 |
| 28 | 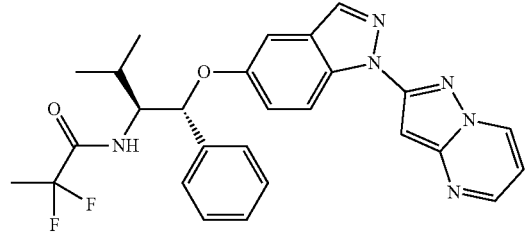 WX028 | ¹H NMR (400 MHz, CDCl₃) δ = 8.67 (br, 1H), 8.50 (s, 1H), 8.41 (d, J = 9.2 Hz, 1H), 8.06 (s, 1H), 7.30-7.48 (m, 5H), 7.25 (s, 1H), 7.00 (d, J = 9.4 Hz, 1H), 6.82 (s, 1H), 6.73-6.88 (m, 1H), 6.26-6.41 (m, 1H), 5.23-5.35 (m, 1H), 4.37-4.48 (m, 1H), 2.14 (dd, J = 5.8, 12.4 Hz, 1H), 1.67 (dt, J = 2.2, 19.2 Hz, 3H), 0.97-1.09 (m, 6H) | 505.1 |
| 29 | 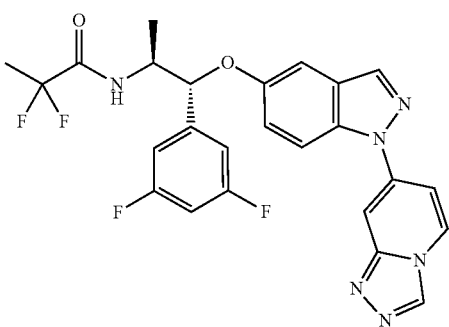 WX029 | ¹H NMR (400 MHz, CDCl₃) δ = 8.70 (s, 1H) 8.49 (s, 1H) 7.95-8.15 (m, 3H) 7.30 (d, J = 8.0 Hz, 1H) 6.84-7.00 (m, 3H) 6.63-6.77 (m, 2H) 5.37 (s, 1H) 4.33 (s, 1H) 1.70 (t, J = 19.2 Hz, 3H) 1.23 (d, J = 6.86 Hz, 3H) | 513.2 |
| 30 | 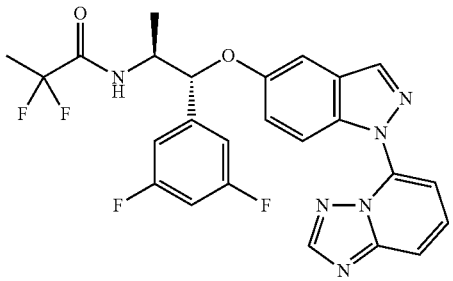 WX030 | ¹H NMR (400 MHz, DMSO-d₆) δ = 8.81 (d, J = 9.0 Hz, 1H) 8.56 (s, 1H) 8.42 (s, 1H) 8.04 (d, J = 8.8 Hz, 1H) 7.88 (t, J = 8.0 Hz, 1H) 7.48 (d, J = 7.2 Hz, 1H) 7.23-7.34 (m, 2H) 7.20 (dd, J = 9.0, 2.2 Hz, 1H) 7.08-7.18 (m, 3H) 4.15-4.32 (m, 1H) 5.31 (d, J = 7.4 Hz, 1H) 1.57 (t, J = 19.4 Hz, 3H) 1.35 (d, J = 6.8 Hz, 3H) | 513.2 |

-continued

| Embodiments | Compound | ¹H-NMR | MS [M + H]⁺ |
|---|---|---|---|
| 36 | 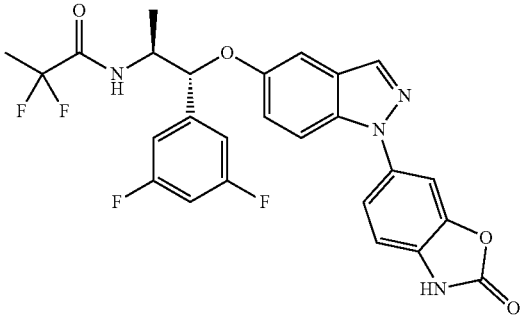 WX036 | ¹H NMR (400 MHz, DMSO-d₆) δ = 11.81 (s, 1H) 8.72 (d, J = 8.2 Hz, 1H) 8.16 (s, 1H) 7.67 (d, J = 9.0 Hz, 1H) 7.62 (s, 1H) 7.45 (dd, J = 8.2, 2.0 Hz, 1H) 7.06-7.23 (m, 6H) 5.24 (d, J = 7.6 Hz, 1H) 4.21 (s, 1H) 1.54 (t, J = 19.4 Hz, 3H) 1.31 (d, J = 6.8 Hz, 3H) | 529.2 |
| 38 | 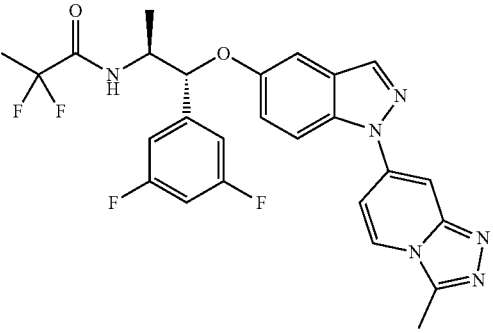 WX038 | ¹H NMR (400 MHz, DMSO-d₆) δ = 8.76 (1H, d, J = 8.8 Hz) 8.67 (1H, d, J = 7.5 Hz) 8.42 (1H, s) 8.09 (1H, s) 8.10 (1H, d, J = 9.6 Hz) 7.76 (1H, d, J = 7.64Hz) 7.35 (1H, d, J = 9.2 Hz) 7.29 (1H, s) 7.10-7.20 (3H, m) 5.33 (1H, d, J = 7.2 Hz) 4.21-4.31 (1H, m) 2.77 (3H, s) 1.58 (3H, t, J = 19.4 Hz) 1.35 (3H, d, J = 6.6 Hz) | 527.2 |
| 40 | 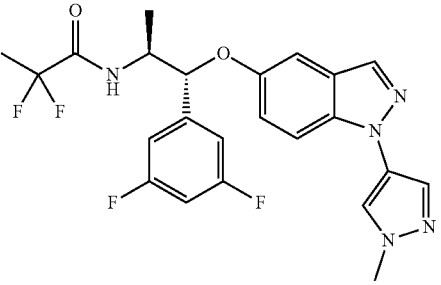 WX040 | ¹H NMR (400 MHz, CD₃OD) δ = 8.08 (br s, 1H), 7.99 (s, 1H), 7.84 (br s, 1H), 7.52 (br d, J = 8.8 Hz, 1H), 7.23 (dd, J = 1.6, 9.0 Hz, 1H), 7.11 - 7.02 (m, 3H), 6.85 (br s, 1H), 5.27 (d, J = 6.4 Hz, 1H), 4.33 (br t, J = 6.6 Hz, 1H), 3.97 (s, 3H), 1.59 (t, J = 19.2 Hz, 3H), 1.37 (br d, J = 6.8 Hz, 3H) | 476.0 |
| 41 | 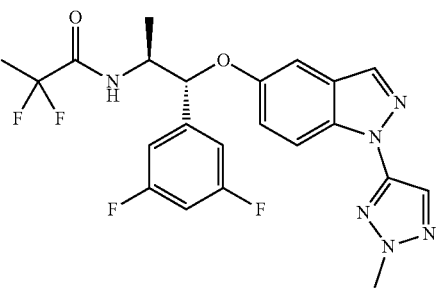 WX041 | ¹H NMR (400 MHz, CD₃OD) δ = 8.74 (br d, J = 8.4 Hz, 1H), 8.19 - 8.05 (m, 2H), 7.87 (s, 1H), 7.30 (br d, J = 8.8 Hz, 1H), 7.16 - 7.03 (m, 3H), 6.86 (br t, J = 9.0 Hz, 1H), 5.29 (br d, J = 6.2 Hz, 1H), 4.35 (br d, J = 6.8 Hz, 1H), 4.23 (s, 3H), 1.60 (br t, J = 19.2 Hz, 3H), 1.38 (br d, J = 6.8 Hz, 3H) | 477.0 |

| Embodiments | Compound | ¹H-NMR | MS [M + H]⁺ |
|---|---|---|---|
| 42 | (structure) | ¹H NMR (400 MHz, DMSO-d₆) = 8.33 (br d, J = 10.0 Hz, 1H) 8.26 (s, 1H) 8.13 (s, 1H) 7.85 (s, 1H) 7.64 (d, J = 9.0 Hz, 1H) 7.08 - 7.24 (m, 5H) 5.33 (d, J = 9.6 Hz, 1H) 4.17 (td, J = 9.6, 4.00 Hz, 1H) 3.91 (s, 3H) 2.41 (br dd, J = 11.2, 6.75 Hz, 1H) 2.37-2.37 (m, 1H) 1.52 (t, J = 19.4 Hz, 3H) 0.92 (d, J = 6.8 Hz, 6H) | 504.2 |
| 43 | WX043 | ¹H NMR (400 MHz, CD₃OD) δ = 8.07 (s, 1H), 7.96 (s, 1H), 7.84 (s, 1H), 7.43-7.52 (m, 3H), 7.3-7.34 (t, J = 7.4 Hz, 2H), 7.24 - 7.28 (m, 1H), 7.05 (d, J = 2.0 Hz, 1H), 5.27 (d, J = 6.0 Hz, 1H), 4.36 (m, 1H), 3.98 (s, 3H), 1.54 (t, J = 19.2 Hz, 3H), 1.36 (d, J = 7.0 Hz, 3H) | 440.1 |
| 44 | WX044 | ¹H NMR (400 MHz, CD₃OD) δ = 8.70 - 8.61 (m, 1H), 8.10 (s, 1H), 7.94 (s, 1H), 7.82 (s, 1H), 7.50 (d, J = 9.2 Hz, 1H), 7.44 (d, J = 7.4 Hz, 2H), 7.34 (t, J = 7.4 Hz, 2H), 7.30 - 7.20 (m, 2H), 7.04 (d, J = 2.0 Hz, 1H), 5.27 (d, J = 6.0 Hz, 1H), 4.59 (td, J = 6.8, 13.4 Hz, 1H), 4.42-4.33 (m, 1H), 1.60-1.47 (m, 9H), 1.36 (d, J = 6.8 Hz, 3H) | 468.3 |
| 45 | WX045 | ¹H NMR (400 MHz, CDCl₃) δ = 7.91 (s, 1H) 7.80 (s, 1H) 7.73 (s, 1H) 7.35-7.44 (m, 5H) 7.28-7.32 (m, 1H) 7.09-7.15 (m, 1H) 6.95 (d, J = 1.8 Hz, 1H) 6.34 (br d, J = 10.2 Hz, 1H) 5.26 (d, J = 5.8 Hz, 1H) 4.41 (dt, J = 10.2, 5.19 Hz, 1H) 3.98 (s, 3H) 2.05 - 2.17 (m, 1H) 1.66 (t, J = 19.2 Hz, 3H) 1.02 (t, J = 6.46 Hz, 6H) | 468.2 |
| 46 | WX046 | ¹H NMR (400 MHz, DMSO-d₆) δ = 8.75 (br d, J = 8.8 Hz, 1H) 8.33 (s, 1H) 8.15 (s, 1H) 7.82 (s, 1H) 7.74 (d, J = 9.2 Hz, 1H) 7.32-7.43 (m, 1H) 7.17 - 7.29 (m, 3H) 7.00-7.16 (m, 3H) 5.27 (d, J = 7.2 Hz, 1H) 4.15 - 4.29 (m, 1H) 1.51 (t, J = 19.4 Hz, 3H) 1.33 (d, J = 6.6 Hz, 3H) | 444.2 |

| Embodiments | Compound | ¹H-NMR | MS [M + H]⁺ |
|---|---|---|---|
| 47 | WX047 | ¹H NMR (400 MHz, DMSO-d₆) δ = 8.06 (s, 1H), 7.99 (s, 1H), 7.82 (s, 1H), 7.52 (br d, J = 9.1 Hz, 1H), 7.22 (br dd, J = 1.4, 9.1 Hz, 1H), 7.14 - 6.99 (m, 3H), 6.85 (br t, J = 9.0 Hz, 1H), 5.22 (br d, J = 7.2 Hz, 1H), 4.17 (br t, J = 7.2 Hz, 1H), 3.97 (s, 3H), 2.07 - 1.94 (m, 1H), 1.81 - 1.68 (m, 1H), 1.59 (br t, J = 19.0 Hz, 3H), 0.96 (br t, J = 7.4 Hz, 3H) | 490.2 |
| 50 | WX050 | ¹H NMR (400 MHz, CD₃OD) δ = 9.04 (s, 1H) 8.91 (s, 1H) 8.04 (s, 1H) 7.70 (d, J = 8.8 Hz, 1H) 7.26 (dd, J = 8.8, 2.2 Hz, 1H) 7.11 (d, J = 1.8 Hz, 1H) 7.04 (br d, J = 6.4 Hz, 2H) 6.77-6.90 (m, 1H) 5.27 (d, J = 6.2 Hz, 1H) 4.33 (quin, J = 6.8 Hz, 1H) 1.58 (t, J = 19.2 Hz, 3H) 1.36 (d, J = 7.0 Hz, 3H) | 479.1 |
| 51 | WX051 | ¹H NMR (400 MHz, CD₃OD) δ = 8.73 (br d, J = 8.4 Hz, 1H), 8.17 (s, 1H), 8.08 (d, J = 9.0 Hz, 2H), 7.29 (dd, J = 2.4, 9.2 Hz, 1H), 7.11 (d, J = 2.2 Hz, 1H), 7.07 (dd, J = 2.2, 8.0 Hz, 2H), 6.86 (tt, J = 2.4, 9.2 Hz, 1H), 5.29 (d, J = 6.4 Hz, 1H), 4.39 - 4.30 (m, 1H), 4.18 (s, 3H), 1.60 (t, J = 19.0 Hz, 3H), 1.38 (d, J = 6.8 Hz, 3H) | 477.1 |
| 52 | WX052 | ¹H NMR (400 MHz, CD₃OD) δ = 9.05 (br s, 1H) 8.25 (d, J = 9.2 Hz, 1H) 8.02 (br s, 1H) 7.52 (s, 1H) 7.45 (d, J = 7.6 Hz, 2H) 7.35 (t, J = 7.6 Hz, 2H) 7.22 - 7.29 (m, 2H) 7.05 (d, J = 2.2 Hz, 1H) 5.28 (d, J = 6.0 Hz, 1H) 4.37 (br t, J = 6.6 Hz, 1H) 1.53 (t, J = 19.0Hz, 3H) 1.37 (d, J = 6.8 Hz, 3H) | 443.1 |
| 53 | WX053 | ¹H NMR (400 MHz, CD₃OD) δ = 8.14 (s, 1H), 8.04 (d, J = 9.2 Hz, 1H), 7.99 (s, 1H), 7.44 (d, J = 7.8 Hz, 2H), 7.34 (t, J = 7.6 Hz, 2H), 7.29-7.24 (m, 2H), 7.05 (d, J = 2.2 Hz, 1H), 5.28 (d, J = 6.2 Hz, 1H), 4.37 (t, J = 6.6 Hz, 1H), 4.16 (s, 3H), 1.54 (t, J = 19.2 Hz, 3H), 1.36 (d, J = 6.8 Hz, 3H) | 441.1 |

-continued

| Embodiments | Compound | ¹H-NMR | MS [M + H]⁺ |
|---|---|---|---|
| 54 | WX054 | ¹H NMR (400 MHz, CD₃OD) δ = 9.07 (s, 1H), 8.95 (s, 1H), 8.04 (s, 1H), 7.71 (d, J = 9.2 Hz, 1H), 7.45 (br d, J = 7.0 Hz, 2H), 7.35 (t, J = 7.6 Hz, 2H), 7.31-7.24 (m, 2H), 7.12 (s, 1H), 5.30 (d, J = 5.9 Hz, 1H), 4.44 - 4.33 (m, 1H), 1.54 (t, J = 19.0 Hz, 3H), 1.37 (d, J = 7.0 Hz, 3H) | 443.1 |
| 55 | WX055 | ¹H NMR (400 MHz, CD₃OD) δ = 9.04 (d, J = 2.3 Hz, 1H), 8.24 (d, J = 9.0 Hz, 1H), 8.15(br d, J = 9.6 Hz, 1H), 8.03 (s, 1H), 7.52 (d, J = 2.3 Hz, 1H), 7.49 (br d, J = 6.9 Hz, 2H), 7.35-7.29 (m, 2H), 7.27-7.24 (m, 1H), 7.23-7.18 (m, 1H), 7.12 (d, J = 2.2 Hz, 1H), 5.26 (d, J = 9.2 Hz, 1H), 4.42-4.35 (m, 1H), 2.53-2.43 (m, 1H), 1.39 (t, J = 19.2 Hz, 3H), 1.02 (dd, J = 5.0, 6.8 Hz, 6H) | 471.2 |
| 56 | WX056 | ¹H NMR (400 MHz, DMSO-d₆) δ = 8.40 (s, 1H), 8.29 (d, J = 10.0 Hz, 1H), 8.21 (d, J = 0.4 Hz, 1H), 8.08 (d, J = 8.8 Hz, 1H), 7.49 (d, J = 7.2 Hz, 2H), 7.27-7.33 (m, 2H), 7.19-7.26 (m, 2H), 7.12 (d, J = 2.0 Hz, 1H), 5.31 (d, J = 9.6 Hz, 1H), 4.20-4.25 (m, 1H), 4.12 (s, 3H), 2.40-2.45 (m, 1H), 1.38 (t, J = 19.4 Hz, 3H), 0.92 (dd, J = 6.4,5.6Hz, 6H) | 469.2 |
| 57 | WX057 | ¹H NMR (400 MHz, CD₃OD) δ = 9.05 (d, J = 2.4 Hz, 1H), 8.28 (d, J = 9.2 Hz, 1H), 8.04 (d, J = 1.0 Hz, 1H), 7.53 (d, J = 2.4 Hz, 1H), 7.40 - 7.33 (m, 1H), 7.29 - 7.23 (m, 2H), 7.19 (td, J = 2.2, 9.6 Hz, 1H), 7.07 (d, J = 2.2 Hz, 1H), 7.04 - 6.97 (m, 1H), 5.29 (d, J = 6.4 Hz, 1H), 4.36 (t, J = 6.6 Hz, 1H), 1.57 (t, J = 19.2 Hz, 3H), 1.38 (d, J = 7.0 Hz, 3H) | 461.1 |
| 61 | WX061 | ¹H NMR (400 MHz, CD₃OD) δ = 8.68 (br d, J = 9.2 Hz, 1H), 8.17 (s, 1H), 8.07 (br d, J = 9.0 Hz, 2H), 7.28 (dd, J = 2.4, 9.2 Hz, 1H), 7.22 (br d, J = 16.6 Hz, 2H), 7.14-7.03 (m, 2H), 5.22 (d, J = 6.4 Hz, 1H), 4.37 - 4.27 (m, 1H), 4.18 (s, 3H), 2.31 (s, 3H), 1.57 (t, J = 19.2 Hz, 3H), 1.37 (d, J = 7.0 Hz, 3H) | |

| Embodi-ments | Compound | ¹H-NMR | MS [M + H]⁺ |
|---|---|---|---|
| 62 | WX062 | ¹H NMR (400 MHz, CD$_3$OD) δ = 8.71 (br d, J = 8.6 Hz, 1H), 8.16 (s, 1H), 8.10-8.02 (m, 2H), 7.46 (s, 1H), 7.41-7.36 (m, 1H), 7.33 (t, J = 7.8 Hz, 1H), 7.30-7.25 (m, 2H), 7.08 (d, J = 2.2 Hz, 1H), 5.27 (d, J = 6.4 Hz, 1H), 4.42-4.29 (m, 1H), 4.17 (s, 2H), 4.20-4.15 (m, 1H), 1.57 (t, J = 19.2 Hz, 3H), 1.38 (d, J = 7.0 Hz, 3H) | 475.1 |

Experimental Embodiment 1: In Vitro Detection of hMMP1 Transcription Repression Activity of Compounds Under the Luciferase Reporter Gene Screening System Experimental Purposes:

Human MMP-1 promoter region (containing two AP-1 binding sites and two PEA3 sites, a total of 249 bp, GenBank catalog #AF023338) was cloned into the upstream of luciferase reporter gene. The hMMP-1 promoter reporter gene was constructed and transfected into Hela cells so that luciferase production could be easily detected. A stable recombinant hMMP-1/luciferase cell line was used for the development and validation of this experiment.

Culture Medium and Reagents:

1. Conventional Cell Culture Medium

DMEM 90%, FBS 10%, 1 mM NEAA, 1 mM Sodium Pyruvate, 4 mM L-Glutamine, 300 μg/mL G418, stored at 4° C.

2. Freezing Liquid

DMEM 75%, FBS 20%, DMSO 5%. Prepared before use.

3. Experimental Cell Culture Medium

DMEM 97%, serum treated with activated carbon (Charcoal stripped serum) 3%.

4. Bright-Glo Kit

A bottle of Bright Glo Buffer was transferred to a brown fluorescent substrate bottle, inverted and mixed until the substrate was completely dissolved, dispensed in an appropriate amount, and stored at −80° C.

Method

Prepared Cell Suspensions with Frozen Cells
1. Cell Thawing
   1) Frozen cells were thawed quickly and placed in a 37° C. water bath with constant stirring until completely dissolved.
   2) The cells were added to a 15 mL centrifuge tube (containing 5 mL of pre-heated cell culture medium), and then centrifuged at 1000 rpm for 5 minutes.
   3) The supernatant was discarded, and 5 mL of pre-heated cell culture medium was added to resuspend the cells.
   4) The cell suspension was transferred to a 60 mM cell culture dish and cultured in a 5% CO$_2$ incubator at 37° C.
2. Passage Culture
   1) When the cell growth reached 80-90%, the cells were passage cultured. pGL6.0-TA-hMMP-1 HeLa cells were typically passaged twice a week at 1:3 or 1:6 dilution.
   2) All the culture media were carefully aspirated, and the cell layer was rinsed gently with an appropriate amount of DPBS, and then aspirated.
   3) An appropriate amount of 0.05% Typsine EDTA was added and incubated in a CO$_2$ incubator for 3-5 minutes to digest the cells.
   4) The cells were resuspended with an appropriate amount of pre-heated cell culture medium, and diluted and passage cultured.
3. Changed the Culture Medium Every Other Day
   1) All culture media were gently aspirated.
   2) Fresh cell culture medium was added (pre-heated at 37° C.) (added 10 mL to 100 mm dish or 20 mL to 150 mm dish).
4. Cryopreservation of Cells
   1) Steps 1-4 of the passage culture were repeated.
   2) The cells were centrifuged at 1000 rpm for 5 minutes.
   3) The supernatant was aspirated, resuspended with cryopreservation solution, counted and diluted to 2-3×10⁶ cells/mL. 1 mL of suspended cells was added to each cell cryopreservation tube.
   4) The cryopreservation tube was put into the cryopreservation box, and then the cryopreservation box was transferred to the −80° C. refrigerator overnight.
   5) The cryopreservation tube was transferred to liquid nitrogen (−196° C.).
5. Inoculated cells
   1) All the culture media were carefully aspirated, and the cell layer was rinsed gently with an appropriate amount of DPBS, and then aspirated.
   2) An appropriate amount of 0.05% Typsine EDTA was added and incubated in a CO$_2$ incubator for 3-5 minutes to digest the cells.
   3) The cells were resuspended with an appropriate amount of cell culture medium.
   4) The required amount of cells were calculated. The cell concentration was 5×10³ cells/well.
   5) The cell suspension was diluted with appropriate cell culture medium.
   6) The cell suspension was dispensed into a disposable sterile loading slot.
   7) Inoculated 30 μL per well into a 384-well plate.
   8) The cell plate was placed in a 37° C. 5% CO$_2$ incubator for 18-24 hours.

Compound Preparation
1. PMA:

PMA was diluted with DMSO and dissolved to 10 mM, and dispensed and stored in a −80° C. refrigerator in the dark for future use.

2. Dexamethasone:
Diluted with DMSO and dissolved to 30 mM, and dispensed and stored in a −80° C. refrigerator in the dark for future use.
3. 10-Fold Concentration Compound Preparation:
Test compounds were diluted to 30 mM with DMSO, and dispensed and stored in a −80° C. refrigerator for future use.
Compounds were diluted with DMSO to 1 mM, 0.25 mM, 0.0625 mM, 0.015625 mM, 0.0039 mM, 0.0009765 mM, 0.000244 mM, 0.000061 mM, 0.00001526 mM and 0.0000038125 mM, then diluted 100-fold with PMA serum-free culture medium containing 100 nM, and finally 10× concentration compound experimental plate was obtained.
The final DMSO concentration was 0.1%. PMA needs to be protected from light during use.

hMMP1 GR Transcription Repression Activity Test
1) Inoculated cells: Fresh cells were inoculated into 384 white experimental plates at $5×10^3$ cells/30 μL/well, and incubated in a 5% $CO_2$ incubator at 37° C. for 24 hours.
2) Compound preparation: The compound plate was prepared before the experiment, and the reference compound (dexamethasone) and the tested compound of 10× concentration were prepared. Finally, the experimental plate of 10× concentration compound was obtained.
3) Added compound: 3.3 μL of 10× compound was transferred with Bravo and added to cell plate. Incubated for 18 hours in a 5% $CO_2$ incubator at 37° C.
4) 30 μL of Bright-Glo fluorescent detection reagent was transferred to the cell plate.
5) Centrifugal incubation for 2 minutes.
6) The fluorescence value was measured with the Envision plate reader.

Data Processing and Analysis
Positive Control: 10 nM PMA+1000 nM dexamethasone (0.1% DMSO)
Negative control: 10 nM PMA (0.1% DMSO)
Test compound: Maximum concentration of 1000 nM, 4-fold dilution, 10 wells in total, repeated.
Dexamethasone: Maximum concentration of 1000 nM, 4-fold dilution, 10 wells in total, repeated.
The graphing software GraphPad Prism5 was used to create the concentration curves of the test compounds and calculate the $IC_{50}$ values.
The experimental results are shown in Table 1.

Experimental Embodiment 2: In Vitro Detection of MMTV Transcription Activation Activity of Compounds Under the Luciferase Reporter Gene Screening System Experimental Purposes:
The promoter of mouse mammary tumor virus (MMTV) contains specific binding sites for activating GRs (GREs). To determine the activity of the compounds, a reporter gene (luciferase) was inserted after the MMTV promoter, and this construct was expressed in a stable manner in the genome of the HeLa cell line. MMTV promoter was activated by the test compounds to induce the expression of luciferase, and its activity was detected by luminescence measurement.

Culture Medium and Reagents:
1. Conventional Cell Culture Medium
    DMEM 90%, FBS 10%, Hygromycin 100 μg/mL
2. Freezing Liquid
    DMEM 75%, FBS 20%, DMSO 5%.
3. Experimental Cell Culture Medium
    DMEM 97%, serum treated with activated carbon (Charcoal stripped serum) 3%.
4. Bright-Glo Kit
    A bottle of Bright Glo Buffer was transferred to a brown fluorescent substrate bottle, inverted and mixed until the substrate was completely dissolved, dispensed in an appropriate amount, and stored at −80° C.

Method

Prepared Cell Suspensions with Frozen Cells
1. Cell Thawing
    1) Frozen cells were placed in a 37° C. water bath with constant stirring until completely thawed.
    2) The above cells were added to a 15 mL centrifuge tube (containing 5 mL of pre-heated cell culture medium), and then centrifuged at 1000 rpm for 5 minutes.
    3) The supernatant was discarded, and 5 mL of pre-heated cell culture medium was added to resuspend the cells.
    4) Cell suspension was transferred to a 60 mM cell culture dish and cultured in a 5% $CO_2$ incubator at 37° C.
2. Passage Culture
    1) When the cell growth reached 80-90%, the cells were passage cultured. Cells were typically passaged twice a week at 1:3 or 1:6 dilution.
    2) All the culture media were carefully aspirated, the cell layer was rinsed gently with an appropriate amount of DPBS, and then aspirated.
    3) An appropriate amount of 0.05% Typsine EDTA was added and incubated in a $CO_2$ incubator for 3-5 minutes to digest the cells.
    4) The cells were resuspended with an appropriate amount of pre-heated cell culture medium, and diluted and passage cultured.
3. Changed the Culture Medium Every Other Day
    1) All culture media were gently aspirated.
    2) Fresh cell culture medium was added (pre-heated at 37° C.) (added 10 mL to 100 mm dish or 20 mL to 150 mm dish).
4. Cryopreservation of cells
    1) Steps 1-4 of the passage culture were repeated.
    2) The cells were centrifuged at 1000 rpm for 5 minutes.
    3) Supernatant was aspirated, resuspended with cryopreservation solution, counted and diluted to $(2-3)×10^6$ cells/mL. 1 mL of suspended cells was added to each cell cryopreservation tube.
    4) Cryopreservation tube was put into the cryopreservation box, and then the cryopreservation box was transferred to the −80° C. refrigerator overnight.
    5) The cryopreservation tube was transferred to liquid nitrogen (−196° C.).
5. Inoculated Cells
    1) All the culture media were carefully aspirated, the cell layer was rinsed gently with an appropriate amount of DPBS, and then aspirated.
    2) An appropriate amount of 0.05% Typsine EDTA was added and incubated in a $CO_2$ incubator for 3-5 minutes to digest the cells.
    3) The cells were resuspended with an appropriate amount of cell culture medium.
    4) The amount of cells required was calculated, and the cell concentration was $4×10^3$ cells/well.
    5) The cell suspension was diluted with appropriate cell culture medium.
    6) Cell suspension was dispensed into a disposable sterile loading slot.
    7) Inoculated 30 μL per well into a 384-well plate.

8) The cell plate was placed in a 37° C. 5% $CO_2$ incubator for 18-24 hours.

Compound Preparation

1. Dexamethasone:

Diluted with DMSO and dissolved to 30 mM, and stored in a −80° C. refrigerator in the dark for future use.

2. 4-Fold Concentration Compound Preparation:

Test compounds were diluted to 30 mM with DMSO, and dispensed and stored in a −80° C. refrigerator for future use.

Compounds were diluted with DMSO to 1 mM, 0.25 mM, 0.0625 mM, 0.015625 mM, 0.0039 mM, 0.0009765 mM, 0.000244 mM, 0.000061 mM, 0.00001526 mM and 0.0000038125 mM, then diluted 25-fold with serum culture medium treated with activated carbon, and finally 4× concentration compound experimental plate was obtained, prepared before use.

The final DMSO experimental concentration was 0.1%.

MMTV_GR Transcription Activation Activity Experiment

1) Inoculated cells: Fresh cells were inoculated into 384 white transparent bottom experimental plates at 4×10³ cells/30 µL/well, and incubated at 37° C. 5% $CO_2$ incubator for 24 hours.
2) Compound preparation: The compound plate was prepared before the experiment, and the reference compound (dexamethasone) and the test compound of 4× concentration were prepared. Finally, the experimental plate of 4× concentration compound was obtained.
3) Added compound: 10 µL of 4× compound was transferred with Bravo and added to cell plate. Incubated for 18 hours in a 37° C. 5% $CO_2$ incubator.
4) 30 µL of Bright-Glo fluorescent detection reagent was transferred to the cell plate.
5) Centrifugal incubation for 2 minutes.
6) The fluorescence value was measured with the Envision plate reader.

Data Processing and Analysis

Positive control: 1000 nM dexamethasone (0.1% DMSO)
Negative control: 0.1% DMSO
Test compound: Maximum concentration of 1000 nM, 4-fold dilution, 10 wells in total, repeated.
Dexamethasone: Maximum concentration of 1000 nM, 4-fold dilution, 10 wells in total, repeated.

The graphing software GraphPad Prism5 was used to create the concentration curves of the tested compounds and calculate the $IC_{50}$ values.

The experimental results are shown in Table 1.

TABLE 1

In vitro screening test results of compounds of the present disclosure

| Compound | TR (hMMP1 transcription inhibition activity) | | TA (MMTV transcription activation activity) | |
|---|---|---|---|---|
| | $IC_{50}$(nM) | Effect | $EC_{50}$(nM) | Effect |
| WX002 | 0.318 | 100% | 2.07 | 76.01% |
| WX003 | 0.08 | 95.11% | 0.229 | 91.4% |
| WX004 | 3.58 | 78.8% | 5.86 | 63.71% |
| WX005 | 6.75 | 70.71% | N/A | N/A |
| WX006 | 79.2 | 72.96% | N/A | N/A |
| WX007 | 121 | 63.64% | N/A | N/A |
| WX008 | 58.9 | 91.42% | N/A | N/A |
| WX012 | N/A | N/A | 0.019 | 103% |
| WX017 | 0.9 | 86.0% | 2.56 | 81.31% |
| WX018 | 6.1 | 83.73% | 12.26 | 69.39% |
| WX019 | 0.171 | 94.82% | 0.94 | 75.23% |
| WX022 | N/A | N/A | 1.59 | 101% |

TABLE 1-continued

In vitro screening test results of compounds of the present disclosure

| Compound | TR (hMMP1 transcription inhibition activity) | | TA (MMTV transcription activation activity) | |
|---|---|---|---|---|
| | $IC_{50}$(nM) | Effect | $EC_{50}$(nM) | Effect |
| WX024 | 32.5, | 54.50% | 78.18 | 31.47% |
| WX025 | 28.4 | 76.11% | N/A | N/A |
| WX027 | 70.6 | 78.99% | N/A | N/A |
| WX029 | 13.9 | 93.82% | 21.44 | 62.87% |
| WX031 | 42.66 | 54.4% | N/A | N/A |
| WX032 | 56.64 | 57.41% | N/A | N/A |
| WX033 | 11.61 | 71.78% | N/A | N/A |
| WX034 | 3.22 | 97.13% | 3.2 | 89.2% |
| WX035 | 2.15 | 94.59% | 5.59 | 82.45% |
| WX036 | 0.905 | 92.81% | 2.31 | 80.06% |
| WX037 | 5.66 | 87.83% | 12.55 | 72.97% |
| WX042 | 1.38 | 88.98% | 3.06 | 43.47% |
| WX043 | 1.21 | 93.35% | 5.03 | 72.81% |
| WX045 | 6.74 | 73.57% | 12.86 | 55.61% |
| WX051 | 3.45 | 95.41% | 4.93 | 70.85% |
| WX052 | 0.97 | 92.49% | 3.37 | 57.75% |

Note: N/A stands for not detected; $IC_{50}$ is absolute $IC_{50}$ and $EC_{50}$ is absolute $EC_{50}$; Effect stands for maximum effect value.

Conclusion: The compounds of the present disclosure exhibit good transcription repression activity and comparable transcription activation activity.

Experimental Embodiment 3: In Vitro Detection of the Repression Activity of Compounds on Human Peripheral Blood Mononuclear Cells TNF-α

Experimental purpose: To express the anti-inflammatory activity of the test compound at the cellular level according to the level of TNF-α in human peripheral blood mononuclear cells (hPBMC).

Culture Medium and Reagents:

PRMI 1640 culture medium (Invitrogen-11875093, lot 2003787)
Double antibody (PS) (Invitrogen-15140122, lot 2019317)
Fetal bovine serum (FBS) (Gibco-10091148, lot 1989478)
Trypan blue (Gibco-15250061, lot 1311086)
TNF-α Elisa Kit Set A (BD-555212, lot 7171693),
TNF-α Elisa Kit Set B (BD-550534, lot 9095783)
PBMC cells (AllCells, Cat. PBO06F-C, lot LP190225B): RPMI 1640+10% FBS (Gibico)+1% PS Method Experimental Steps:

1. PBMC Experiment 1.1 Resuscitation of Cells

1) The frozen cells were quickly thawed by continuous stirring in a 37° C. water bath.
2) 25 mL of fresh pre-heated thawed culture medium was added to a 50 mL centrifuge tube. Then the cells were added gently, drop by drop.
3) Cells were centrifuged at 2000 rpm for 10 min (ascending speed: 9, descending speed: 1).
4) The supernatant was discarded and the cell particles were resuspended in 25 mL of freshly pre-heated RPMI 1640 culture medium.

1.2 Seeded Cells in 96-Well Plates
   5) After thawing and resuspending the suspended cells, the number of cells was counted and the total number of cells required for the experiment was calculated.
   6) The cell suspension was diluted with an appropriate volume of cell culture medium.
   7) The cell suspension was poured into a sterile disposable container.
   8) 100,000 cells/(100 μL) of cell suspension was transferred to each well of a 96-well plate.
   9) The cell plates were placed in humidified air, 5% $CO_2$ incubator, 37° C. for 2 hours.
2. Compound Dose Gradient Dilution In the first step, the compound was diluted from storage concentration of 10 mM to 1 mM with 100% DMSO as the first point 3-fold dilution with 100% DMSO for 8 points. In the second step, the serum-free culture medium was diluted 125 times, and the concentration of DMSO was 0.8%. Then 16.8 μL of the compound diluted in culture medium was transferred to a 100 μL cell plate, and the concentration of DMSO was 0.114%.

After adding the compound, the cell plates were incubated in a 37° C. 5% $CO_2$ incubator for 1 hour.

3. LPS Dilution

In the first step, LPS was diluted with ultrapure water to a storage concentration of 1 mg/mL. In the second step, the storage concentration of LPS was diluted to 1 μg/mL in serum-free culture medium. In the third step, serum-free culture medium was 1666.666-fold diluted. Then 16.8 μL of LPS that has been diluted with culture medium was transferred to a 116.8 μL cell plate. At this time, the final concentration of DMSO was 0.1%. After adding LPS, the cell plate was put into a 37° C., 5% $CO_2$ incubator and incubated for 18 hours.

ELISA Experiment

Day 1:
   1. The TNF-α antibody was diluted to 1× in the coating solution, and then 100 μL per well was added to a 96-well high-binding performance plate, and the plate was sealed with a membrane and placed at 4° C. for 18 hours.
   2. 2000 mL of wash buffer was prepared to 1× for later use.

Day 2:
   3. After the plate was coated overnight, the coating solution was poured out and washed 3 times with 300 μL of washing buffer per well.
   4. After the plate was washed, 200 μL of sealing buffer was added to each well, and the plate was sealed with membrane. Incubated for one hour in a 25° C. incubator.
   5. The cell plates incubated for 18 hours were placed in a centrifuge for centrifugation, temperature: 25° C., speed: 2000 rpm, time: 10 min, ascending speed: 9, descending speed: 1. After centrifugation, 100 μL of cell supernatant from each well was transferred to a 3599 cell plate, and then placed in a 4° C. refrigerator for later use.
   6. The cell supernatant was diluted 40 times with sealing buffer and placed in a 4° C. refrigerator for later use, and the standard was also placed in a 4° C. refrigerator for later use.
   7. After the sealing was completed, the sealing solution was poured out and washed three times with 300 μL of washing buffer per well.
   8. The diluted cell supernatant samples and standards were added to the ELISA plate, and the plate was sealed with membrane. Then incubated for 2 hours in a 25° C. incubator.
   9. The liquid in the plate was poured out and washed 5 times with 300 μL of washing buffer per well.
   10. Antibodies were prepared and 100 μL was added to each well and the plate was sealed with sealing membrane. Then incubated for one hour in a 25° C. incubator.
   11. The liquid in the plate was poured out and washed 7 times with 300 μL of washing buffer per well.
   12. A chromogenic solution was prepared, and added 100 μL to each well. Then incubated for half an hour in a 25° C. incubator in the dark.
   13. 50 μL of stop solution was added to each well, centrifuged, temperature: 25° C., speed: 1000 rpm, time: 1 min, ascending speed: 9, descending speed: 9.
   14. Readings were taken on Envision within 30 minutes after centrifugation and set the value of absorption light 450 minus absorption light 570 as the final original data use value.

Data Processing:

The inhibition rate is calculated according to the original data, and the calculation formula of the inhibition rate is:

Inhibition rate=(1−(original value−HPE average value)/(ZPE average value−HPE average value))×100% wherein ZPE is: 0% repression (75 pg/mL LPS, 0.1% DMSO), HPE is: 100% repression (without LPS, 0.1% DMSO).

S/B: ZPE average value/HPE average value

Z-factor:Z factor=1−(3×(ZPE standard deviation+ HPE standard deviation)/(ZPE average value− HPE average value))

Data analysis was performed with Model 205 in xLfit statistical software. Taking the concentration as the abscissa and the inhibition rate as the ordinate, the calculation formula of $IC_{50}$ was: The concentration and inhibition rate (%) of the test compounds were plotted using the 4-parameter logistic dose response equation, and the compound concentration required for 50% inhibition ($IC_{50}$) was determined.

The original value of the standard curve was input into GraphPad Prism, the standard curve was drawn, and the $IC_{50}$ and the highest effect value of the compound for TNF-α repression were calculated.

The experimental results are shown in Table 2.

TABLE 2

Repression results of the compounds of the present disclosure on human peripheral blood mononuclear cell TNF-α in vitro

| Compound | hPBMC $IC_{50}$(nM) | Top (%) |
|---|---|---|
| AZD9567* | 57.42 | 54.59% |
| WX002 | 15.05 | 84.56% |
| WX003** | 0.97 | 84.26% |
| WX004* | 15.93 | 78.46% |
| WX017 | 7.63 | 83.13% |
| WX018* | 18.63 | 69.29% |
| WX019** | 0.98 | 89.97% |
| WX022* | 2.42 | 89.96% |
| WX034* | 12.58 | 79.27% |
| WX035* | 11.59 | 100.3% |

TABLE 2-continued

Repression results of the compounds of the present disclosure on human peripheral blood mononuclear cell TNF-α in vitro

| Compound | hPBMC IC$_{50}$(nM) | Top (%) |
|---|---|---|
| WX043* | 4.90 | 88.78% |
| WX051** | 10.45 | 74.92% |

Note:
***test Top concentration 100 nM, 3-fold diluted, 8 concentration;
**test Top concentration 500 nM, 3-fold diluted, 8 concentration;
*test Top concentration 1000 nM, 3-fold diluted, 8 concentration;
remaining test Top concentration 10000 nM, 3-fold diluted, 8 concentration;
IC$_{50}$ is absolute IC$_{50}$;
Top (%) stands for maximum effect value.

Conclusions: The compounds of the present disclosure exhibit good anti-inflammatory activity at the cellular level.

Experiment Embodiment 4: Human Liver Microsomal CYP Repression Experiment

The purpose of the research project was to evaluate the repression of the test sample on human liver microsomal cytochrome P450 isoenzyme (CYP3A4) using a 5-in-1 probe substrate of CYP isoenzyme.

Mixed human liver microsomes (HLM) were purchased from Corning Inc. (Steuben, New York, USA) or other suppliers and stored at temperatures below −70° C. before use.

The diluted series concentration of the test sample was added to the incubation system containing human liver microsomes, probe substrates, and co-factors of the circulating system, and the control without the test sample but with solvent was used as the enzyme activity control (100%). The concentration of metabolites produced by the probe substrate in the sample was determined by liquid chromatography-tandem mass spectrometry (LC-MS/MS). Non-linear regression analysis of the mean percent activity of the test sample versus concentration was performed using SigmaPlot (V.11). The IC$_{50}$ values were calculated by a three- or four-parameter inverse logarithmic equation. The test results are shown in Table 3:

TABLE 3

Repression of CYP3A4 by the compounds of the present disclosure in vitro

| Test compound | AZD9567 | WX019 | WX053 |
|---|---|---|---|
| CYP3A4 (IC50, μM) | 2.95 | 9.12 | 15.7 |

Conclusion: Azd9567 has moderate repression on CYP3A4. Compounds WX019, WX053 significantly improve the repression of CYP3A4.

Experimental Embodiment 5: In Vivo Pharmacokinetic Properties Study

Experimental purpose: The purpose of this study was to determine the pharmacokinetic parameters of compounds in male SD rats.

Experimental methods: In this project, two male SD rats were intravenously administered with a dose of 2 mg/kg and a concentration of 0.4 mg/mL. Plasma samples were collected at 0 h (before administration) and 0.0833, 0.25, 0.5, 1, 2, 4, 6, 8, 24 h after administration. Then the collected samples were analyzed by LC-MS/MS and the data were collected. The collected analytical data were used to calculate the relevant pharmacokinetic parameters using Phoenix WinNonlin 6.3 software.

The experimental results are shown in Table 4:

TABLE 4

Results of in vivo pharmacokinetic experiments

| Test sample | | AZD9567 | WX019 | WX051 |
|---|---|---|---|---|
| iv (2 mg/kg) | Cl (mL/min/kg) | 4.25 | 9.74 | 9.29 |
| | V$_{dss}$(L/kg) | 0.56 | 1.28 | 2.61 |
| | T$_{1/2}$ (h) | 1.99 | 3.00 | 3.54 |

Conclusion: The compounds of the present disclosure have good apparent volume of distribution and half-life.

The invention claimed is:

1. A compound represented by formula (I) or a pharmaceutically acceptable salt thereof,

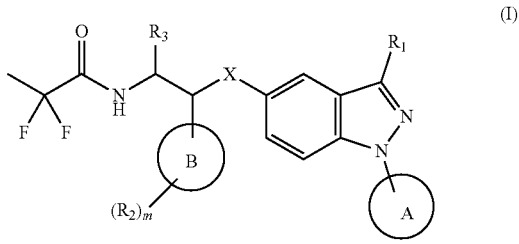

(I)

wherein,
X is selected from NH and O;
ring A is selected from

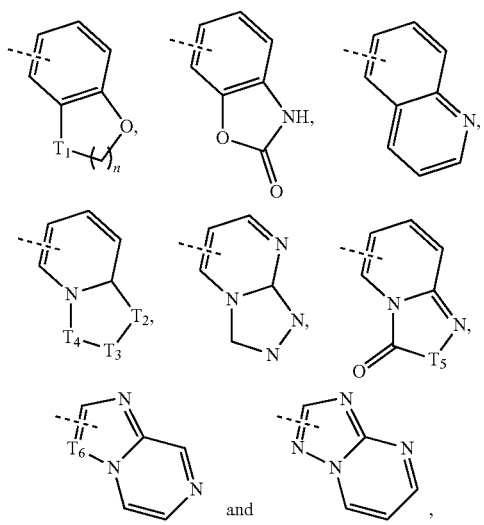

and and the

[chemical structures]

and are optionally substituted by 1, 2 or 3 $R_a$;
$T_1$ is selected from $CH_2$ and O;
each of $T_2$, $T_3$ and $T_4$ is independently selected from CH and N;
$T_5$ is selected from NH and O;
$T_6$ is selected from CH and N;
ring B is selected from phenyl;
$R_1$ is selected from H and $C_{1-3}$ alkoxy, and the $C_{1-3}$ alkoxy is optionally substituted by 1, 2 or 3 $R_b$;
each of $R_2$ is independently selected from H, F, Cl, Br and $CH_3$;
$R_3$ is selected from $C_{1-6}$ alkyl, and the $C_{1-6}$ alkyl is optionally substituted by 1, 2 or 3 $R_c$;
m is selected from 0, 1 and 2;
n is selected from 1 and 2;
each of $R_a$ is independently selected from H and $C_{1-3}$ alkyl, and the $C_{1-3}$ alkyl is optionally substituted by 1, 2 or 3 R;
each of $R_b$ is independently selected from H, F, Cl, Br and I;
each of $R_c$ is independently selected from H, F, Cl, Br, I and OH;
each of R is independently selected from F and $OCH_3$.

2. The compound or the pharmaceutically acceptable salt thereof as claimed in claim 1, wherein the compound is selected from

[chemical structure (I-1)]

3. The compound or the pharmaceutically acceptable salt thereof as claimed in claim 1, wherein each of $R_a$ is independently selected from H, $CH_3$, $CF_3$, $CH_2CH_3$, $C(CH_3)_2$ and $CH_2CH_2OCH_3$.

4. The compound or the pharmaceutically acceptable salt thereof as claimed in claim 1, wherein ring A is selected from

[chemical structures]

and and the

[chemical structures]

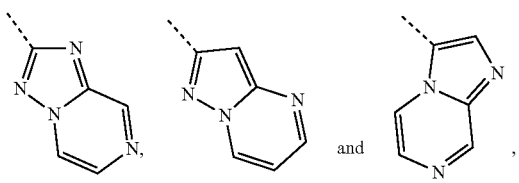
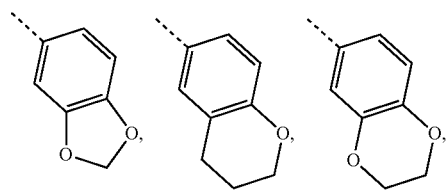
are optionally substituted by 1, 2 or 3$R_a$.
5. The compound or the pharmaceutically acceptable salt thereof as claimed in claim 4, wherein ring A is selected from
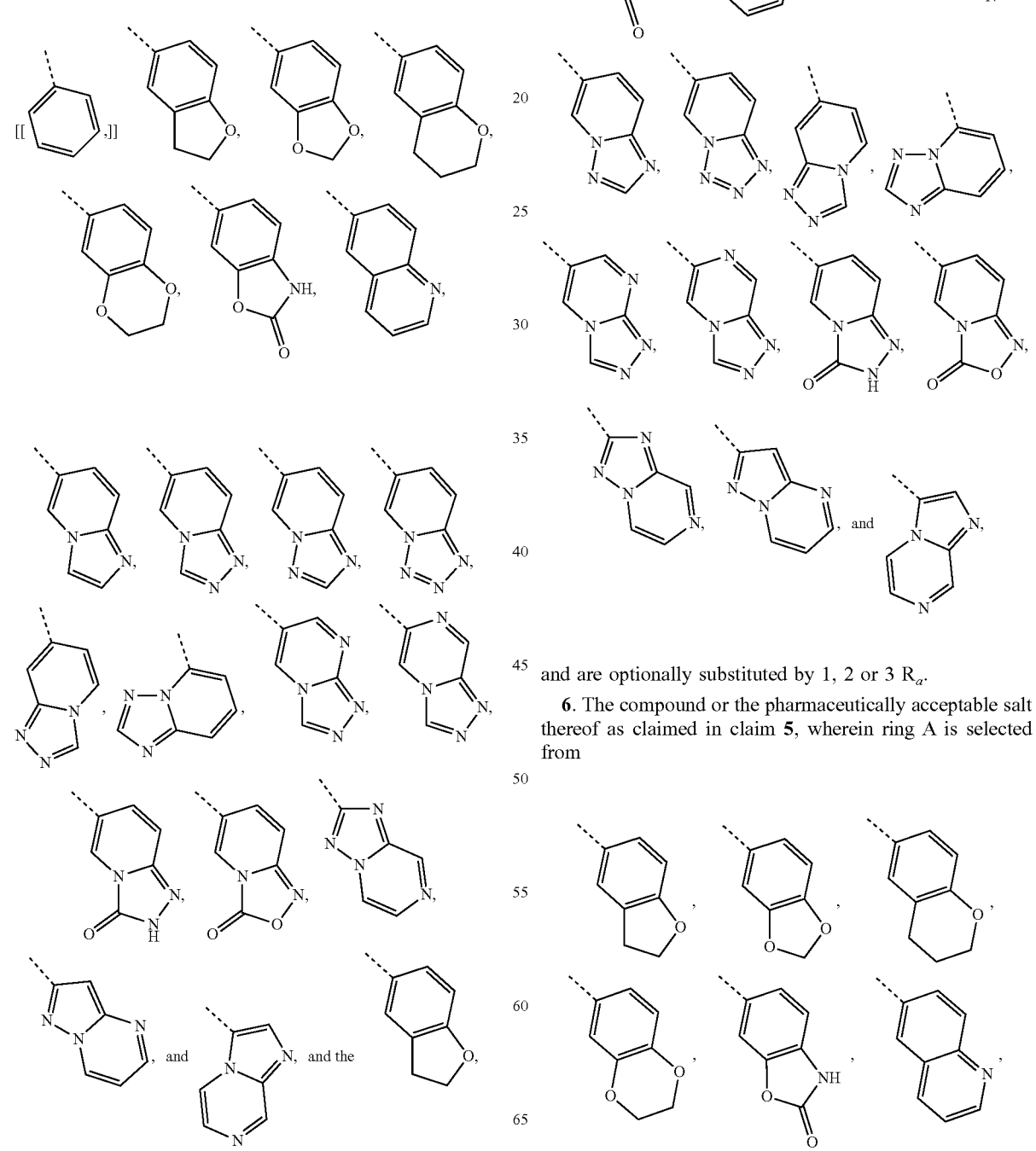
and are optionally substituted by 1, 2 or 3 $R_a$.
6. The compound or the pharmaceutically acceptable salt thereof as claimed in claim 5, wherein ring A is selected from
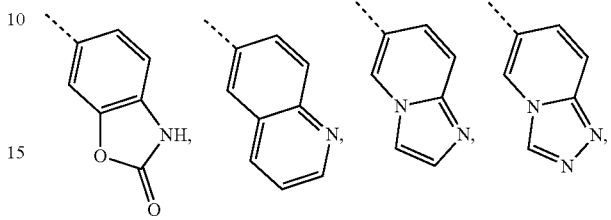
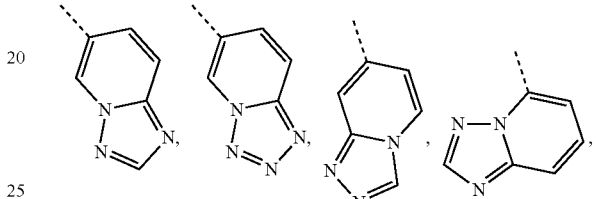
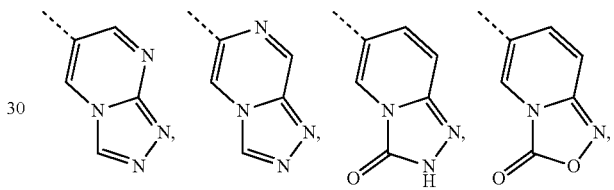
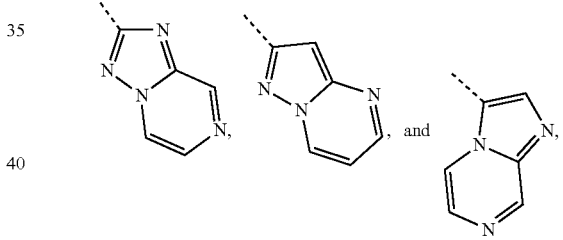

-continued

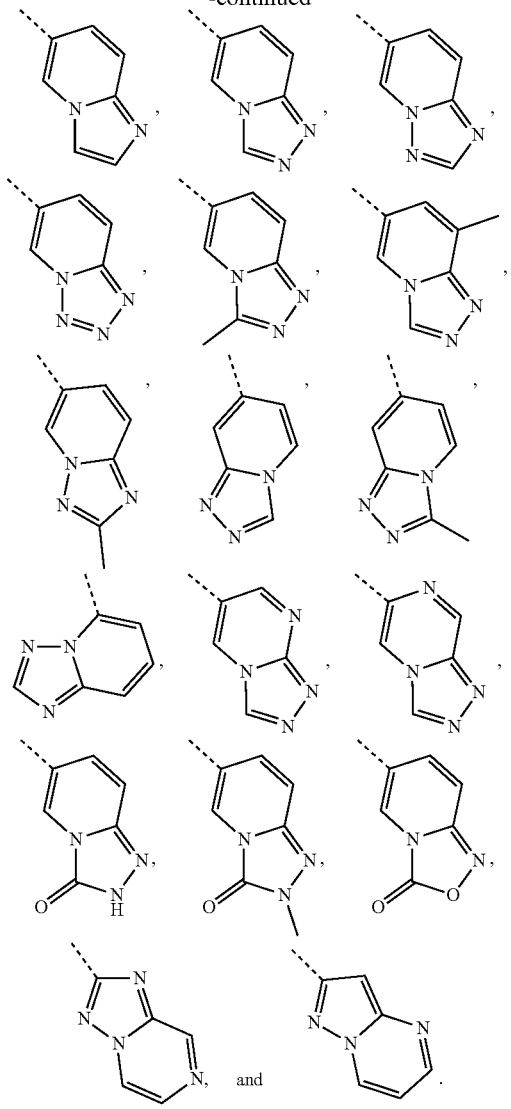

7. The compound or the pharmaceutically acceptable salt thereof as claimed in claim 1, wherein the structural moiety

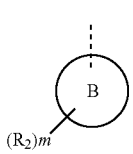

is selected from

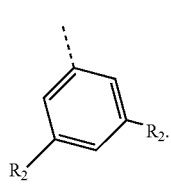

8. The compound or the pharmaceutically acceptable salt thereof as claimed in claim 7, wherein the structural moiety

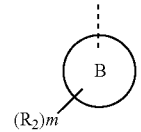

selected from

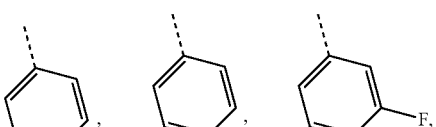

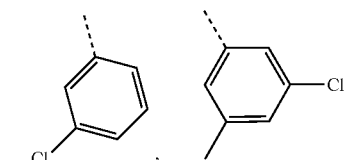 and

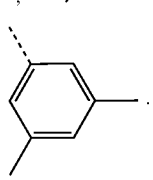

9. The compound or the pharmaceutically acceptable salt thereof as claimed in claim 1, wherein $R_1$ is selected from H and $OCH_3$, and the $OCH_3$ is optionally substituted by 1, 2 or 3 $R_b$.

10. The compound or the pharmaceutically acceptable salt thereof as claimed in claim 9, wherein $R_1$ is selected from H and $OCH_3$.

11. The compound or the pharmaceutically acceptable salt thereof as claimed in claim 1, wherein $R_3$ is selected from $C_{1-3}$ alkyl, and the $C_{1-3}$ alkyl is optionally substituted by 1, 2 or 3 R.

12. The compound or the pharmaceutically acceptable salt thereof as claimed in claim 11, wherein $R_3$ is selected from $CH_3$, $CH_2CH_3$ and $C(CH_3)_2$.

13. The compound or the pharmaceutically acceptable salt thereof as claimed in claim 1, wherein the compound is selected from

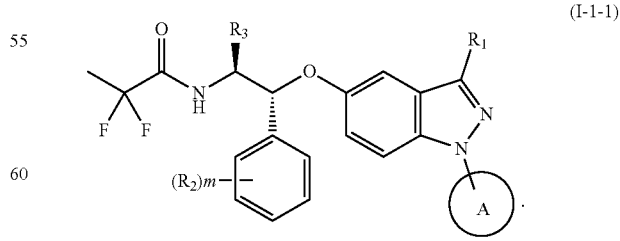

(I-1-1)

14. A compound represented by the following formula or a pharmaceutically acceptable salt thereof, and the compound is selected from

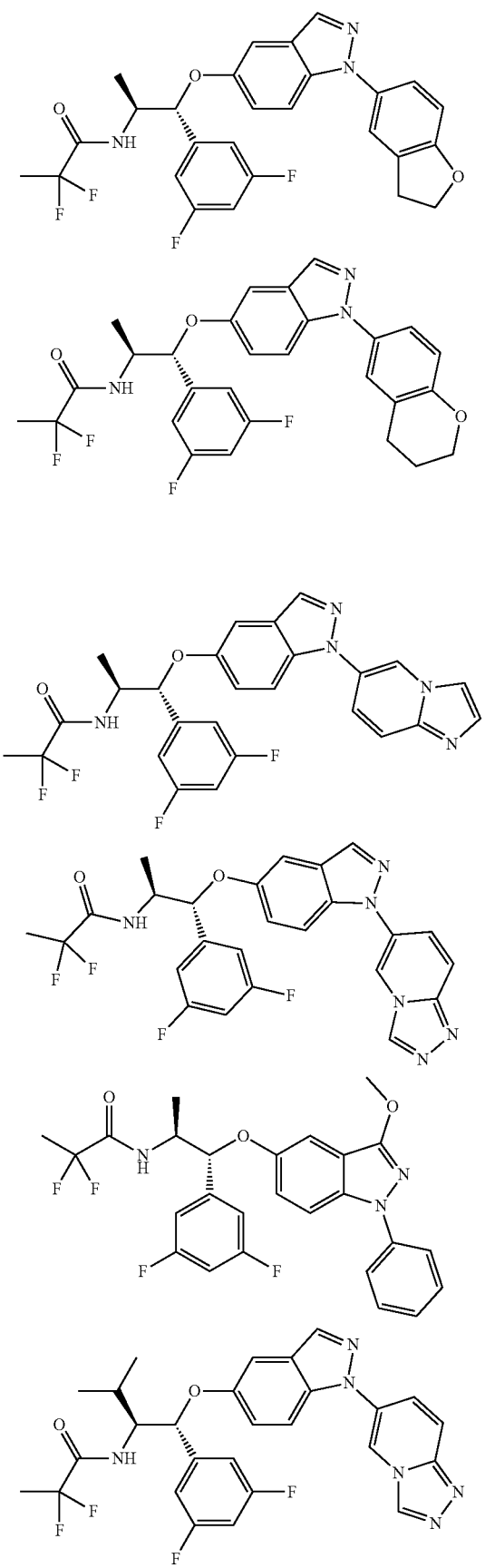
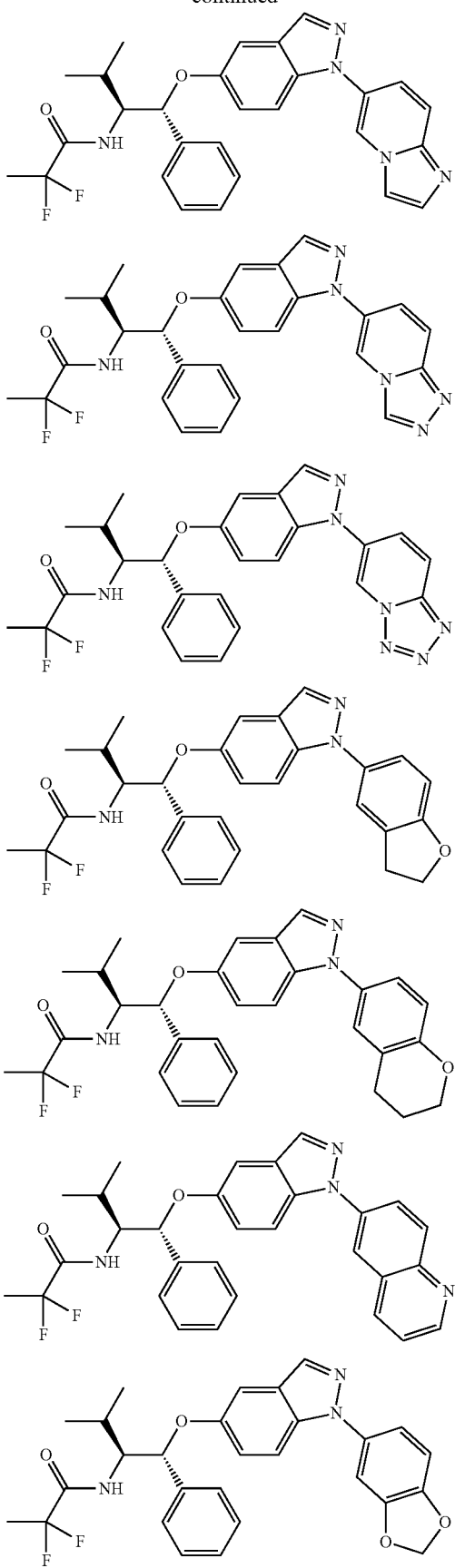

131
-continued
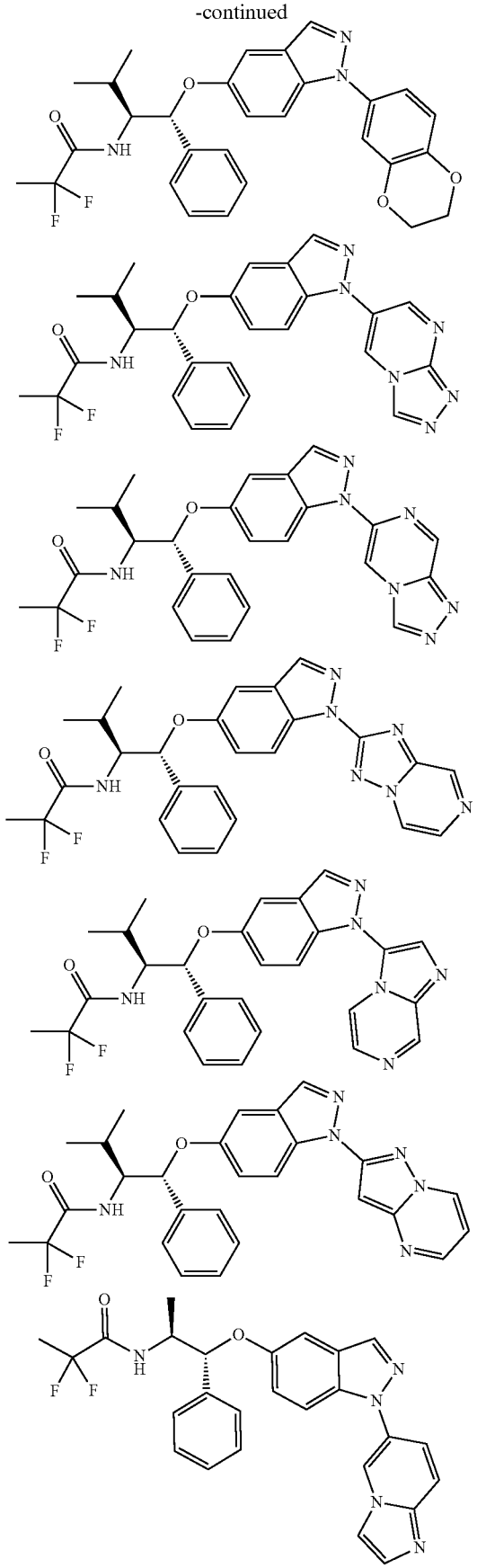
132
-continued
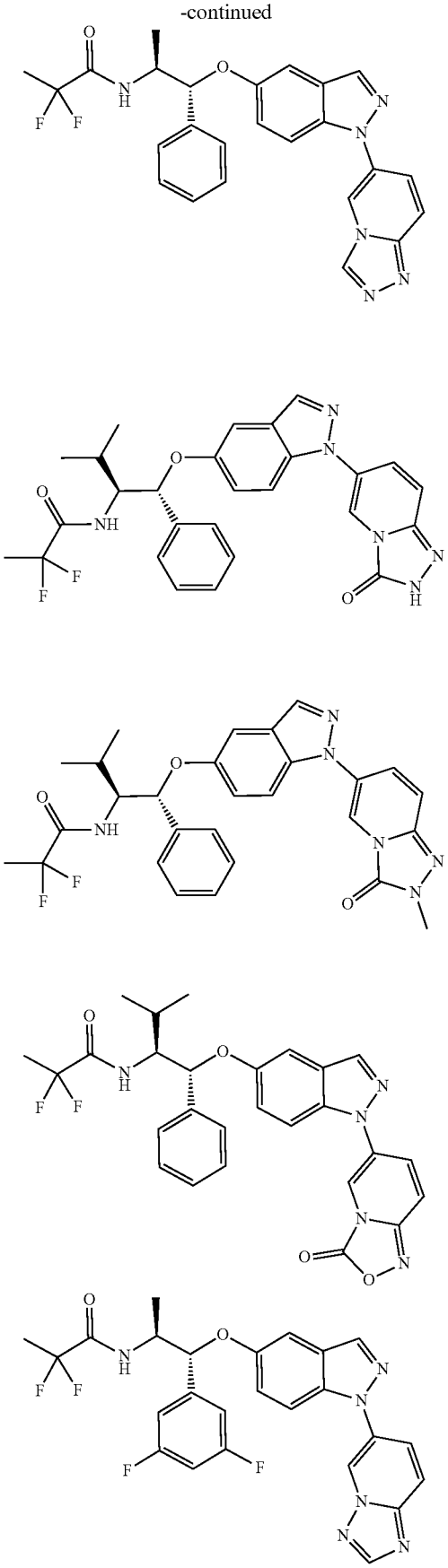

133
-continued
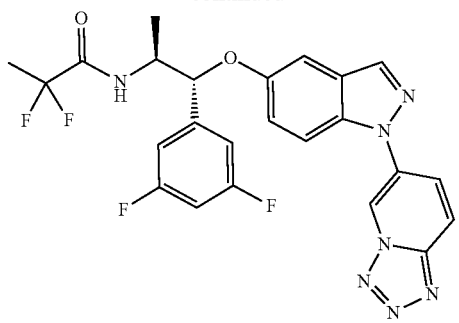
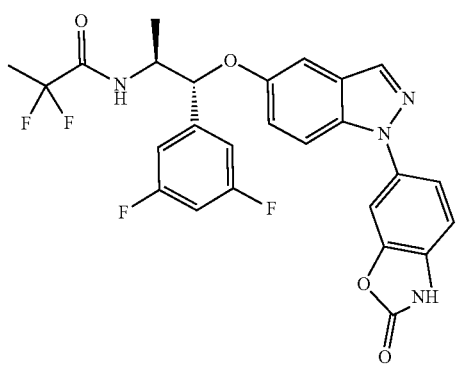
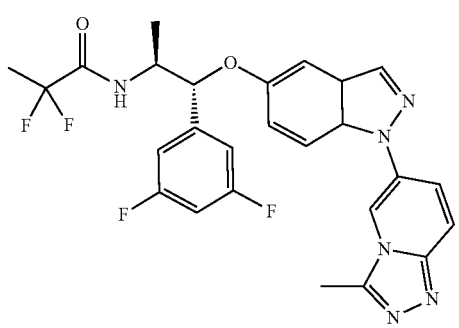
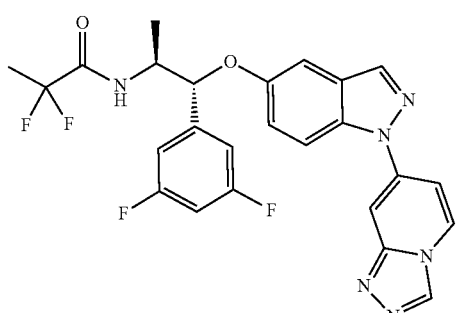
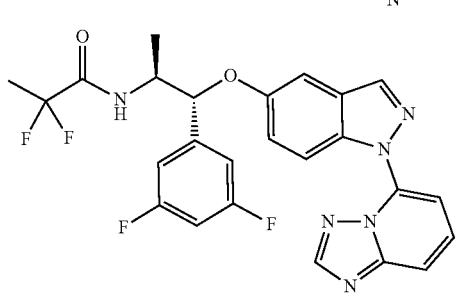
134
-continued
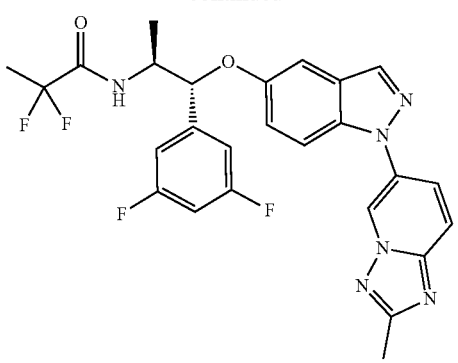
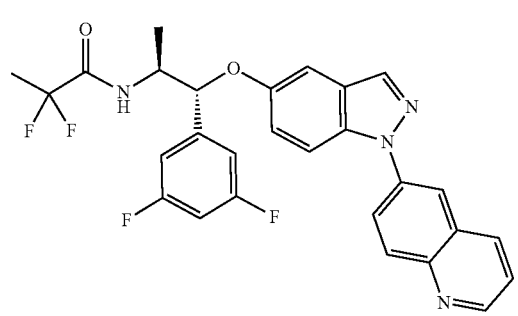
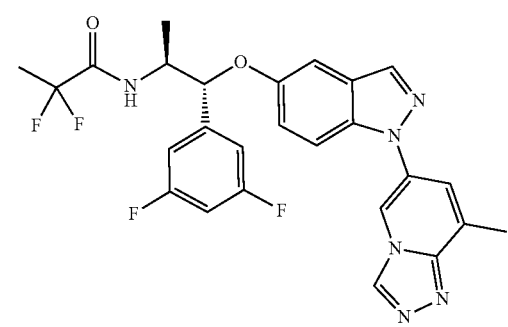
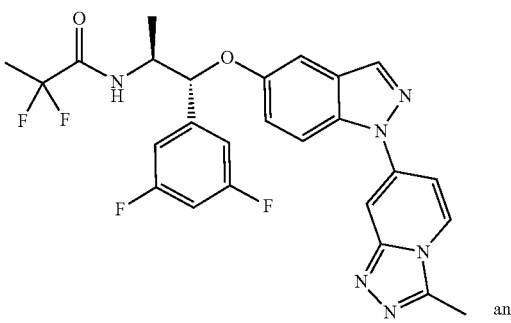
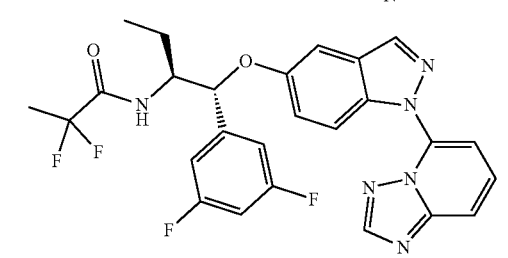 and
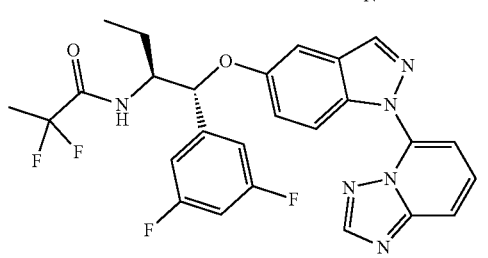

15. A method for treating diseases related to glucocorticoid receptors in a subject in need thereof, comprising: administering an effective amount of the compound or the pharmaceutically acceptable salt thereof as claimed in claim 1 to the subject.

16. The method as claimed in claim 15, wherein the diseases related to glucocorticoid receptors are rheumatoid arthritis.

* * * * *